(12) United States Patent
Tanaka et al.

(10) Patent No.: US 9,185,406 B2
(45) Date of Patent: *Nov. 10, 2015

(54) IMAGE DECODING DEVICE, IMAGE CODING DEVICE, METHODS THEREOF, PROGRAMS THEREOF, INTEGRATED CIRCUITS THEREOF, AND TRANSCODING DEVICE

(75) Inventors: Takeshi Tanaka, Osaka (JP); Naoki Yoshimatsu, Aichi (JP); Keiichi Kurokawa, Hyogo (JP); Daisuke Iwahashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 627 days.

This patent is subject to a terminal disclaimer.

(21) Appl. No.: 13/496,341

(22) PCT Filed: Sep. 9, 2011

(86) PCT No.: PCT/JP2011/005074
§ 371 (c)(1),
(2), (4) Date: Mar. 15, 2012

(87) PCT Pub. No.: WO2012/035730
PCT Pub. Date: Mar. 22, 2012

(65) Prior Publication Data
US 2012/0275516 A1 Nov. 1, 2012

(30) Foreign Application Priority Data
Sep. 16, 2010 (JP) .................................. 2010-208642

(51) Int. Cl.
*H04N 11/02* (2006.01)
*H04N 11/04* (2006.01)
(Continued)

(52) U.S. Cl.
CPC ... *H04N 19/00521* (2013.01); *H04N 19/00224* (2013.01); *H04N 19/00472* (2013.01);
(Continued)

(58) Field of Classification Search
None
See application file for complete search history.

(56) References Cited

U.S. PATENT DOCUMENTS 7,012,960 B2   3/2006   Bourge et al.
7,305,036 B2   12/2007  MacInnis et al.
(Continued)

FOREIGN PATENT DOCUMENTS

CN   1383330 A   12/2002
CN   1404698 A   3/2003
(Continued)

OTHER PUBLICATIONS

International Search Report issued Oct. 18, 2011 in related International Application No. PCT/JP2011/005063.
(Continued)

*Primary Examiner* — Allen Wong
*Assistant Examiner* — Samuel D Fereja
(74) *Attorney, Agent, or Firm* — Wenderoth, Lind & Ponack, L.L.P.

(57) ABSTRACT

An image decoding device for increasing decoding efficiency and reducing the number of memory accesses includes a division unit dividing a picture into first and second coded image data; and first and second decoding units decoding, in parallel, the first and second coded image data and storing decoding results into a frame storage unit. The first and second decoding units decode the first and second coded image data using second and first decoding result information, respectively, and store the resulting first and second decoding result information into an information storage unit. When decoding a target macroblock, each of the first and second decoding units performs image processing on the corresponding second or first decoding result information indicating part of the decoded macroblock included in the macroblock line adjacent to the macroblock line including the target macroblock, and the target macroblock.

20 Claims, 40 Drawing Sheets

(51) Int. Cl.
*H04N 19/436* (2014.01)
*H04N 19/50* (2014.01)
*H04N 19/593* (2014.01)
*H04N 19/16* (2014.01)
*H04N 19/44* (2014.01)
*H04N 19/82* (2014.01)
*H04N 19/40* (2014.01)

(52) U.S. Cl.
CPC ... *H04N19/00533* (2013.01); *H04N 19/00569* (2013.01); *H04N 19/00763* (2013.01); *H04N 19/00896* (2013.01); *H04N 19/16* (2014.11); *H04N 19/40* (2014.11); *H04N 19/436* (2014.11); *H04N 19/44* (2014.11); *H04N 19/50* (2014.11); *H04N 19/593* (2014.11); *H04N 19/82* (2014.11)

(56) References Cited

U.S. PATENT DOCUMENTS

| | | | |
|---|---|---|---|
| 7,660,352 B2* | 2/2010 | Yamane et al. | 375/240.12 |
| 8,155,203 B2 | 4/2012 | Bialkowski et al. | |
| 8,218,619 B2* | 7/2012 | Park et al. | 375/240.01 |
| 8,259,810 B2* | 9/2012 | Watanabe et al. | 375/240.23 |
| 8,270,470 B2 | 9/2012 | Amon et al. | |
| 8,320,689 B2 | 11/2012 | Kodama | |
| 8,724,708 B2* | 5/2014 | Hashimoto | 375/240.25 |
| 8,897,583 B2 | 11/2014 | Amano et al. | |
| 2002/0136311 A1 | 9/2002 | Bourge et al. | |
| 2002/0168011 A1 | 11/2002 | Bourge | |
| 2005/0147174 A1* | 7/2005 | Iwata | 375/240.23 |
| 2006/0209948 A1 | 9/2006 | Bialkowski et al. | |
| 2007/0047660 A1 | 3/2007 | Mitani et al. | |
| 2008/0025391 A1 | 1/2008 | Amon et al. | |
| 2008/0031329 A1 | 2/2008 | Iwata et al. | |
| 2008/0069244 A1* | 3/2008 | Yano | 375/240.24 |
| 2008/0219347 A1 | 9/2008 | Nakamura et al. | |
| 2008/0310739 A1 | 12/2008 | Endo | |
| 2009/0002378 A1* | 1/2009 | Kondo | 345/506 |
| 2009/0051808 A1* | 2/2009 | Sumioka et al. | 348/420.1 |
| 2009/0110310 A1 | 4/2009 | Kodama | |
| 2009/0116546 A1 | 5/2009 | Park et al. | |
| 2010/0020883 A1 | 1/2010 | Miyauchi et al. | |
| 2010/0061464 A1 | 3/2010 | Watanabe | |
| 2010/0195922 A1 | 8/2010 | Amano et al. | |
| 2010/0254620 A1 | 10/2010 | Iwahashi et al. | |
| 2010/0322317 A1 | 12/2010 | Yoshimatsu et al. | |
| 2011/0200115 A1 | 8/2011 | Hayashi et al. | |
| 2015/0016507 A1 | 1/2015 | Amano et al. | |

FOREIGN PATENT DOCUMENTS

| | | |
|---|---|---|
| CN | 1853417 A | 10/2006 |
| CN | 101073264 A | 11/2007 |
| CN | 101419713 A | 4/2009 |
| CN | 101569203 A | 10/2009 |
| CN | 101803388 A | 8/2010 |
| JP | 6-351000 | 12/1994 |
| JP | 10-178644 | 6/1998 |
| JP | 2007-60487 | 3/2007 |
| JP | 2007-60488 | 3/2007 |
| JP | 2008-42571 | 2/2008 |
| JP | 2008-66973 | 3/2008 |
| JP | 2008-252874 | 10/2008 |
| JP | 2009-27693 | 2/2009 |
| JP | 2010-35146 | 2/2010 |
| JP | 2010-136245 | 6/2010 |
| JP | 2010/141513 | 6/2010 |
| JP | 2010-166533 | 7/2010 |
| WO | 02/35852 | 5/2002 |
| WO | 2009/142021 | 11/2009 |
| WO | 2009/150808 A1 | 12/2009 |
| WO | 2010/041472 | 4/2010 |
| WO | 2010/067505 | 6/2010 |

OTHER PUBLICATIONS

International Search Report issued Oct. 18, 2011 in corresponding International Application No. PCT/JP2011/005074.

Thomas Wiegand et al., "Overview of the H.264/AVC Video Coding Standard", IEEE Transactions on Circuits and Systems for Video Technology, vol. 13, No. 7, Jul. 2003, pp. 560-576.

Yen-Kuang Chen et al., "Implementation of H.264 encoder and decoder on personal computers", Journal of Visual Communication and Image Representation, Available online Jul. 2005, pp. 509-532.

Extended European Search Report issued Feb. 27, 2014 in corresponding European Application No. 11 824 746.9.

Florian H. Seitner et al., "Evaluation of data-parallel splitting approaches for H.264 decoding", Advances in Mobile Computing and Multimedia, Nov. 24-Nov. 26, 2008, pp. 40-49, XP058024044, DOI: 10.1145/1497185.1497198, ISBN: 978-1-60558-269-6.

Chinese Office Action issued Jul. 1, 2015 in corresponding Chinese Patent Application No. 201180007180.0 with partial English translation.

Chinese Office Action and Search Report mailed May 25, 2015, in corresponding Chinese Application No. 201180003835.7 (with English translation of Search Report).

* cited by examiner

SC : Start code
SH : Slice header

SC : Start code
SH : Slice header mvp = median(mvA, mvB, mvC)
mv = mvp + mvd mvp : Estimated motion vector
mvd : Differential motion vector Decoding unit 5

Decoding unit 6

Time

[n] This indicates that a macroblock at the address n is being processed.

Decoding unit 1300a

Decoding unit 1300b

Time

[n] This indicates that a macroblock at the address n is being processed.

— — — Waiting time until the start of the process

IMAGE DECODING DEVICE, IMAGE CODING DEVICE, METHODS THEREOF, PROGRAMS THEREOF, INTEGRATED CIRCUITS THEREOF, AND TRANSCODING DEVICE

BACKGROUND OF INVENTION

1. Technical Field

The present invention relates to image decoding devices that decode coded images, image coding devices that code images, and so forth. In particular, the present invention relates to an image decoding device that performs parallel decoding, an image coding device that performs parallel coding, and so forth.

2. Background Art

A conventional image coding device for coding a video sequence divides each picture included in the video sequence into macroblocks, and performs coding for each of the macroblocks. The size of a macroblock is 16 pixels high and 16 pixels wide. Then, the conventional image coding device generates a coded stream, that is, a coded video sequence. After this, a conventional image decoding device decodes this coded stream on a macroblock-by-macroblock basis to reproduce the pictures of the original video sequence.

The conventional coding methods include the International Telecommunication Union Telecommunication Standardization Sector (ITU-T) H.264 standard (see Non Patent Literature 1, for example). The H.264 standard employs variable-length coding. By the variable-length coding process, each macroblock is coded into a variable-length code. Moreover, in each of processes such as intra-picture prediction, motion vector calculation, and deblocking filtering based on the H.264 standard, there is a data dependency relationship between a target macroblock to be coded or decoded and another macroblock adjacent to this target macroblock.

FIG. 47 is a diagram showing the data dependency relationship.

As shown in FIG. 47, when intra-picture prediction is performed on a decoding-target macroblock MBx, pixels in macroblocks MBa to MBd adjacent to the target macroblock MBx are used. Similarly, when a motion vector of the target macroblock MBx is calculated, motion vectors of the macroblocks MBa to MBc adjacent to the target macroblock MBx are used. Moreover, when deblocking filtering is performed on the target macroblock MBx, the pixels in the macroblocks MBa and MBb adjacent to the target macroblock MBx are used.

In view of this, the image decoding device based on the H.264 standard usually needs to decode each of the macroblocks included in the current picture from the beginning of the coded stream. For this reason, the image decoding device and the image coding device adopting the H.264 standard usually cannot employ parallel processing with which the processing speed is increased. This means that each of these image decoding and coding devices has to speed up the processing by increasing an operating frequency.

Here, some of the conventional technologies solve such a problem (see Patent Literature 1, for example).

FIG. 48A is a block diagram showing a configuration of an image decoding device disclosed in Patent Literature 1 mentioned above.

As shown in FIG. 48A, an image decoding device 1000 in Patent Literature 1 includes two decoding units (codec elements) 1300a and 1300b which operate in parallel. This allows performance to be increased. To be more specific, a stream analysis unit 1100 supplies a coded stream to each of the two decoding units 1300a and 1300b, and a macroblock pipeline control unit 1200 controls pipeline operations performed by the two decoding units 1300a and 1300b. Here, each of the decoding units 1300a and 1300b includes a VLC 1301 which performs variable-length decoding, a TRF 1302 which performs inverse quantization and inverse frequency transform, and an MC 1303 which performs motion compensation. That is, each of the decoding units 1300a and 1300b performs variable-length decoding, inverse quantization, inverse frequency transform, and motion compensation to decode a target macroblock (i.e., to perform inter-picture prediction decoding).

FIG. 48B is a diagram explaining an operation performed by the image decoding device 1000 disclosed in Patent Literature 1.

In Patent Literature 1, as shown in FIG. 48B, the macroblock pipeline control unit 1200 causes positions of macroblocks respectively decoded by the decoding units 1300a and 1300b to be shifted from each other by two macroblocks in a horizontal direction (and by one macroblock in a vertical direction). Moreover, the macroblock pipeline control unit 1200 causes each of the decoding units 1300a and 1300b to perform a decoding sub-process (one of variable-length decoding, inverse quantization, inverse frequency transform, and motion compensation) on a corresponding one of the two target macroblocks, for each time slot (TS) within a length of the TS. More specifically, the macroblock pipeline control unit 1200 controls the decoding units 1300a and 1300b so that each of the decoding units 1300a and 1300b decodes one macroblock for each predetermined period within a length of the predetermined period. In other words, the decoding units 1300a and 1300b are controlled so as to operate in synchronization with each other on a macroblock-by-macroblock basis. In this way, the data dependency relationship is maintained, and decoding is accordingly performed by parallel processing.

CITATION LIST

Patent Literature

[PTL 1]
Japanese Unexamined Patent Application Publication No. 2008-42571

Non Patent Literature

[NPL 1]
Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-19.

SUMMARY OF INVENTION

The image decoding device 1000 disclosed in Patent Literature 1, however, has a problem that the efficiency of decoding cannot be increased.

More specifically, in the image decoding device 1000 in Patent Literature 1, among the processes necessary for decoding, the processes performed in parallel by the two decoding units 1300a and 1300b are only variable-length decoding, inverse quantization, inverse frequency transform, and motion compensation. Here, deblocking filtering is a process that changes not only a pixel value of a target macroblock processed one of the decoding units is changed, but also a pixel value of a macroblock processed by the other decoding unit. In general, such deblocking filtering is performed sequentially on the individual macroblocks, after the aforementioned processes such as variable-length decoding are performed on the target macroblock and the adjacent macroblocks and reconstructed images in these macroblocks are stored in a frame memory. For this reason, time for this deblocking filtering process is required and other processes cannot be performed during this time. On this account, a speedup of the overall decoding processing cannot be sufficiently achieved, meaning that the decoding efficiency cannot be increased.

The macroblocks processed by the two decoding units 1300a and 1300b are stored in the frame memory. Then, the deblocking filtering process is performed on the macroblock read out from the frame memory. Therefore, the number of times the frame memory is accessed is increased.

In view of the aforementioned problem, the present invention has an object to provide an image decoding device and the image decoding method capable of increasing decoding efficiency and coding efficiency and of reducing the number of memory accesses.

In order to solve the aforementioned problem, the image decoding device in an aspect of present invention is an image decoding device that decodes coded image data including a coded picture having a plurality of macroblock lines each of which has a plurality of macroblocks aligned in a row, the image decoding device including: a division unit which divides the picture into first coded image data and second coded image data by assigning, at least for each of the macroblock lines included in the picture, the macroblock line as a part of one of the first coded image data and the second coded image data; and a first decoding unit and a second decoding unit which decode, in parallel, the macroblock line included in the first coded image data and the macroblock line included in the second coded image data, respectively, and store the decoded macroblock lines into a frame storage unit, the macroblock lines decoded by the first decoding unit and the second decoding unit being adjacent to each other in the picture, wherein the first decoding unit: decodes the first coded image data using second decoding result information stored in an information storage unit and stores, as first decoding result information, a part of information generated as a result of the decoding into the information storage unit; and when decoding a target macroblock included in the first coded image data, performs image processing on the second decoding result information and the target macroblock and stores at least a part of each of the image-processed target macroblock and the image-processed second decoding result information into the frame storage unit, the second decoding result information indicating at least a part of an other macroblock that has been decoded by the second decoding unit and is included in an other macroblock line adjacent to the macroblock line including the target macroblock, and the second decoding unit: decodes the second coded image data using the first decoding result information stored in the information storage unit and stores, as the second decoding result information, a part of information generated as a result of the decoding into the information storage unit; and when decoding a target macroblock included in the second coded image data, performs image processing on the first decoding result information and the target macroblock and stores at least a part of each of the image-processed target macroblock and the image-processed first decoding result information into the frame storage unit, the first decoding result information indicating at least a part of an other macroblock that has been decoded by the first decoding unit and is included in an other macroblock line adjacent to the macroblock line including the target macroblock.

For example, the first decoding unit may perform the image processing to change at least one pixel value of the other decoded macroblock, the pixel value being indicated by the second decoding result information, and the second decoding unit may perform the image processing to change at least one pixel value of the other decoded macroblock, the pixel value being indicated by the first decoding result information. To be more specific, the first decoding unit may perform, as the image processing, a deblocking filtering process on the second decoding result information and the target macroblock, and the second decoding unit may perform, as the image processing, a deblocking filtering process on the first decoding result information and the target macroblock.

With this, the image processing, such as the deblocking filtering process performed across the macroblock lines, is performed on the first and second coded image data (the divided streams) in parallel. Thus, a speedup of the overall decoding processing can be sufficiently achieved, resulting in an increase in decoding performance or decoding efficiency.

After the macroblock is decoded and stored in the frame storage unit (namely, the frame memory) by the first or second decoding unit, this means that the deblocking filtering process has been performed on this macroblock. Therefore, unlike the case where the deblocking filtering process needs to be performed after the macroblock is stored in the frame storage unit, it is not necessary to take the trouble to read the macroblock from the frame storage unit. This can reduce the number of times the frame storage unit is accessed.

In the image decoding device in an aspect of the present invention, the coded image data (i.e., the coded stream) is divided into the first and second coded image data (i.e., the divided streams) and the first and second coded image data are decoded in parallel by the first and second decoding units, respectively. Thus, the image decoding device can omit the macroblock pipeline control unit disclosed in Patent Literature 1 that collectively controls timings of decoding performed by the decoding units. Moreover, even in the case where the image decoding device divides the coded image data into three or more sets of data and includes many decoding units to decode these sets of data in parallel, it is not necessary to place a signal line between the macroblock pipeline control unit and each of the decoding units as in Patent Literature 1. Thus, the image decoding device can be easily implemented. Furthermore, in the image decoding device in an aspect of the present invention, the first and second decoding result information (i.e., neighboring information) required according to the dependency relationship between the data on the basis of the H.264 standard is sent and received between the first and second decoding units via the information storage unit (i.e., a neighboring information memory). Therefore, when the first or second decoding result information necessary for decoding is stored in the information storage unit, the corresponding first or second decoding unit can continue decoding the first or second coded image data using the stored first or second decoding result information without having to wait for the other decoding unit to finish decoding. Accordingly, unlike the image decoding device disclosed in Patent Literature 1, no loss of time is caused since the decoding processing is not interrupted, thereby increasing the decoding efficiency.

Moreover, the image decoding device may further include the information storage unit including a first information storage unit and a second information storage unit, wherein the first decoding unit reads the second decoding result information from the first information storage unit, uses the read second decoding result information in decoding the first coded image data, and stores the first decoding result information into the second information storage unit, and the second decoding unit reads the first decoding result information from the second information storage unit, uses the read first decoding result information in decoding the second coded image data, and stores the second decoding result information into the first information storage unit.

As described, the first and second information storage units are provided. Since the first information storage unit stores the second decoding result information and the second information storage unit stores the first decoding result information, the access to the information storage unit from the first and second decoding units can be distributed. As a result, each access performance required of the first and second information storage units can be suppressed and, therefore, the image decoding device can be easily implemented.

It should be noted that the division unit may divide the picture into the first and second coded image data by assigning, for each of the macroblock lines, the macroblock line as a part of the first or second coded image data.

With this, since each of the macroblock lines in the picture is assigned as the first or second coded image data, the coded image data having a non-MBAFF structure based on the H.264 standard can be appropriately decoded.

Furthermore, when the coded picture has a macroblock adaptive frame field (MBAFF) structure, the division unit may divide the picture by assigning, for each pair of adjacent macroblock lines in the picture, the adjacent macroblock lines as a part of one of the first coded image data and the second coded image data.

With this, since each pair of two adjacent macroblock lines in the picture are assigned to the first or second coded image data, the coded image data having an MBAFF structure based on the H.264 standard can be appropriately decoded.

Moreover, the first decoding unit and the second decoding unit may perform decoding in synchronization with each other via the first information storage unit and the second information storage unit.

This can reduce a synchronization signal used for causing the plurality of decoding units to operate in parallel. As a result, the number of decoding units can be easily increased and the decoding performance can be easily increased.

Furthermore, when the second decoding result information necessary to decode the target macroblock included in the first coded image data is not stored in the first information storage unit, the first decoding unit may wait until the second decoding result information is stored and start decoding the target macroblock after the second decoding result information is stored, and when the first decoding result information necessary to decode the target macroblock included in the second coded image data is not stored in the second information storage unit, the second decoding unit may wait until the first decoding result information is stored and start decoding the target macroblock after the first decoding result information is stored.

With this, the first and second decoding units decode the target macroblocks in synchronization with each other. Then, after the decoding result information necessary to decode the target macroblock is stored in the information storage unit, decoding of this target macroblock is started. Thus, an idle time can be eliminated, and the coded image data can be efficiently decoded. In addition, each operating frequency of the decoding units can be suppressed.

Moreover, the image decoding device may further include: a first switch that switches information to be stored into the first information storage unit, between first information and second information; and a second switch that switches information to be stored into the second information storage unit, between third information and fourth information, wherein, when the information to be stored into the first information storage unit is switched to the first information by the first switch and the information to be stored into the second information storage unit is switched to the third information by the second switch, the first decoding unit stores the first decoding result information as the third information into the second information storage unit and the second decoding unit stores the second decoding result information as the first information into the first information storage unit, and when the information to be stored into the first information storage unit is switched to the second information by the first switch and the information to be stored into the second information storage unit is switched to the fourth information by the second switch, the first decoding unit further reads the second information from the first information storage unit, uses the read second information in decoding an other piece of coded image data, and stores, as new second information, a part of information generated as a result of the decoding into the first information storage unit and the second decoding unit further reads the fourth information from the second information storage unit, uses the read fourth information in decoding the coded image data, and stores, as new fourth information, a part of information generated as a result of the decoding into the second information storage unit.

With this, when the information to be stored in the first and second information storage units are respectively switched to the first and third information by the first and second switches, the first and second coded image data are decoded in parallel. When the information to be stored in the first and second information storage units are respectively switched to the second and fourth information by the first and second switches, the coded image data and the other coded image data are coded at the same time. Accordingly, the first and second switches allows the processing to be switched between: the processing of dividing one set of coded image data and decoding the divided sets of coded image data; and the processing of decoding the independent two sets of coded image data at the same time. This can enhance the convenience of the image decoding device.

Furthermore, the image decoding device may further include a switch that switches data to be divided by the division unit, between the coded image data and an other piece of coded image data, wherein, when the data to be divided is switched to the coded image data by the switch, the division unit divides the picture included in the coded image data, and when the data to be divided is switched to the other coded image data by the switch, the division unit divides a picture included in the other coded image data.

With this, the image decoding device can perform decoding by temporally switching between the two sets of coded image data. For example, after the picture included in the coded image data is decoded, the data to be divided is switched to the other coded image data. As a result, a picture included in the other coded image data is divided and then decoded. After this, the data to be divided is switched to the coded image data again. In this way, switching is performed on a picture-by-picture basis, so that the two sets of coded image data can be decoded at the same time.

Moreover, the image decoding device may further include a picture output unit which (i) reads, from the frame storage unit, video obtained as a result of decoding the first and second coded image data, (ii) subsamples, in time, a picture included in the video so that the video is displayed at a frame rate set by a display device, and (iii) outputs, to the display device, the video from which the picture has been subsampled in time.

With this, the coded image data is decoded at high speed, and pictures included in a video sequence generated as a result of this decoding process are subsampled in time. Then, since the video sequence from which the pictures have been subsampled in time is outputted to a display device, the display device can smoothly display the video sequence in fast-forward. Since the coded image data is decoded by the two decoding units, the pictures are decoded at a frame rate which is, for example, twice as fast as a normal frame rate. However, the display device is configured to display the pictures at the normal frame rate. Here, in the case of the image decoding device in an aspect of the present invention, the video sequence is outputted after one out of every two pictures of the video sequence stored in the frame storage unit is subsampled in time so that the video sequence is displayed at the frame rate set in the display device. Accordingly, the video sequence in fast-forward is displayed by the display device as described above.

Furthermore, the frame storage unit may include a first frame storage unit and a second frame storage unit, the first decoding unit may read, from the first frame storage unit, a reference image referenced for decoding the first coded image data and write a result of decoding the first coded image data into the first frame storage unit and the second frame storage unit, and the second decoding unit may read, from the second frame storage unit, a reference image referenced for decoding the second coded image data and write a result of decoding the second coded image data into the first frame storage unit and the second frame storage unit.

As described, the first and second frame storage units are provided. The first decoding unit reads a reference image from the first frame storage unit, and the second decoding unit reads a reference image from the second frame storage unit. Therefore, the access to the frame storage unit from the first and second decoding units can be distributed and the number of reference images to be transferred from one frame storage unit can be reduced. As a result, each access performance required of the first and second frame storage units can be suppressed and, therefore, the first and second frame storage units can be easily implemented. This allows the image decoding device to be implemented at low cost.

Moreover, the image coding device in an aspect of present invention is an image coding device that codes image data including a picture having a plurality of macroblock lines each of which has a plurality of macroblocks aligned in a row, the image coding device including: a first coding unit and a second coding unit which read first image data and second image data, respectively, from the image data stored in a frame storage unit, and code, in parallel, the read first image data and the read second image data to generate first coded image data and second coded image data; and a connection unit which connects the first coded image data and the second coded image data so that macroblock lines respectively included in the first coded image data and the second coded image data generated by the first coding unit and the second coding unit are adjacent to each other in the picture, wherein the first coding unit: codes the first image data using second coding result information stored in an information storage unit and stores, as first coding result information, a part of information generated as a result of the coding into the information storage unit; and when coding a target macroblock included in the first image data, performs image processing on the second coding result information and the target macroblock and stores at least a part of each of the image-processed target macroblock and the image-processed second coding result information into the frame storage unit, the second coding result information indicating at least a part of an other macroblock that is included in an other macroblock line adjacent to the macroblock line including the target macroblock, and the second coding unit: codes the second image data using the first coding result information stored in the information storage unit and stores, as the second coding result information, a part of information generated as a result of the coding into the information storage unit; and when coding a target macroblock included in the second image data, performs image processing on the first coding result information and the target macroblock and stores at least a part of each of the image-processed target macroblock and the image-processed first coding result information into the frame storage unit, the first coding result information indicating at least a part of an other macroblock that is included in an other macroblock line adjacent to the macroblock line including the target macroblock.

With this, the image processing, such as the deblocking filtering process performed across the macroblock lines, is performed on the first and second image data in parallel. Thus, a speedup of the overall coding processing can be sufficiently achieved, resulting in an increase in coding performance or coding efficiency.

After the macroblock is stored into the frame storage unit (namely, the frame memory) by the first or second coding unit, this means that the image processing such as the deblocking filtering process has been performed on this macroblock. Therefore, unlike the case where the image processing needs to be performed after the macroblock is stored in the frame storage unit, it is not necessary to take the trouble to read the macroblock from the frame storage unit. This can reduce the number of times the frame storage unit is accessed.

In the image coding device in an aspect of the present invention, the first and second image data included in the image data (i.e., the image) are coded in parallel and then connected. Thus, the image coding device can omit a control unit that collectively controls timings of coding performed by the coding units. Moreover, even in the case where the image coding device includes many coding units each of which codes a part of the image data, it is not necessary to place a signal line between the aforementioned control unit and each of the coding units. Thus, the image coding device can be easily implemented. Furthermore, in the image coding device in an aspect of the present invention, the first and second coding result information (i.e., neighboring information) required according to the dependency relationship between the data on the basis of the H.264 standard is sent and received between the first and second coding units via the information storage unit (i.e., a neighboring information memory). Therefore, when the first or second coding result information necessary for decoding is stored in the information storage unit, the corresponding first or second coding unit can continue coding the first or second image data using the stored first or second coding result information without having to wait for the other coding unit to finish coding. Accordingly, no loss of time is caused since the coding processing is not interrupted, thereby increasing the coding efficiency. Moreover, the plurality of coding units operate in parallel, thereby performing the coding process at high speed and increasing the processing performance.

It should be noted that the present invention can be implemented not only as the image decoding device and the image coding device, but also as: methods of operations thereof; programs causing a computer to execute the operations; recording media having the programs recorded thereon; integrated circuits having some or all of the functions of the image decoding device and the image coding device; and transcoding devices including one of and both the image decoding device and the image coding device.

The image decoding device and the image coding device according to the present invention are capable of increasing the decoding efficiency and the coding efficiency and of reducing the number of memory accesses.

DETAILED DESCRIPTION OF INVENTION

The following is a description of an image decoding device and an image coding device in Embodiments according to the present invention, with reference to the drawings.

Embodiment 1

1-1. Overview

Firstly, an overview of an image decoding device according to Embodiment 1 of the present invention is described.

In the image decoding device in Embodiment 1, a stream division unit reads a coded stream generated as a result of coding an image, divides the coded stream so that two decoding units can perform decoding in parallel, and then stores the two divided streams generated as a result of the division into two buffers, respectively. Each of the two decoding units reads the divided stream stored in the buffer and decodes the read divided stream. Here, the decoding units decode the divided streams in synchronization with each other, by reference to each other's partial decoding result via a neighboring information memory.

1-2. Configuration

Next, a configuration of the image decoding device according to Embodiment 1 is described.

Figure 1:
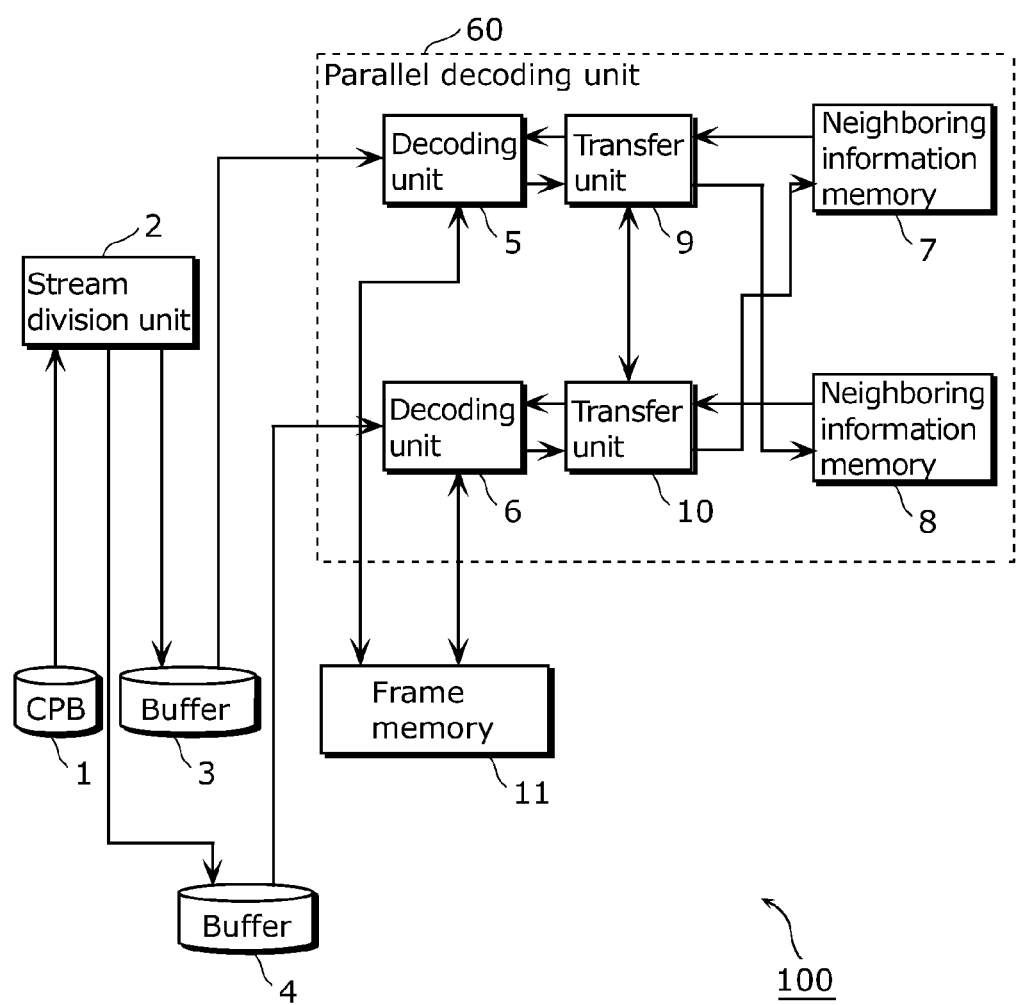
FIG. 1 is a block diagram showing a configuration of an image decoding device in Embodiment 1 according to the present invention.

FIG. 1 is a block diagram showing the configuration of the image decoding device according to Embodiment 1.

An image decoding device 100 in Embodiment 1 includes: a coded picture buffer (CPB) 1 which buffers a coded stream; a stream division unit 2 which divides the coded stream; buffers 3 and 4 each of which stores a divided stream generated as a result of the division; decoding units 5 and 6 each of which performs decoding by, for example, variable-length decoding, inverse frequency transform, and motion compensation; neighboring information memories 7 and 8 each of which stores neighboring information that indicates a partial result of decoding a neighboring macroblock and is used for decoding a target macroblock; transfer units 9 and 10 which perform data transfer between the decoding units 5 and 6 and the neighboring information memories 7 and 8; and a frame memory 11 which stores decoded divided streams (i.e., decoded images). The decoding unit 5, the decoding unit 6, the neighboring information memory 7, the neighboring information memory 8, the transfer unit 9, and the transfer 10 are collectively called a parallel decoding unit 60. Note that neighboring macroblocks of the target macroblock refers to macroblocks located on the upper left, immediately above, upper right, and left of the target macroblock. Partial decoding results of three macroblocks out of these neighboring macroblocks, i.e., except for the macroblock located on the left of the target macroblock, are transferred as the aforementioned neighboring information by the transfer units 9 and 10.

Figure 2:
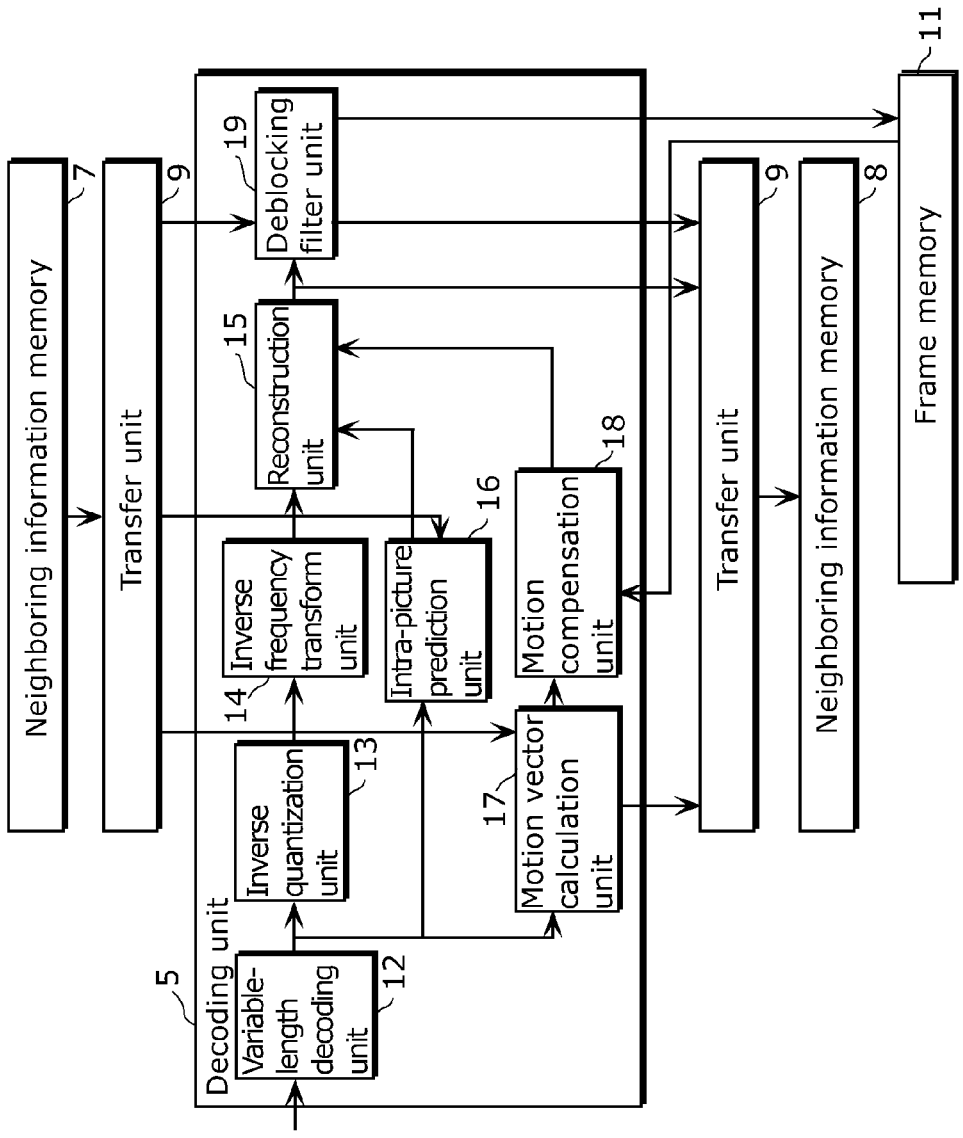
FIG. 2 is a block diagram showing a configuration of a decoding unit in Embodiment 1 according to the present invention.

FIG. 2 is a block diagram showing a configuration of the decoding unit 5 in Embodiment 1. Note that components in FIG. 2 which are identical to those in FIG. 1 are not explained again here. Note also that, in FIG. 2, the transfer unit 9 is divided into two, for convenience of explanation.

The decoding unit 5 includes: a variable-length decoding unit 12 which performs variable-length decoding; an inverse quantization unit 13 which performs an inverse quantization process; an inverse frequency transform unit 14 which performs an inverse frequency transform process; a reconstruction unit 15 which reconstructs an image (i.e., generates a reconstructed image) using data on which the inverse frequency transform process has been performed (i.e., the data on a difference image) and predicted data generated as a result of either motion compensation or intra-picture prediction; an intra-picture prediction unit 16 which generates a predicted image from four neighboring macroblocks within the current picture; a motion vector calculation unit 17 which calculates a motion vector; a motion compensation unit 18 which obtains a reference image located at a position indicated by the motion vector and then performs a filtering process on the obtained image to generate the predicted image; and a deblocking filter unit 19 which performs a deblocking filtering process on the reconstructed image to reduce block noise. It should be noted that a configuration of the decoding unit 6 is the same as that of the decoding unit 5.

1-3. Operation

Next, an operation performed by the image decoding device 100 shown in FIG. 1 and FIG. 2 is described.

Figure 3A:
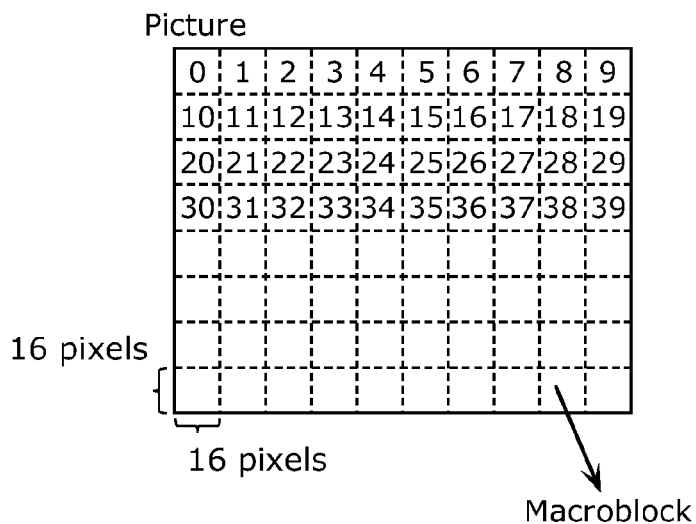
FIG. 3A is a diagram explaining a structure of a stream (namely, a picture) to be decoded by the image decoding device in Embodiment 1 according to the present invention.
Figure 3B:
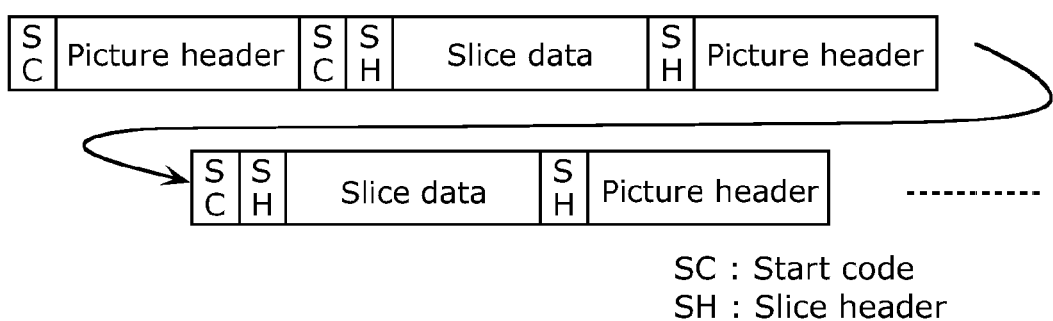
FIG. 3B is a diagram explaining a structure of a stream to be decoded by the image decoding device in Embodiment 1 according to the present invention.

FIG. 3A and FIG. 3B are diagrams each showing a structure of a coded stream.

As shown in FIG. 3A, one picture included in the coded stream includes a plurality of macroblocks each of which is 16 pixels high and 16 pixels wide. It should be noted that although the picture may include a slice having one or more macroblocks in some cases, the slice is not necessarily included in the case based on the H.264 standard. Thus, the slice is not illustrated in FIG. 3A. The decoding process is performed on a macroblock-by-macroblock basis. In FIG. 3A, a number shown inside a macroblock denotes a macroblock number (i.e., a macroblock address) indicating a number of the current macroblock in a usual order of coding.

In the coded stream as shown in FIG. 3B, a start code (SC) is firstly placed, and then a picture header follows. After this, the coded stream includes a start code, a slice header (SH), and slice data. That is, a stream of one picture (shown in FIG. 3A) is structured by such a data sequence. The picture header indicates information on various headers attached picture by picture, such as a picture parameter set (PPS) and a sequence parameter set (SPS) according to the H.264 standard. The start code is also called a synchronization word, and is structured by a specific pattern which does not appear in the coded data such as slice data. When such a coded stream is to be decoded, the start code is detected by searching the stream in order from the beginning. By doing so, a start position of the picture header or the slice header can be found.

The processing operation performed by the image decoding device 100 is roughly divided into two. In a first processing operation, the stream division unit 2 reads a coded stream from the CPB 1, divides the read coded stream into two, stores the two divided stream generated as a result of the division into the buffers 3 and 4, respectively. In a second processing operation, the divided streams are read from the buffers 3 and 4, and the decoding units 5 and 6 decode these divided streams in synchronization with each other. These two processing operations can be performed asynchronously.

Firstly, the first processing operation, that is, the coded-stream division is described.

The stream division unit 2 decodes the coded stream at least until a macroblock boundary is detected. Then, for each of the pictures included in the coded stream, the stream division unit 2 stores each of macroblock lines included in the current picture into the buffer 3 or 4. For example, a first macroblock line is stored into the buffer 3, a second macroblock line is stored into the buffer 4, and then a third macroblock line is stored into the buffer 3. In this way, the coded stream is divided into two and, as a result, the two divided streams are generated. Note that a macroblock line includes a plurality of macroblocks aligned in a row in a horizontal direction within the picture.

Figure 4A:
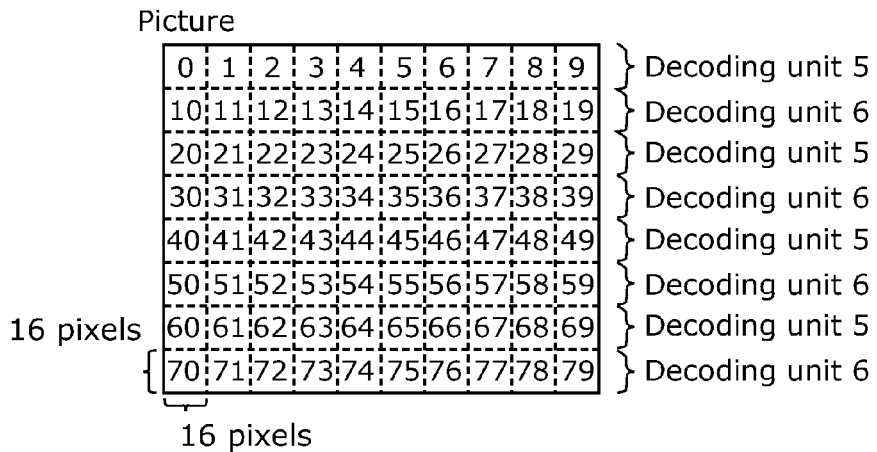
FIG. 4A is a diagram explaining processing divided between decoding units which operate in parallel, in Embodiment 1 according to the present invention.
Figure 4B:
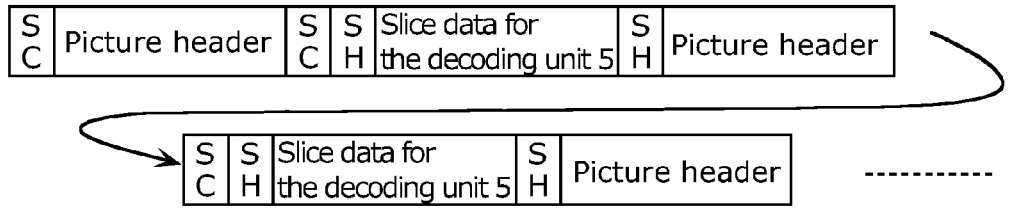
FIG. 4B is a diagram explaining processing divided between decoding units which operate in parallel (i.e., explaining a divided stream), in Embodiment 1 according to the present invention.
Figure 4C:
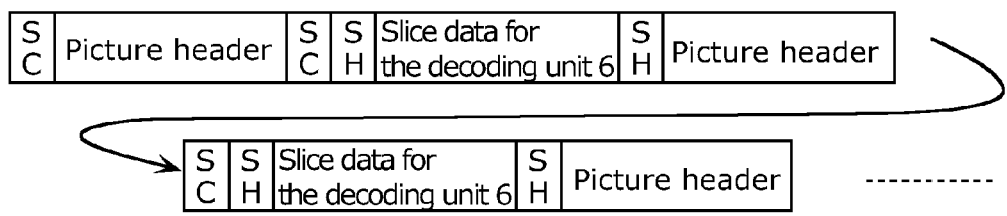
FIG. 4C is a diagram explaining processing divided between decoding units which operate in parallel (i.e., explaining a divided stream), in Embodiment 1 according to the present invention.

FIG. 4A, FIG. 4B, and FIG. 4C are diagrams showing macroblock lines to be decoded by the decoding unit 5 and the decoding unit 6.

As shown in FIG. 4A, the stream division unit 2 reads the coded stream from the CPB 1 and stores, into the buffer 3, a macroblock line having macroblock addresses 0 to 9 and a macroblock line having macroblock addresses 20 to 29 included in the read coded stream so that these macroblock lines are decoded by the decoding unit 5. Moreover, the stream division unit 2 stores, into the buffer 4, a macroblock line having macroblock addresses 10 to 19 and a macroblock line having macroblock addresses 30 to 39 included in the read coded stream so that these macroblock lines are decoded by the decoding unit 6. Here, as shown in FIG. 4B and FIG. 4C, the picture header and the slice header are replicated to be stored into both of the buffers 3 and 4. As a result, as shown in FIG. 4B, one of the two divided streams that is stored into the buffer 3 always includes the picture header immediately before the picture and always includes the slice header immediately before the slice data. Similarly, as shown in FIG. 4C, the other of the two divided streams that is stored into the buffer 4 always includes the picture header immediately before the picture and always includes the slice header immediately before the slice data.

For example, in the original coded stream before the division is executed, the macroblock lines having the macroblock addresses 0 to 9 and the macroblock line having the macroblock addresses 10 to 19 are included in the same slice. Moreover, the slice header of this slice is present before the macroblock whose macroblock address is 0 and is not present before the macroblock whose macroblock address is 10. In this case, when each of the plurality of macroblock lines included in the coded stream is simply stored into the buffer 3 or 4, the macroblock line having the macroblock addresses 10 to 19 does not include the slice header. For this reason, the stream division unit 2 replicates the slice header present before the macroblock whose macroblock address is 0 and then inserts this slice header immediately before the macroblock whose macroblock address is 10.

Furthermore, the stream division unit 2 decodes syntaxes (mb_qp_delta and mb_skip_run) which have dependence on the order of macroblocks and cannot be divided for each macroblock line, and performs conversion so that the syntaxes can be decoded in parallel for each macroblock line. For example, mb_qp_delta is a syntax obtained by coding a difference in a qp value (a quantization parameter) between the macroblocks. The stream division unit 2 converts mb_qp_delta corresponding to the first macroblock in the macroblock line into the qp value as it is, instead of the difference, and then stores the qp value into the buffer 3 or 4. Moreover, according to the H.264 standard, the stream division unit 2 stores mb_qp_delta corresponding to a macroblock other than the first macroblock, as the difference, into the buffer 3 or 4. Here, mb_skip_run is a syntax indicating the number of consecutive skip macroblocks. The stream division unit 2 converts this mb_skip_run into a value indicating the number of consecutive skip macroblocks for each macroblock line.

Details on such an operation performed by the stream division unit 2 are disclosed in International Publication No. WO 2010/041472 and International Publication No. WO 2010/067505 and, therefore, are not described here.

Next, a decoding operation performed by the decoding unit 5 and the decoding unit 6 is described.

Figure 47:
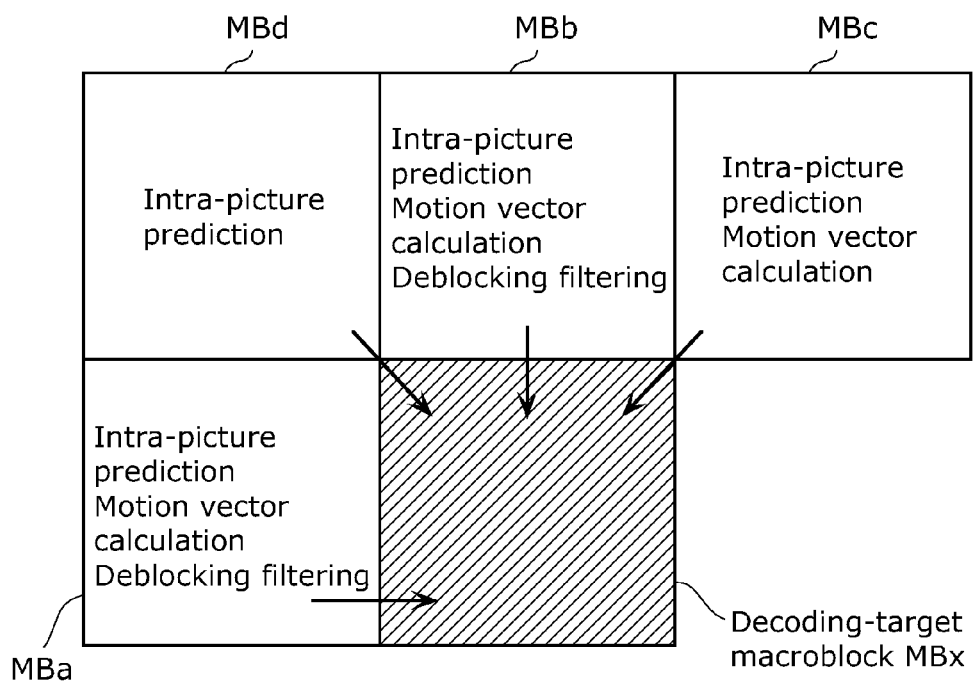
FIG. 47 is a diagram showing a data dependency relationship based on the H.264 standard.
Figure 48A:
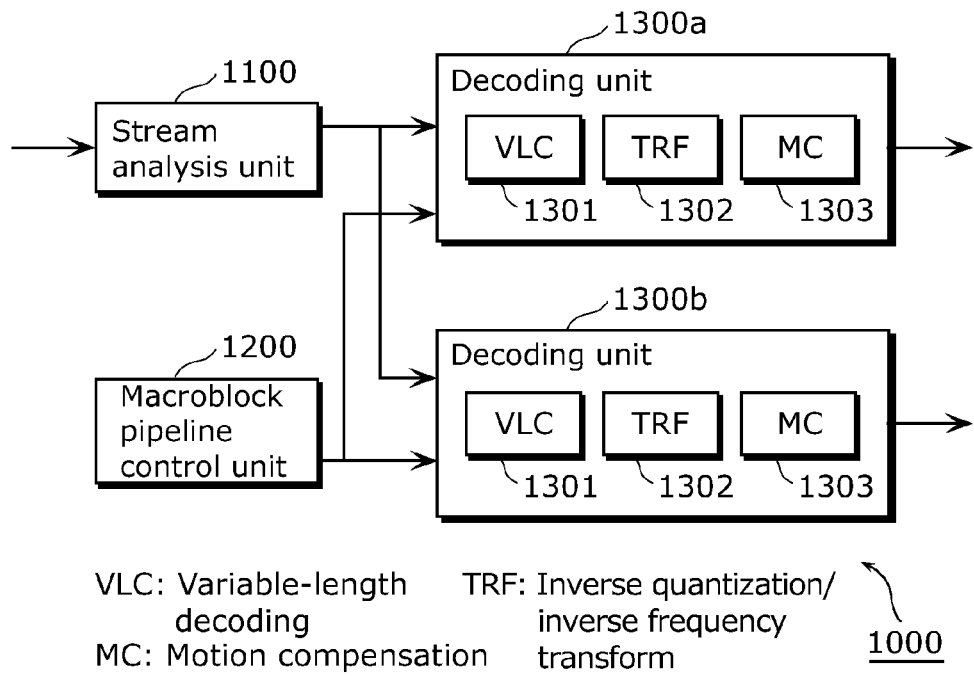
FIG. 48A is a block diagram showing a configuration of a conventional image decoding device.
Figure 48B:
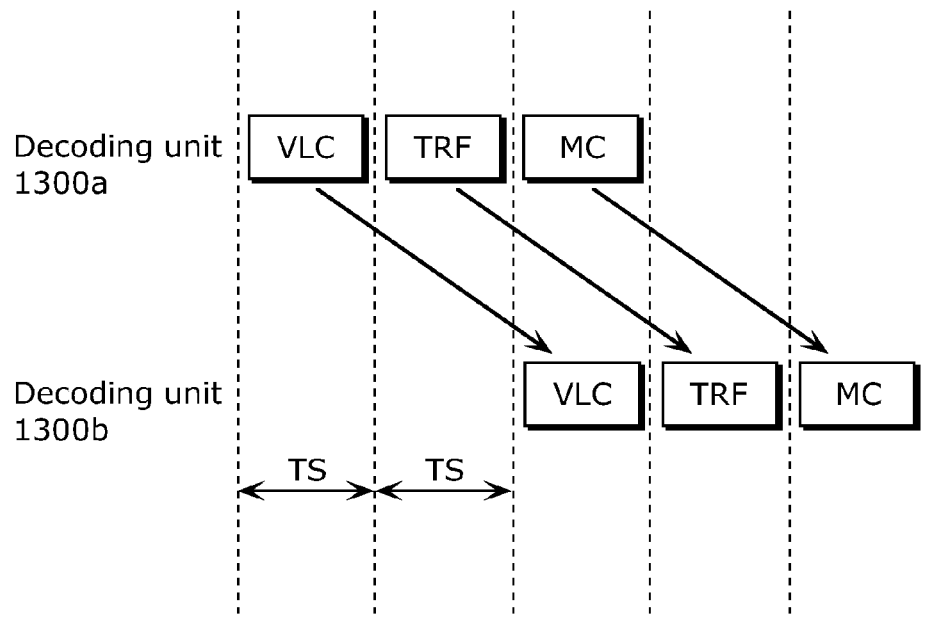
FIG. 48B is a diagram explaining an operation performed by the conventional image decoding device.

As shown in FIG. 47, when intra-picture prediction is to be performed on a decoding-target macroblock MBx, reconstructed images of neighboring macroblocks MBa to MBd located on the upper left, immediately above, upper right, and left of the target macroblock MBx are needed. When a motion vector of the target macroblock MBx is to be calculated, motion vectors of the neighboring macroblocks MBa to MBc located on the immediately above, upper right, and left of the target macroblock MBx are needed. Moreover, in the deblocking filtering process, results of the deblocking filtering process performed on the neighboring macroblocks MBb and MBa located on the immediately above and left of the target macroblock MBx are needed. Thus, when the coded stream is divided into macroblock lines as shown in FIG. 4A according to the H.264 standard, the two divided streams cannot be decoded in parallel without solving the data dependency between the target macroblock and the neighboring macroblocks, especially the macroblocks located on the upper side of the target macroblock. In view of this, the image decoding device 100 in Embodiment 1 decodes the two divided streams in parallel while maintaining the aforementioned data dependency, by shifting, in a horizontal direction, positions of two target macroblocks to be decoded in parallel. It should be noted that, in the description on the present invention, a neighboring macroblock located on the upper side is at least one of the neighboring macroblocks located on the upper left, immediately above, and upper right of the target macroblock.

Figure 5A:
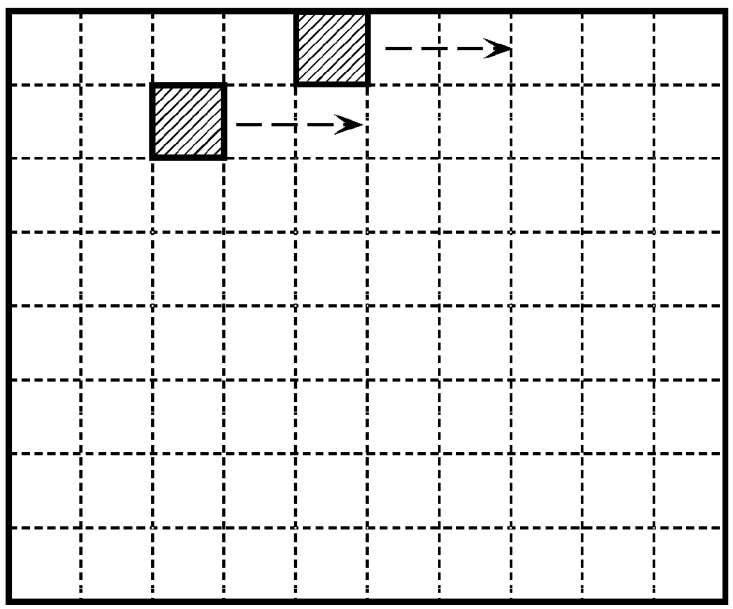
FIG. 5A is a diagram explaining each position of two target macroblocks to be decoded by the decoding units in parallel, in Embodiment 1 according to the present invention.
Figure 5B:
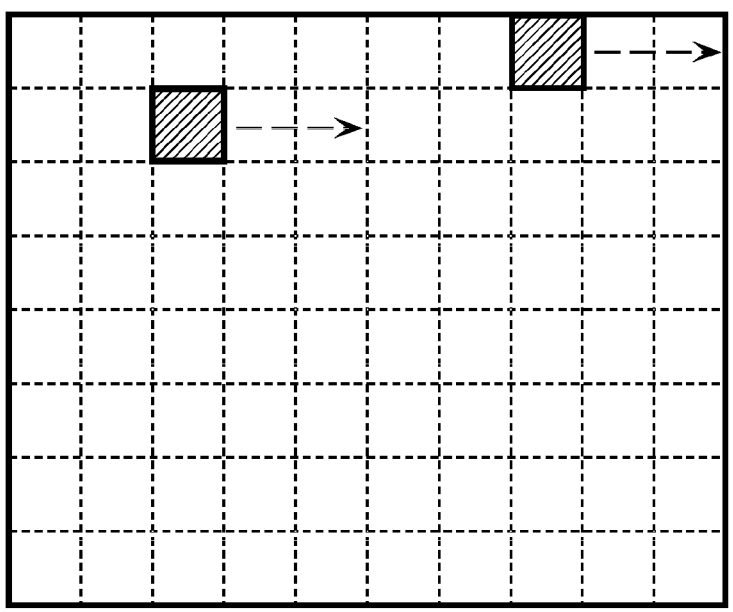
FIG. 5B is a diagram explaining each position of two target macroblocks to be decoded by the decoding units in parallel, in Embodiment 1 according to the present invention.

Each of FIG. 5A and FIG. 5B is a diagram showing the positions of the two target macroblocks to be decoded in parallel.

As shown in FIG. 5A, the target macroblock to be decoded by the decoding unit 5 may be located, in the horizontal direction, at least two macroblocks ahead of the target macroblock to be decoded by the decoding unit 6. In this case, the data dependency relationship between the target macroblock and the neighboring macroblocks shown in FIG. 47, especially the data dependency relationship between the target macroblock and the upper macroblocks can be solved, so that the decoding unit 5 and the decoding unit 6 can perform decoding in parallel at the same time. To be more specific, when the decoding units 5 and 6 decode two adjacent macroblock lines which are one above the other, the decoding unit 6 decodes, as the target macroblock, a macroblock located, in the horizontal direction, at least two macroblocks ahead on the left of the target macroblock to be decoded by the decoding unit 5.

Here, the positions of the target macroblocks to be decoded by the decoding unit 5 and the decoding unit 6 may be shifted from each other by at least two macroblocks in the horizontal direction. As shown in FIG. 5B, the positions may be shifted from each other by more than two macroblocks.

Figure 6:
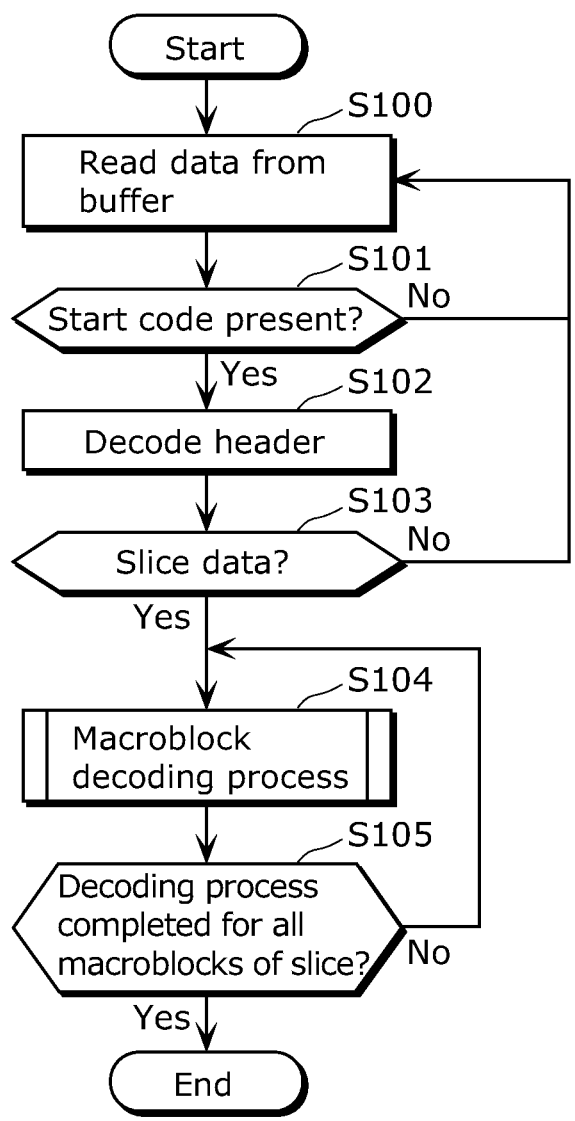
FIG. 6 is a flowchart showing slice decoding performed by the decoding unit of the image decoding device in Embodiment 1 according to the present invention.

Next, a method used by the decoding unit 5 and the decoding unit 6 for performing the decoding operation in synchronization with each other while maintaining the positional relationship shown in FIG. 5A or FIG. 5B is described, with reference to a flowchart shown in FIG. 6.

FIG. 6 is a flowchart showing slice decoding performed by the decoding unit 5 of the image decoding device 100.

It should be noted that, in Embodiment 1, the decoding unit 5 decodes the macroblock line having the macroblock addresses 0 to 9, the macroblock line having the macroblock addresses 20 to 29, and a macroblock line having macroblock addresses 40 to 49. Note also that the decoding unit 6 decodes the macroblock line having the macroblock addresses 10 to 19, the macroblock line having the macroblock addresses 30 to 39, and a macroblock line having macroblock addresses 50 to 59.

The variable-length decoding unit 12 of the decoding unit 5 reads, from the buffer 3, a part of data on the divided stream (S100). The variable-length decoding unit 12 searches the read data for the start code (S101). More specifically, the variable-length decoding unit 12 determines whether or not the read data includes the start code. When no start code is present (No in S101), the variable-length decoding unit 12 reads next data from the buffer 3 until the start code is detected (S100). When the start code is detected (Yes in S101), the variable-length decoding unit 12 decodes the header (S102). Based on the result of decoding the header, the variable-length decoding unit 12 determines whether or not data following the header is slice data (S103).

When it is determined that the data is not slice data (No in S103), the variable-length decoding unit 12 reads next data from the buffer 3 again (S101). On the other hand, when it is determined that the data is the slice data (Yes in S103), the decoding unit 5 performs the decoding process on the macroblocks included in the slice data (i.e., a slice) (S104). This macroblock decoding process is described in detail later. Then, the variable-length decoding unit 12 determines whether or not the decoding process is completed for all the macroblocks included in the slice (S105). When it is determined that the decoding process is not completed (No in S105), the decoding unit 5 performs the macroblock decoding process again (S104). On the other hand, when it is determined that the decoding process is completed for all the macroblocks included in the slice (Yes in S105), the decoding unit 5 terminates the decoding process for the current slice.

Figure 7:
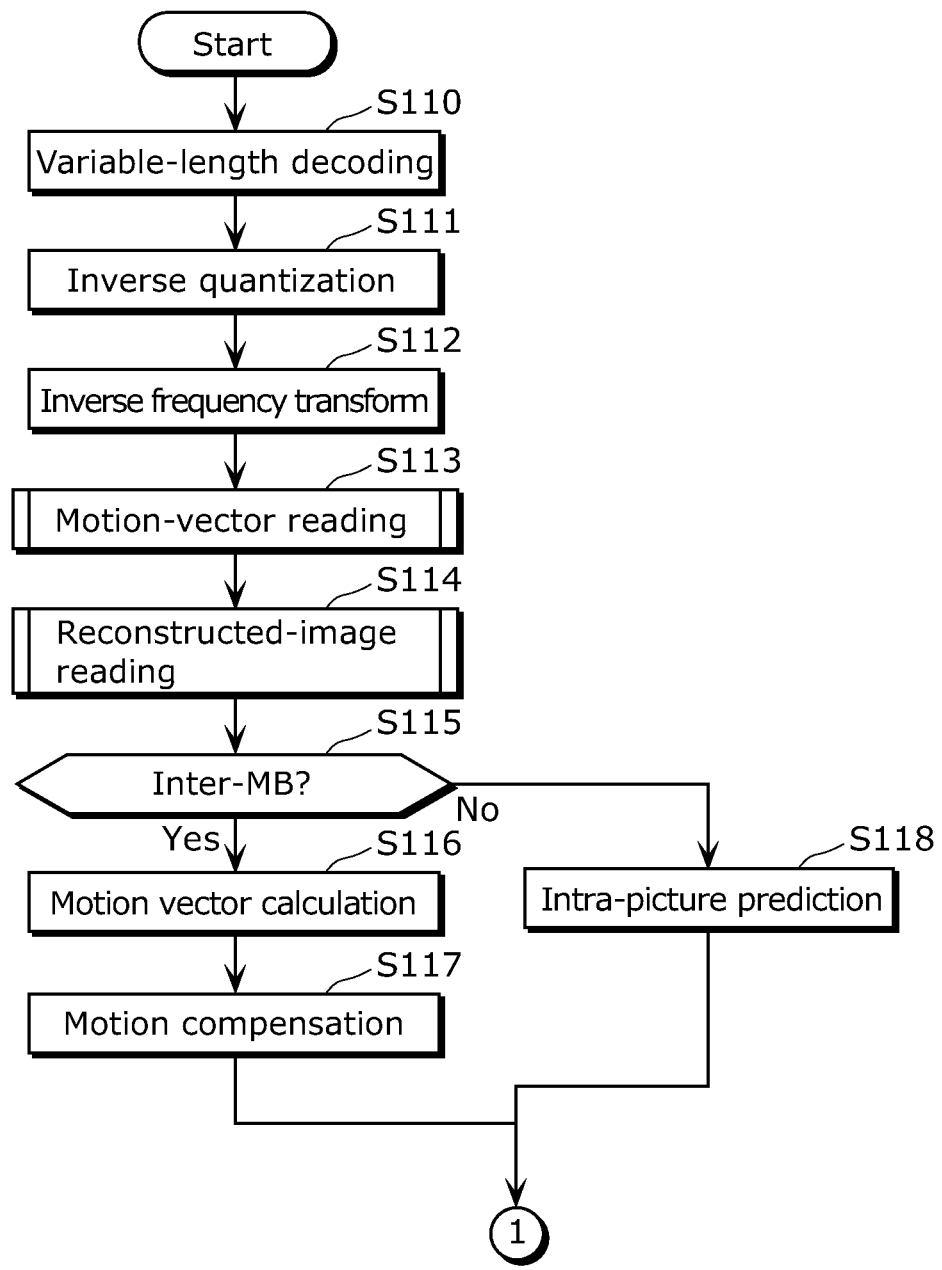
FIG. 7 is a flowchart showing macroblock decoding performed by the decoding unit of the image decoding device in Embodiment 1 according to the present invention.
Figure 8:
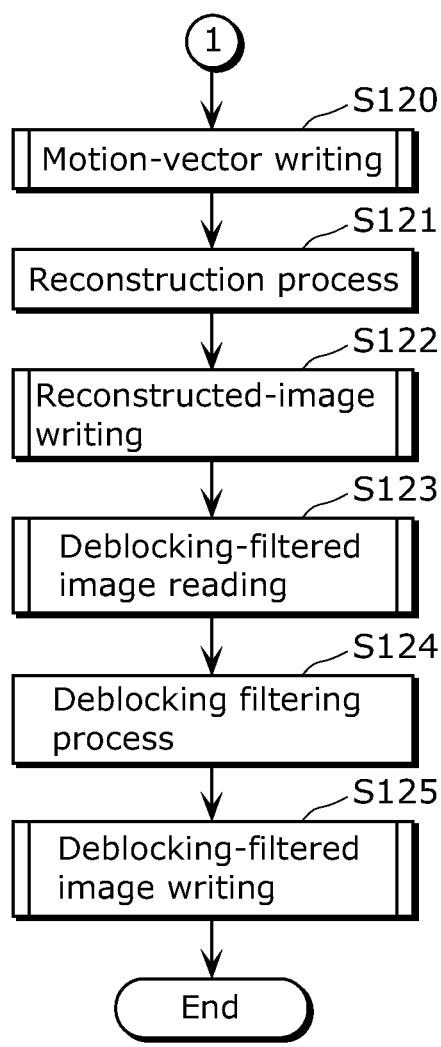
FIG. 8 is a flowchart showing macroblock decoding performed by the decoding unit of the image decoding device in Embodiment 1 according to the present invention.

Next, the macroblock decoding process (S104) in FIG. 6 is described in detail, with reference to flowcharts shown in FIG. 7 and FIG. 8.

Each of FIG. 7 and FIG. 8 is a flowchart showing the macroblock decoding process.

The variable-length decoding unit 12 performs a variable-length decoding process on the macroblock data read from the buffer 3 (S110). Next, the inverse quantization unit 13 performs inverse quantization on coefficient data obtained as a result of the variable-length decoding process (S111). Following this, the inverse frequency transform unit 14 performs inverse frequency transform on the inversely-quantized data (S112). Then, the motion vector calculation unit 17 reads, as the neighboring information, the motion vectors of the upper neighboring macroblocks from the neighboring information memory 7 via the transfer unit 9, for calculating the motion vector of the target macroblock in a later process (S113). This motion vector reading process (S113) is described in detail later. Moreover, the intra-picture prediction unit 16 reads, as the neighboring information, a part of the reconstructed images in the upper neighboring macroblocks from the neighboring information memory 7 via the transfer unit 9, for performing an intra-picture prediction on the target macroblock in a later process (S114). This reconstructed-image reading process (S114) is described in detail later.

Here, the decoding unit 5 determines whether or not the target macroblock is an inter-MB (which is a macroblock decoded by inter-picture prediction) (S115). When it is determined that the target macroblock is an inter-MB (Yes in S115), the motion vector calculation unit 17 calculates the motion vector of the target macroblock using the motion vectors of the upper neighboring macroblocks read in step S113 (S116).

The motion compensation unit 18 reads a reference image from the frame memory 11 on the basis of the motion vector calculated in step S116, and performs motion compensation based on the reference image to generate a predicted image (S117)

On the other hand, when it is determined in step S115 that the target macroblock is not an inter-MB (No in S115), that is, when the target macroblock is an intra-MB (which is a macroblock decoded by intra-picture prediction), the intra-picture prediction unit 16 performs intra-picture prediction on the target macroblock using the reconstructed images of the upper neighboring macroblocks read in step S114 (S118).

As shown in FIG. 8, the motion vector calculation unit 17 writes, as the neighboring information, the motion vector of the target macroblock calculated in step S116, into the neighboring information memory 8 via the transfer unit 9 (S120). The motion vector written as the neighboring information may be all calculated motion vectors, or may be only a motion vector used for calculating a motion vector of a lower macroblock. To be more specific, in step S120, instead of always writing the motion vector calculated in step S116 into the neighboring information memory 8, the motion vector calculation unit 17 may write the motion vector calculated in step S116 into the neighboring information memory 8 only when this motion vector is to be used for calculating the motion vector of the lower macroblock. Note that the process of writing the motion vector into the neighboring information memory (S120) is described in detail later.

Next, the reconstruction unit 15 generates a reconstructed image by adding: the predicted image generated by the motion compensation (S117) or the intra-picture prediction (S118); and a differential image generated by the inverse frequency transform in S112 (S121). Hereafter, the process of generating the reconstructed image in this way is referred to as the reconstruction process. Moreover, the reconstruction unit 15 writes, as the neighboring information, a part of the reconstructed image generated in step S121 into the neighboring information memory 8 via the transfer unit 9 (S122). Here, the reconstructed image to be written may be the entire reconstructed image, or may be only a part to be used in the intra-picture prediction performed on the lower macroblock. The reconstructed-image writing process (S122) is described later.

Next, the deblocking filter unit 19 reads, as the neighboring information, a part of the images in the upper neighboring macroblocks on which the deblocking filtering process has been performed (namely, the deblocking-filtered images), from the neighboring information memory 7 via the transfer unit 9 (S123). This process of reading the deblocking-filtered image is described later. The deblocking filter unit 19 performs the deblocking filtering process on the target macroblock using this deblocking-filtered image, and then writes the processing result (i.e., the decoded image) into the frame memory 11 (S124).

Next, out of the deblocking-filtered target macroblock and the deblocking-filtered left macroblock, the deblocking filter unit 19 writes, as the neighboring information, an image to be used in the deblocking filtering process performed on a lower macroblock (i.e., a writing-target deblocking-filtered image described later) into the neighboring information memory 8 via the transfer unit 9 (S125).

Figure 9:
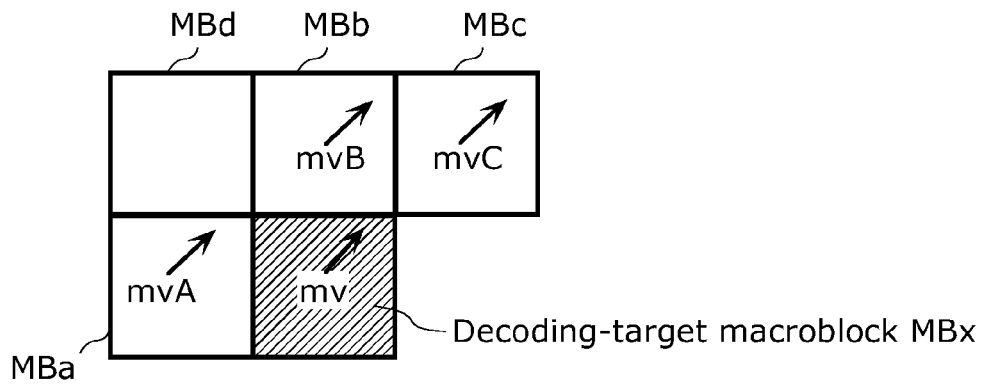
FIG. 9 is a diagram explaining a method of calculating a motion vector in Embodiment 1 according to the present invention.

FIG. 9 is a diagram explaining the motion vector calculation method used in step S116 in FIG. 7.

As shown in FIG. 9, when calculating a motion vector mv of the target macroblock MBx, the motion vector calculation unit 17 uses: motion vectors mvB and mvC of the neighboring macroblocks MBb and MBc respectively located on the immediately above and upper right of the target macroblock; and an already-calculated motion vector mvA of the neighboring macroblock MBa located on the left of the target macroblock MBx. Here, the motion vector calculation unit 17 can use the motion vectors mvB and mvC of the upper neighboring macroblocks MBb and MBc by reading these motion vectors mvB and mvC from the neighboring information memory 7 via the transfer unit 9 in advance (in step S113 in FIG. 7).

To be more specific, the motion vector calculation unit 17 calculates an estimated motion vector mvp of the motion vector my of the target macroblock MBx, by calculating a median value of the motion vectors mvA, mvB, and mvC. Then, the motion vector calculation unit 17 adds a differential motion vector mvd to the estimated motion vector mvp. As a result, the motion vector my of the target macroblock MBx is obtained. It should be noted here that the differential motion vector mvd is included in the divided stream (i.e., the coded stream) where the variable-length coding has been performed. Thus, the motion vector calculation unit 17 obtains, from the variable-length decoding unit 12, the differential motion vector mvd which has been variable-length decoded, and then calculated the aforementioned motion vector my using this differential motion vector mvd.

Figure 10:
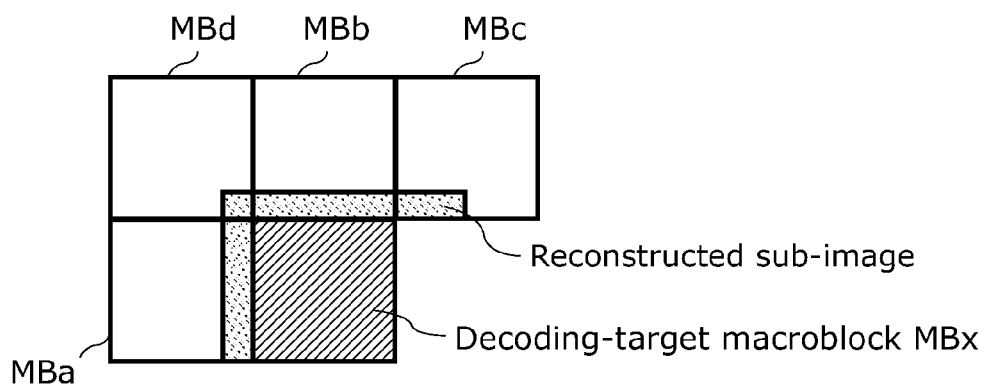
FIG. 10 is a diagram explaining intra-picture prediction in Embodiment 1 according to the present invention.

FIG. 10 is a diagram explaining the intra-picture prediction performed in step S118 of FIG. 7.

As shown in FIG. 10, the intra-picture prediction unit 16 performs the intra-picture prediction on the target macroblock Mbx using the reconstructed images of the neighboring macroblocks MBa to MBd located on the upper left, immediately above, upper right, and left of the target macroblock MBx, according to an intra-picture prediction mode. To be more specific, the intra-picture prediction unit 16 uses: a reconstructed sub-image having 1×16 pixels, in the reconstructed image of the neighboring macroblock MBa; a reconstructed sub-image having 4×1 pixels, in the reconstructed image of the neighboring macroblock MBd; a reconstructed sub-image having 16×1 pixels, in the reconstructed image of the neighboring macroblock MBb; and a reconstructed sub-image having 8×1 pixels, in the reconstructed image of the neighboring macroblock MBc. Here, the intra-picture prediction unit 16 can use the reconstructed sub-images of the upper neighboring macroblocks MBc and MBd by reading these reconstructed sub-images from the neighboring information memory 7 via the transfer unit 9 in advance (in step S114 in FIG. 7). It should be noted here that the intra-picture prediction mode is included in the divided stream (i.e., the coded stream) where the variable-length coding has been performed. Thus, the intra-picture prediction unit 16 obtains, from the variable-length decoding unit 12, the intra-picture prediction mode which has been variable-length decoded, and then performs the aforementioned intra-picture prediction according to the intra-picture prediction mode.

Figure 11:
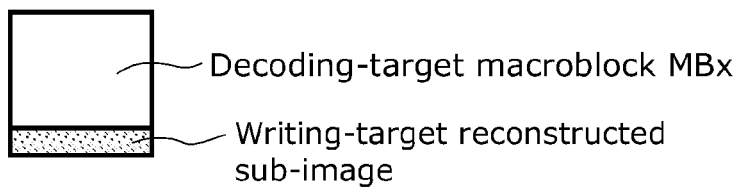
FIG. 11 is a diagram explaining reconstructed-image writing in Embodiment 1 according to the present invention.

FIG. 11 is a diagram explaining the reconstructed-image writing process performed in step S122 of FIG. 8.

As shown in FIG. 11, the reconstruction unit 15 writes, as a writing-target reconstructed sub-image, the lower image having 16×1 pixels in the reconstructed image of the target macroblock MBx, into the neighboring information memory 8 via the transfer unit 9 in step S122 of FIG. 8. More specifically, the writing-target reconstructed sub-image having 16×1 pixels is used as, for example, the reconstructed sub-image in the intra-picture prediction performed by the decoding unit 6 on another macroblock located below the target macroblock.

Figure 12A:
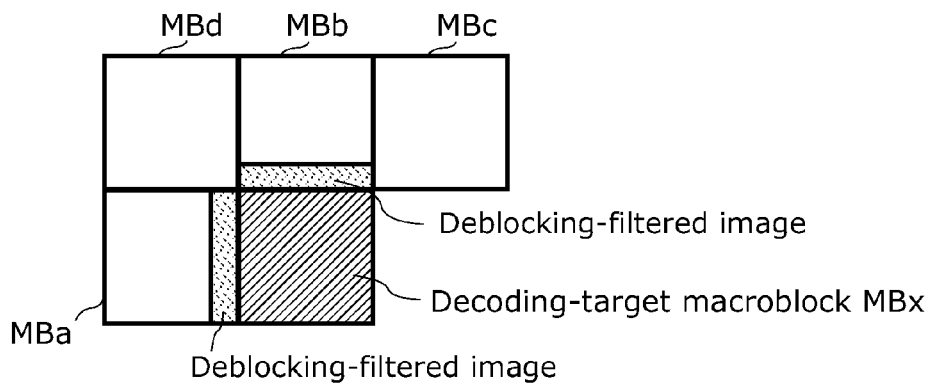
FIG. 12A is a diagram explaining a deblocking filtering process in Embodiment 1 according to the present invention.
Figure 12B:
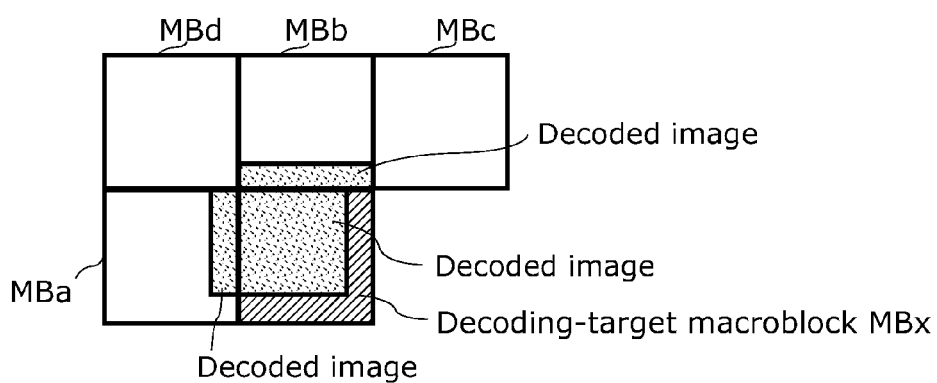
FIG. 12B is a diagram explaining the deblocking filtering process in Embodiment 1 according to the present invention.
Figure 12C:
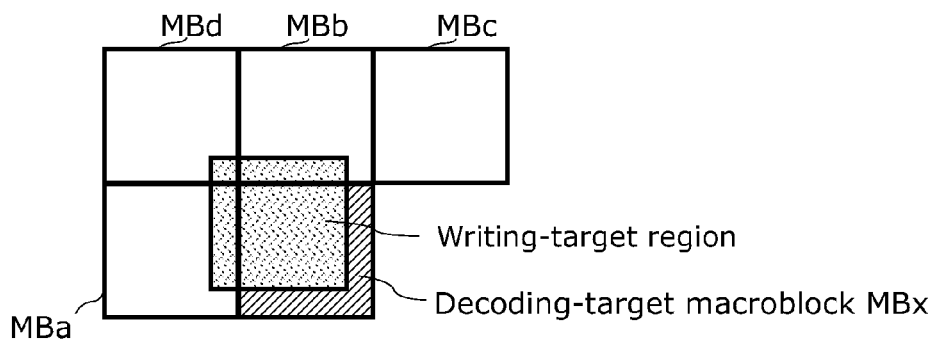
FIG. 12C is a diagram explaining the deblocking filtering process in Embodiment 1 according to the present invention.

Each of FIG. 12A to FIG. 12c is a diagram explaining the deblocking filtering process performed in step S124 of FIG. 8.

The deblocking filtering process is performed using three pixels on each side of a boundary between sub-blocks each having 4×4 pixels, that is, a total of six pixels is used. On this account, as shown in FIG. 12A, when the deblocking filtering process is to be performed on the target macroblock MBx, the deblocking-filtered image of the neighboring macroblock MBb located on the immediately above of the target macroblock MBx and the deblocking-filtered image of the neighboring macroblock MBa located on the left of the target macroblock MBx are needed. The deblocking-filtered image of the neighboring macroblock MBb has lower-side 16×3 pixels of the deblocking-filtered neighboring macroblock MBb. The deblocking-filtered image of the neighboring macroblock MBa has right-side 3×16 pixels of the deblocking-filtered neighboring macroblock MBa.

Then, when performing the deblocking filtering process on the target macroblock MBx, the deblocking filter unit 19 reads the deblocking-filtered image of the neighboring macroblock MBb from the neighboring information memory 7 via the transfer unit 9 in advance (step S123 in FIG. 8). Using the read deblocking-filtered image, the deblocking filter unit 19 performs the deblocking filtering process on the target macroblock MBx. Here, the deblocking filter unit 19 performs the deblocking filtering process for itself on the neighboring macroblock MBa. On this account, when performing the deblocking filtering process on the target macroblock MBx, the deblocking filter unit 19 already holds the deblocking-filtered image of the neighboring macroblock MBa.

As a result, the image having upper-left-side 13×13 pixels of the target macroblock MBx, the image having lower-side 16×3 pixels of the neighboring macroblock MBb, and the image having upper-right-side 3×13 pixels of the neighboring macroblock MBa are determined as decoded images, as shown in FIG. 12B. It should be noted that images having right-side and lower-side pixels of the target macroblock MBx are to be determined as decoded images when the deblocking filtering process is performed on the macroblocks located on the right of and below the target macroblock MBx.

Then, when writing the decoded images shown in FIG. 12B into the frame memory 11, the deblocking filter unit 19 writes a decoded image of a writing-target region shifted to the upper left by three pixels from the target macroblock MBx in order to avoid a reduction in transfer efficiency, as shown in FIG. 12C. Here, each of the three decoded images shown in FIG. 12B does not have a rectangle shape. For this reason, the transfer efficiency of when these decoded images are written into the frame memory 11 is lower as compared to the case where an image of a region having a rectangle shape is written. On account of this, the deblocking filter unit 19 writes the decoded image of the aforementioned writing-target region in the shape of a rectangle having 16×16 pixels, into the frame memory 11. It should be noted that, in such a writing process, a part of the decoded image in a lower right corner of the neighboring macroblock MBb is not written into the frame memory 11. However, when the deblocking filtering process is performed on the right-side macroblock of the target macroblock MBx, this part of the decoded image is to be written into the frame memory 11.

Figure 13:
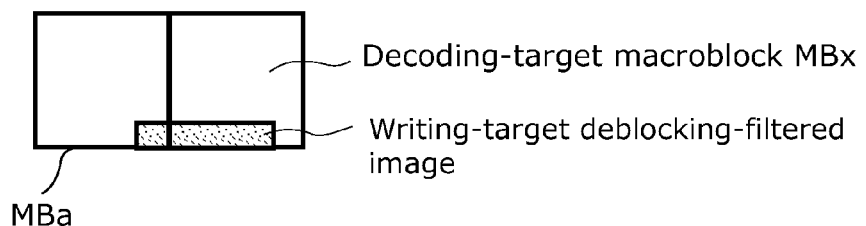
FIG. 13 is a diagram explaining writing of a deblocking-filtered image in Embodiment 1 according to the present invention.

FIG. 13 is a diagram explaining the process of writing the writing-target deblocking-filtered image in step S125 of FIG. 8.

As shown in FIG. 13, the deblocking filter unit 19 writes the writing-target deblocking-filtered image including a part of the deblocking-filtered image of the target macroblock MBx into the neighboring information memory 8 via the transfer unit 9, in step 125 of FIG. 8. This writing-target deblocking-filtered image includes an image having lower-left-side 13×3 pixels of the deblocking-filtered target macroblock MBx and an image having lower-right-side 3×3 pixels of the already deblocking-filtered image of the macroblock MBa located on the left of the target macroblock MBx.

In Embodiment 1 as described thus far, the decoding unit 5 decodes the divided stream stored in the buffer 3 using the neighboring information stored in the neighboring information memory 7, and stores, as the neighboring information, a part of the information generated as a result of this decoding process into the neighboring information memory 8. Moreover, when decoding the target macroblock included in the divided stream stored in the buffer 3, the decoding unit 5 performs the image processing on the neighboring information stored in the neighboring information memory 7 and on the target macroblock and then stores at least a part of the image-processed target macroblock and a part of the image-processed neighboring information into the frame memory 11. Here, the aforementioned neighboring information stored in the neighboring information memory 7 indicates at least a part of the other macroblock that has been decoded by the decoding unit 6 and is included in the other macroblock line adjacent to the macroblock line including the target macroblock.

On the other hand, the decoding unit 6 decodes the divided stream stored in the buffer 4 using the neighboring information stored in the neighboring information memory 8, and stores, as the neighboring information, a part of the information generated as a result of this decoding process into the neighboring information memory 7. Moreover, when decoding the target macroblock included in the divided stream stored in the buffer 4, the decoding unit 6 performs the image processing on the neighboring information stored in the neighboring information memory 8 and on the target macroblock and then stores at least a part of the image-processed target macroblock and a part of the image-processed neighboring information into the frame memory 11. Here, the aforementioned neighboring information stored in the neighboring information memory 8 indicates at least a part of the other macroblock that has been decoded by the decoding unit 5 and is included in the other macroblock line adjacent to the macroblock line including the target macroblock.

With this, the image processing, such as the deblocking filtering process performed across the macroblock lines, is performed on the two divided streams in parallel. Thus, a speedup of the overall decoding processing can be sufficiently achieved, resulting in an increase in decoding performance or decoding efficiency. After the macroblock is decoded and stored in the frame memory 11 by the decoding unit 5 or the decoding unit 6, this means that the deblocking filtering process has been performed on this macroblock. Therefore, unlike the case where the deblocking filtering process needs to be performed after the macroblock is stored in the frame memory 11, it is not necessary to take the trouble to read the macroblock from the frame memory 11. This can reduce the number of times the frame memory 11 is accessed.

Next, as mentioned earlier, the method employed in each of the motion vector reading process (S113), the reconstructed sub-image reading process (S114), and the deblocking-filtered image reading process (S123) to read the neighboring information from the neighboring information memory 7 is described. Operations performed in these processes are the same, except that a type of the neighboring information to be read is different in each of the processes. Thus, these processes are collectively explained, with reference to a flowchart shown in FIG. 14.

Figure 14:
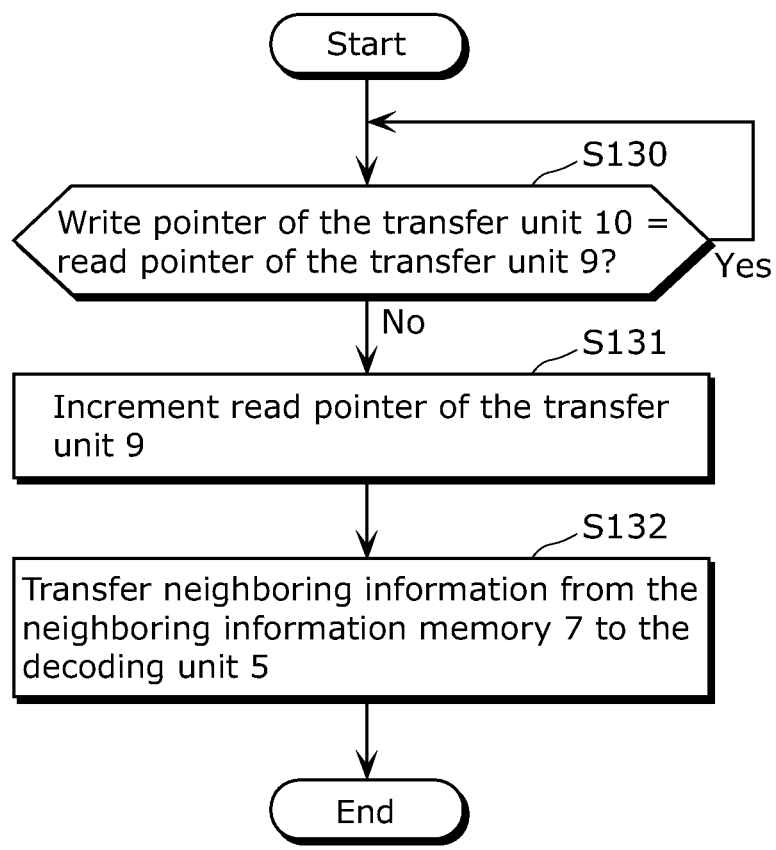
FIG. 14 is a flowchart showing a process of reading neighboring information from a neighboring information memory of the image decoding device in Embodiment 1 according to the present invention.

FIG. 14 is a flowchart showing the process performed by the decoding unit 5 and the transfer unit 9 to read the neighboring information from the neighboring information memory 7. It should be noted that the neighboring information refers to a motion vector, a reconstructed sub-image, or a deblocking-filtered image.

The decoding unit 6 writes the neighboring information to be used by the decoding unit 5 to decode a macroblock, into the neighboring information memory 7 via the transfer unit 10. The transfer unit 9 obtains, from the transfer unit 10, a value of a write pointer of when this writing is performed on the neighboring information memory 7. The value of the write pointer indicates an address of the neighboring information memory 7 at which next writing is performed. Then, the transfer unit 9 compares this value of the write pointer with a value of a read pointer for reading the neighboring information from the neighboring information memory 7 (S130). The value of the read pointer indicates an address of the neighboring information memory 7 at which next reading is performed.

When determining as a result of the comparison that the value of the write pointer is not equal to the value of the read pointer (No in S130), the transfer unit 9 increments the value of the read pointer (S131). Then, the transfer unit 9 reads the neighboring information located at the address indicated by the read pointer from the neighboring information memory 7, and transfers the read neighboring information to the decoding unit 5 (S133). On the other hand, when determining as a result of the comparison that the value of the write pointer is equal to the value of the read pointer (Yes in S130), the transfer unit 9 waits.

More specifically, when the value of the write pointer is equal to the value of the read pointer, this means that each piece of the neighboring information stored in the neighboring information memory 7 has been read and transferred to the decoding unit 5. On the other hand, when the value of the write pointer is not equal to the value of the read pointer, this means that the neighboring information memory 7 stores a new piece of neighboring information which is to be used by the decoding unit 5 to decode a macroblock and which has not yet been transferred to the decoding unit 5. Thus, when the aforementioned values are not the same, the transfer unit 9 performs a transfer after incrementing the value of the read pointer. When the aforementioned values are the same, the transfer unit 9 determines that the neighboring information to be read has not yet been written and thus waits until this neighboring information is written.

Next, as mentioned earlier, the method employed in each of the motion vector writing process (S120), the target reconstructed sub-image writing process (S122), and the target deblocking-filtered image writing process (S125) to write the neighboring information into the neighboring information memory 8 is described. Operations performed in these processes are the same, except that a type of the neighboring information to be written is different in each of the processes. Thus, these processes are collectively explained, with reference to a flowchart shown in FIG. 15.

Figure 15:
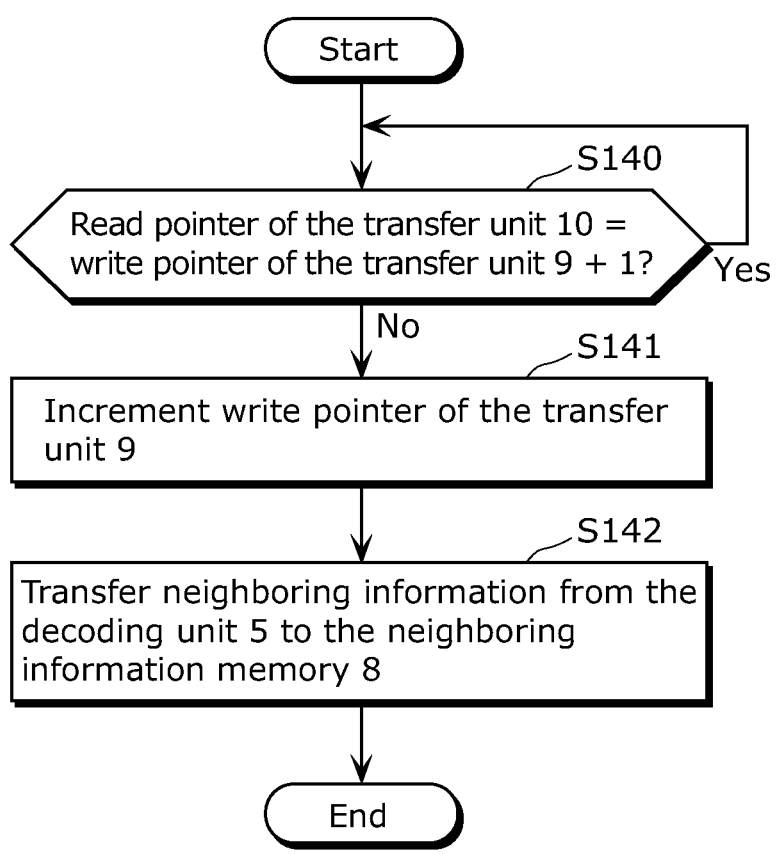
FIG. 15 is a flowchart showing a process of writing the neighboring information into the neighboring information memory of the image decoding device in Embodiment 1 according to the present invention.

FIG. 15 is a flowchart showing the process performed by the decoding unit 5 and the transfer unit 9 to write the neighboring information into the neighboring information memory 8. It should be noted that the neighboring information refers to a motion vector, a target reconstructed sub-image, or a target deblocking-filtered image.

The decoding unit 6 reads the neighboring information used for decoding the target macroblock, from the neighboring information memory 8 via the transfer unit 10. The transfer unit 9 obtains, from the transfer unit 10, a value of the read pointer of when this reading is performed on the neighboring information memory 8. The value of the read pointer indicates an address of the neighboring information memory 8 at which next reading is performed. Then, the transfer unit 9 compares this value of the read pointer with a value of the write pointer for writing, into the neighboring information memory 8, the neighboring information to be used by the decoding unit 6 for decoding the macroblock (S140). The value of the write pointer indicates an address of the neighboring information memory 8 at which next writing is performed.

When determining as a result of the comparison that the incremented value of the write pointer is equal to the value of the read pointer (Yes in S140), the transfer unit 9 waits. On the other hand, when determining as a result of the comparison that the incremented value of the write pointer is not equal to the value of the read pointer (No in S140), the transfer unit 9 increments the value of the write pointer (S141). Then, the transfer unit 9 obtains the neighboring information generated by the decoding unit 5 and stores the obtained neighboring information into the neighboring information memory 8 (S142).

Here, suppose that the incremented value of the write pointer is equal to the value of the read pointer. In this case, when next writing of the neighboring information is performed on the neighboring information memory 8, there is a possibility that the write pointer reaches or passes the read pointer. To be more specific, since the neighboring information which has not been read out from the neighboring information memory 8 is to be overwritten with a new piece of neighboring information, this neighboring information which has yet to be read out may possibly be deleted. Next, suppose that the incremented value of the write pointer is not equal to the value of the read pointer. In this case, even when next writing of the neighboring information is performed on the neighboring information memory 8, there is no possibility that the write pointer reaches or passes the read pointer. To be more specific, there is no possibility that the neighboring information which has not been read out from the neighboring information memory 8 is to be overwritten with a new piece of neighboring information and that this neighboring information which has yet to be read out may possibly be deleted. Thus, when the aforementioned values are not the same, the transfer unit 9 performs writing of the neighboring information after incrementing the value of the write pointer. When the aforementioned values are the same, the transfer unit 9 determines that there has been a delay in the process performed by the decoding unit 6, that is, the process performed by the transfer unit 10 to read the neighboring information from the neighboring information memory 8. Thus, the transfer unit 9 waits until the neighboring information is read and then the value of the read pointer is incremented.

Each of FIG. 14 and FIG. 15 does not describe the case where the pointer value exceeds a maximum value of the neighboring information memory 7 or the neighboring information memory 8. However, it should be noted that each of these memories may be used as a so-called ring buffer so that the value returns to 0 when exceeding the maximum value.

The decoding process performed by the decoding unit 5 has been described so far. The decoding process performed by the decoding unit 6 is the same as the decoding process performed by the decoding unit 5, except that the transfer unit 10 is used and the neighboring information is written into the neighboring information memory 7 and is read from the neighboring information memory 8. Therefore, a description on the decoding process performed by the decoding unit 6 is omitted here.

Figure 16:
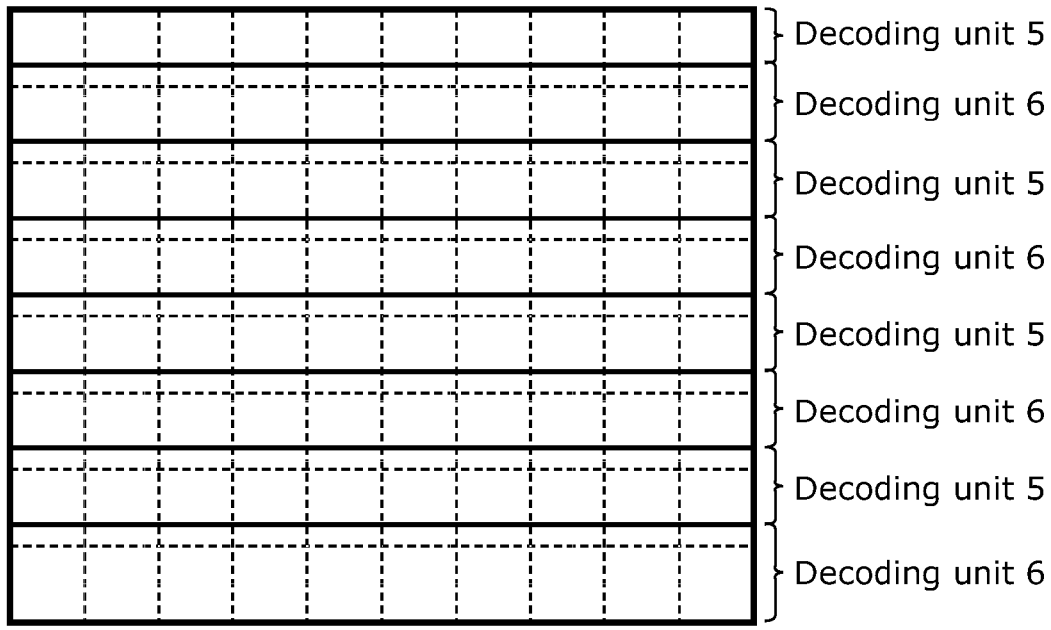
FIG. 16 is a diagram explaining ranges of decoded images to be written by the decoding units into a frame memory, in Embodiment 1 according to the present invention.

FIG. 16 is a diagram showing ranges of decoded images to be written by the decoding unit 5 and the decoding unit 6 into the frame memory 11.

As shown in FIG. 4A, each image included in a picture to be decoded is assigned to the decoding unit 5 or the decoding unit 6 on a macroblock line basis. Here, as shown in FIG. 12C, a decoded image written into the frame memory 11 by the decoding unit 5 or the decoding unit 6 (i.e., the deblocking-filtered image) is shifted from the assigned macroblock line. On this account, as shown in FIG. 16, the decoded image of a region (indicated by a horizontal solid line in FIG. 16) shifted from the macroblock line (a region indicated by a horizontal dashed line in FIG. 16) is written by each of the decoding unit 5 and the decoding unit 6 into the frame memory 11.

The above operation is performed in the case where the coded stream has a frame structure or a field structure based on the H.264 standard. The H.264 standard includes a coded stream having a structure called a macroblock adaptive frame field (MBAFF). Hereafter, each of the frame structure and the field structure is referred to as a non-MBAFF structure. The coding order is different between the MBAFF structure and the non-MBAFF structure.

Figure 17:
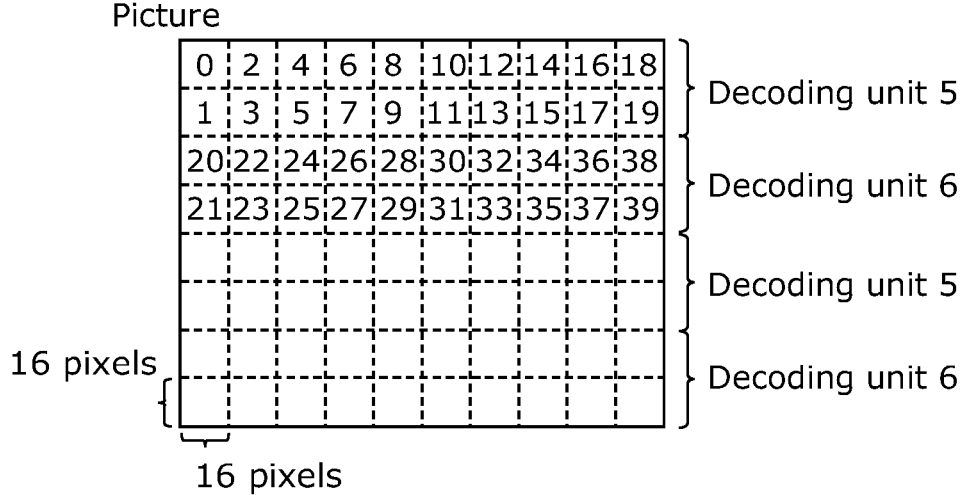
FIG. 17 is a diagram explaining macroblock lines in the case where a coded stream to be decoded by the decoding units has an MBAFF structure.

FIG. 17 is a diagram explaining target macroblock lines to be decoded by the decoding unit 5 and the decoding unit 6 in the case where a coded stream has the MBAFF structure.

As shown in FIG. 17, instead of the raster order employed in the non-MBAFF structure, a pair of two vertically-adjacent macroblocks is coded sequentially in the case of the MBAFF structure. To be more specific, an upper macroblock included in the pair is firstly coded, and a lower macroblock is next coded. Then, after the coding process for this macroblock pair is completed, a macroblock pair located on the immediately right of this processed macroblock pair is coded similarly. When the coded stream has the MBAFF structure, the stream division unit 2 divides the picture (i.e., the coded stream) by assigning, for each of pairs of adjacent macroblock lines (each pair is referred to as a macroblock-line pair), the macroblock-line pair to the buffer 3 or the buffer 4. Then, as shown in FIG. 17, each of the decoding unit 5 and the decoding unit 6 performs the decoding process on the corresponding macroblock-line pair, so that the image decoding device 100 can decode the coded stream having the MBAFF structure in the same manner as in the case of the coded stream having the non-MBAFF structure.

Figure 18:
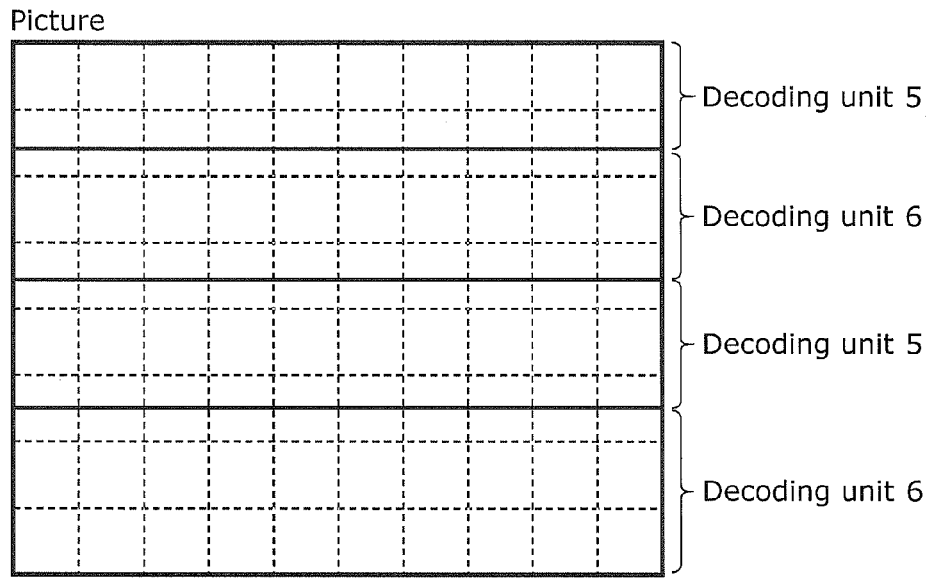
FIG. 18 is a diagram explaining ranges of decoded images to be written by the decoding units into the frame memory in the case where a coded stream has an MBAFF structure, in Embodiment 1 according to the present invention.

FIG. 18 is a diagram showing ranges of decoded images to be written into the frame memory 11 in the case where the coded stream has the MBAFF structure.

As shown in FIG. 18, each of the decoding unit 5 and the decoding unit 6 writes, into the frame memory 11, the decoded image of a region (indicated by a horizontal solid line in FIG. 18) shifted from a macroblock-line pair (two regions each indicated by a horizontal dashed line in FIG. 18).

1-4. Advantageous Effect

In Embodiment 1 as described thus far, the stream division unit 2 divides the coded stream, and the decoding unit 5 and the decoding unit 6 operate in parallel in synchronization with each other using the neighboring information memory 7 and the neighboring information memory 8. This allows the coded streams based on the H.264 standard to be decoded in parallel even when their original coded stream is not necessarily divided into units such as slices. Moreover, the processing performance can be doubled in Embodiment 1 as compared with the case where the coded stream is decoded by only one decoding unit. In order to implement the same performance between the decoding units, the operating frequency of each of the decoding units can be reduced by half, thereby reducing power consumption.

Figure 19A:
FIG. 19A is a diagram explaining timings at which macroblocks are processed by the image decoding device in Embodiment 1 according to the present invention in the case where a coded stream has a non-MBAFF structure.
Figure 19A:
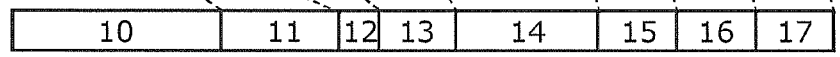
Figure 19B:
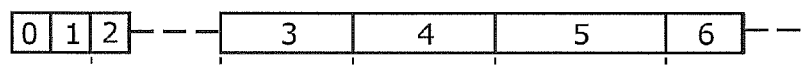
FIG. 19B is a diagram explaining timings at which macroblocks are processed by a conventional image decoding device in the case where a coded stream has a non-MBAFF structure.
Figure 19B:
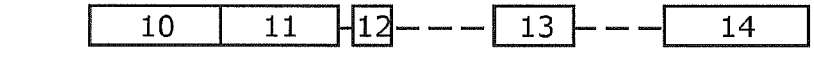

Each of FIG. 19A and FIG. 19B is a diagram showing timings at which the macroblocks are processed in the case where the coded stream has the non-MBAFF structure.

In Embodiment 1, since the decoding unit 5 and the decoding unit 6 operates in parallel in synchronization with each other using the neighboring information memory 7 and the neighboring information memories 8 as buffers, the decoding unit 5 and the decoding unit 6 can start the processing at the same time as shown in FIG. 19A. Moreover, it becomes easy to control the start of decoding. When the neighboring information necessary for the processing is written by the decoding unit 5 into the neighboring information memory 8, the decoding unit 6 can start processing for the target macroblock. On the other hand, in the image decoding device disclosed in Patent Literature 1, each of the two decoding units 1300a and 1300b decodes one macroblock for each predetermined period within a length of the predetermined period, as shown in FIG. 19B. In other words, the decoding units 1300a and 1300b operate in synchronization with each other on a macroblock-by-macroblock basis. In this case, one of the two decoding units 1300a and 1300b that completes the decoding process for the macroblock before the other decoding unit has to wait until the start of the decoding process for a next macroblock.

In Embodiment 1, the decoding unit does not have to wait until the start of the decoding process. Thus, as compared with the image decoding device disclosed in Patent Literature 1, a waiting time until the start of the process can be reduced and, therefore, the operation can be efficiently performed.

More specifically, in the image decoding device 100 in Embodiment 1, a coded stream is divided into two divided streams which are decoded by the decoding units 5 and 6, respectively, in parallel. Thus, the image decoding device 100 can omit the above-mentioned macroblock pipeline control unit as disclosed in Patent Literature 1 that collectively controls timings of decoding performed by the decoding units. Moreover, even in the case where the image decoding device 100 divides the coded stream into three or more streams and includes many decoding units to decode these divided streams in parallel, it is not necessary to place a signal line between the macroblock pipeline control unit and each of the decoding units as in Patent Literature 1. Thus, the image decoding device 100 can be easily implemented. Furthermore, in the image decoding device 100 in Embodiment 1, the neighboring information required according to the dependency relationship between the data on the basis of the H.264 standard is sent and received between the decoding unit 5 and the decoding unit 6 via the neighboring information memory 7 and the neighboring information memory 8. Therefore, when the neighboring information necessary for decoding is stored in the neighboring information memory, the corresponding decoding unit 5 or 6 can continue decoding the divided steam using the stored neighboring information without having to wait for the other decoding unit to finish decoding. Accordingly, unlike the image decoding device disclosed in Patent Literature 1, no loss of time is caused since the decoding processing is not interrupted, thereby increasing the decoding efficiency.

1-5. Supplemental Remarks

The image decoding device 100 in Embodiment 1 performs the decoding process according to the H.264 standard. However, it should be noted the decoding process may be performed according to a different image coding standard, such as VC-1.

Moreover, Embodiment 1 may be implemented as a hardware circuit or software that is executed by a processor. Alternatively, Embodiment 1 may be implemented partially as a hardware circuit and partially as software that is executed by a processor.

Furthermore, the image decoding device 100 in Embodiment 1 includes the two decoding units. However, the number of decoding units is not limited to two, and may be three, four, or more. In such a case, the stream division unit 2 divides the coded stream into the same number of divided streams as the number of decoding units included in the image decoding device 100.

Moreover, the image decoding device 100 in Embodiment 1 references to four neighboring macroblocks, which are the left, immediately-above, upper-right, and upper-left macroblocks. However, only the left macroblock or only the left and immediately-above macroblocks may be referenced. Alternatively, the macroblocks to be referenced may be different depending on a process.

Furthermore, the image decoding device 100 in Embodiment 1 includes the neighboring information memory as a component for storing the neighboring information. However, the component may be any other recording medium, such as a flip-flop or any other kind of memory element.

Moreover, the image decoding device 100 in Embodiment 1 stores all the pieces of neighboring information used for motion vector calculation, intra-picture prediction, and deblocking filtering, into a single neighboring information memory. However, the neighboring information may be stored for each process in a different neighboring information memory (i.e., a memory element such as a memory or a flip-flop).

Furthermore, the image decoding device 100 in Embodiment 1 performs the deblocking filtering process using three pixels on each side of a boundary and writes, into the frame memory 11, the decoded image in the writing-target region located at a position shifted by this number of pixels. Note that the number of pixels may be more than three.

Moreover, the image decoding device 100 in Embodiment 1 stores the motion vector, the reconstructed sub-image, and the deblocking-filtered image as the neighboring information into the neighboring information memory. However, information to be stored is not limited to these, and any kind of information necessary between the macroblocks may be stored. For example, the intra-picture prediction mode, a total number of non-zero coefficients (TotalCoeff) among frequency coefficients of the macroblock, or a reference picture number (ref_idx) indicating a reference picture may be used as the neighboring information.

Furthermore, the image decoding device 100 in Embodiment 1 includes one transfer unit and one neighboring information memory for each of the decoding units. However, the transfer unit and the neighboring information memory do not need to be provided for each of the decoding units. For example, as long as transfer performance is satisfied, one transfer unit and one neighboring information memory may be provided to be shared by the plurality of decoding units.

Moreover, the stream division unit 2 in Embodiment 1 simply divides the coded stream. However, the stream division unit 2 may not only simply divide the coded stream, but also decode the whole or a part of the divided stream. Alternatively, the stream division unit 2 may change the coding method of the divided stream into another coding method and store, into the buffer, the divided stream for which the coding method has been changed.

Furthermore, the decoding unit in Embodiment 1 stores only the decoded image into the frame memory 11. However, the decoding unit may store control data associated with the decoded image, such as information necessary to perform decoding according to the direct mode in the H.264 standard.

Embodiment 2

2-1. Overview

Firstly, an overview of an image decoding device according to Embodiment 2 of the present invention is described.

In the image decoding device in Embodiment 2, a coded stream is divided into four, and four decoding units decode, in parallel, the four divided streams generated as a result of the division. Each of the four decoding units reads the divided stream stored in a buffer and then decodes the read divided stream. Here, each of the four decoding units decodes the divided stream in synchronization with another decoding unit, by reference to a partial decoding result given by the other decoding unit via a neighboring information memory.

2-2. Configuration

Next, a configuration of the image decoding device according to Embodiment 2 is described.

Figure 20:
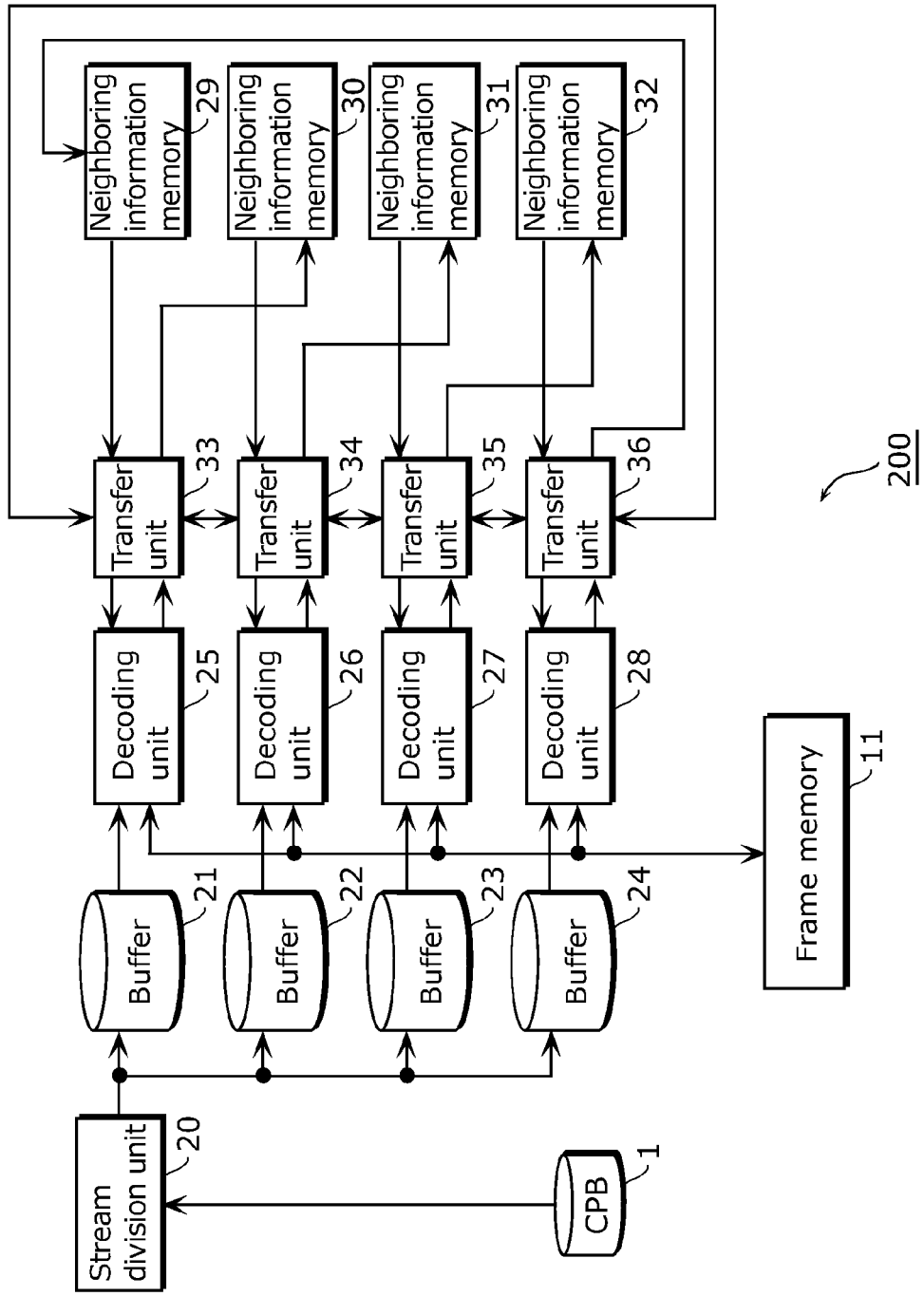
FIG. 20 is a block diagram showing a configuration of an image decoding device in Embodiment 2 according to the present invention.

FIG. 20 is a block diagram showing the configuration of the image decoding device according to Embodiment 2. Components identical to those described in Embodiment 1 are assigned the same reference signs used in Embodiment 1 and are not explained again here.

An image decoding device in Embodiment 2 includes: a CPB 1, a frame memory 11, a stream division unit 20 which divides a coded stream into four; buffers 21, 22, 23, and 24 each of which stores a different one of the four divided streams generated as a result of the division; decoding units 25, 26, 27, and 28 each of which performs decoding by, for example, variable-length decoding, inverse frequency transform, and motion compensation; neighboring information memories 29, 30, 31, and 32 each of which stores neighboring information used for decoding a target macroblock; and transfer units 33, 34, 35, and 36 which perform data transfer between the decoding units 25, 26, 27, and 28 and the neighboring information memories 29, 30, 31, and 32.

2-3. Operation

Next, an operation performed by the image decoding device 200 shown in FIG. 20 is described.

Figure 21:
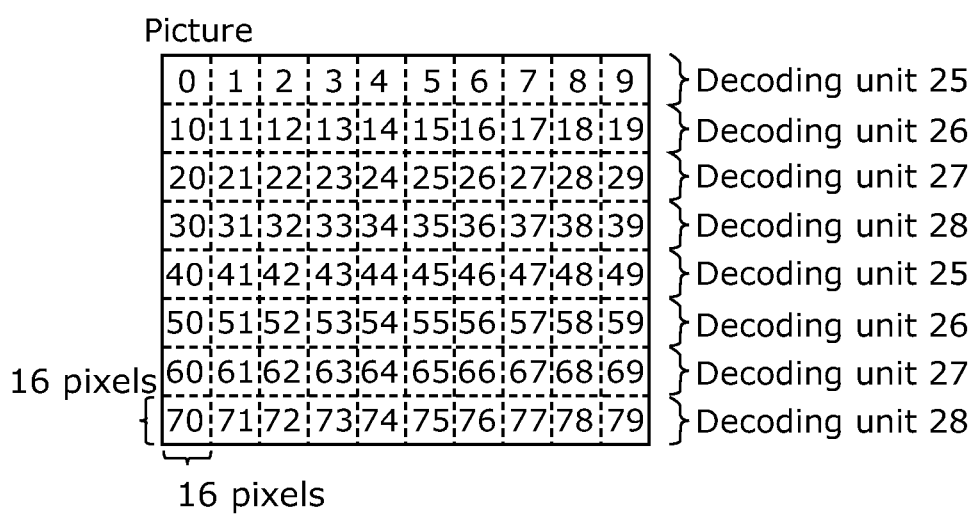
FIG. 21 is a diagram explaining division of a coded stream in Embodiment 2 according to the present invention.

The coded stream stored in the CPB 1 is read by the stream division unit 20 and divided into four as shown in FIG. 21. Then, the four divided streams generated as a result of the division are stored separately into the buffer 21, the buffer 22, the buffer 23, and the buffer 24.

FIG. 21 is a diagram explaining the division of the coded stream.

The stream division unit 20 divides the coded stream so that each macroblock line is assigned to one of the decoding units 25, 26, 27, and 28. For example, a macroblock line having macroblock addresses 0 to 9 and a macroblock line having macroblock addresses 40 to 49 are assigned to the decoding unit 25. Similarly, a macroblock line having macroblock addresses 10 to 19 and a macroblock line having macroblock addresses 50 to 59 are assigned to the decoding unit 26. Moreover, a macroblock line having macroblock addresses 20 to 29 and a macroblock line having macroblock addresses 60 to 69 are assigned to the decoding unit 27.

That is, the stream division unit 20 divides the coded stream to generate first to fourth divided streams. The first divided stream includes the macroblock line having the macroblock addresses 0 to 9 and the macroblock line having the macroblock addresses 40 to 49. The second divided stream includes the macroblock line having the macroblock addresses 10 to 19 and the macroblock line having the macroblock addresses 50 to 59. The third divided stream includes the macroblock line having the macroblock addresses 20 to 29 and the macroblock line having the macroblock addresses 60 to 69. The fourth divided stream includes a macroblock line having macroblock addresses 30 to 39 and a macroblock line having macroblock addresses 70 to 79. The stream division unit 20 stores the first divided stream into the buffer 21, the second divided stream into the buffer 22, the third divided stream into the buffer 23, and the fourth divided stream into the buffer 24.

The decoding unit 25 reads the first divided stream from the buffer 21, and decodes the read first divided stream. The decoding unit 25 performs the same operation as the decoding unit 5 described in Embodiment 1. However, the decoding unit 25 is different from the decoding unit 5 in that the decoding unit 25 uses the transfer unit 33 to read, from the neighboring information memory 29, the neighboring information indicating a decoding result given by the decoding unit 28 and to write, into the neighboring information memory 30, the neighboring information indicating a decoding result given by the decoding unit 25 itself. It should be noted that the decoding unit 25 writes a decoded image into the frame memory 11.

The decoding unit 26 reads the second divided stream from the buffer 22, and decodes the read second divided stream. The decoding unit 26 performs the same operation as the decoding unit 5 described in Embodiment 1. However, the decoding unit 26 is different from the decoding unit 5 in that the decoding unit 26 uses the transfer unit 34 to read, from the neighboring information memory 30, the neighboring information indicating a decoding result given by the decoding unit 25 and to write, into the neighboring information memory 31, the neighboring information indicating a decoding result given by the decoding unit 26 itself. It should be noted that the decoding unit 26 writes a decoded image into the frame memory 11.

The decoding unit 27 reads the third divided stream from the buffer 23, and decodes the read third divided stream. The decoding unit 27 performs the same operation as the decoding unit 5 described in Embodiment 1. However, the decoding unit 27 is different from the decoding unit 5 in that the decoding unit 27 uses the transfer unit 35 to read, from the neighboring information memory 31, the neighboring information indicating a decoding result given by the decoding unit 26 and to write, into the neighboring information memory 32, the neighboring information indicating a decoding result given by the decoding unit 27 itself. It should be noted that the decoding unit 27 writes a decoded image into the frame memory 11.

The decoding unit 28 reads the fourth divided stream from the buffer 24, and decodes the read fourth divided stream. The decoding unit 28 performs the same operation as the decoding unit 5 described in Embodiment 1. However, the decoding unit 28 is different from the decoding unit 5 in that the decoding unit 28 uses the transfer unit 36 to read, from the neighboring information memory 32, the neighboring information indicating a decoding result given by the decoding unit 27 and to write, into the neighboring information memory 29, the neighboring information indicating a decoding result given by the decoding unit 28 itself. It should be noted that the decoding unit 28 writes a decoded image into the frame memory 11.

In the image decoding device 200 in Embodiment 2 as described, the stream division unit 20 divides the coded stream into four. However, each of the decoding units performs in the same way as explained in Embodiment 1.

2-4. Advantageous Effect

In Embodiment 2 as described thus far, the stream division unit 20 divides the coded stream into four, and the four decoding units decode these four divided streams in parallel. Thus, as compared with the image decoding device 100 in Embodiment 1, the image decoding device 200 in Embodiment 2 can double processing performance when operating at the same operating frequency as the image decoding device 100. In order to implement the same performance between the decoding units, the operating frequency of each of the decoding units can be reduced by half, thereby reducing power consumption.

Moreover, each of the decoding units 25, 26, 27, and 28 does not need to synchronize with the other three decoding units, and only has to synchronize with one of the decoding units that is adjacent to the current decoding unit. Thus, it is easy to carry out wiring between the components. This makes it easy to implement the image decoding device that increases the decoding efficiency.

2-5. Supplemental Remarks

The image decoding device 200 in Embodiment 2 includes the four decoding units. However, it should be noted that the number of decoding units is not limited four, and may be eight, sixteen, or more.

Embodiment 3

3-1. Overview

Firstly, an overview of an image decoding device according to Embodiment 3 of the present invention is described.

The image decoding device in Embodiment 3 includes switches for switching data to be inputted into a decoding unit and a neighboring information memory. By the data switching executed by these switches, the image decoding device in Embodiment 3 switches between: a process where two decoding units decode one coded stream in synchronization with each other; and a process where the two decoding units independently decode two coded streams respectively.

3-2. Configuration

Next, a configuration of the image decoding device according to Embodiment 3 is described.

Figure 22:
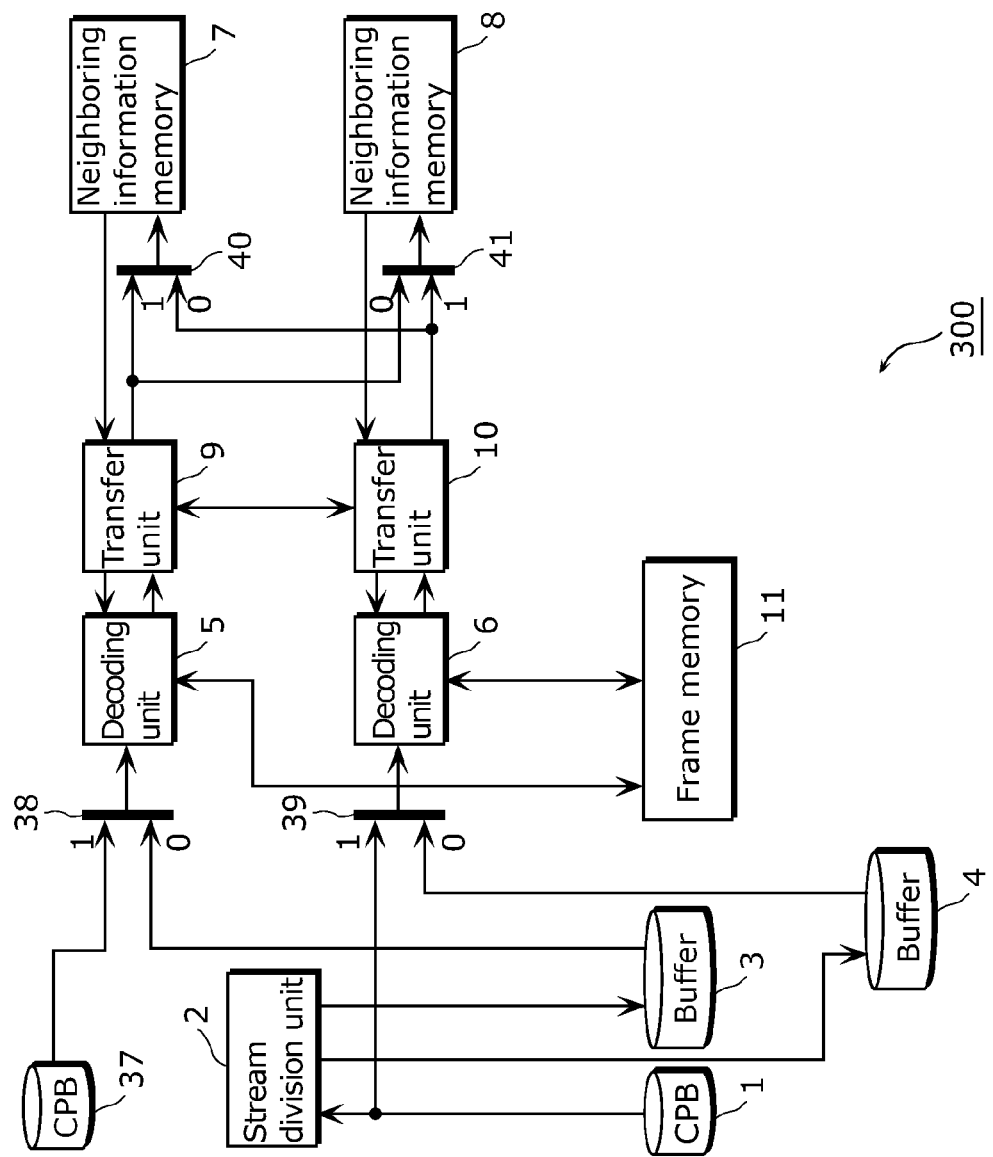
FIG. 22 is a block diagram showing a configuration of an image decoding device in Embodiment 3 according to the present invention.

FIG. 22 is a block diagram showing the configuration of the image decoding device according to Embodiment 3. Components identical to those described in Embodiment 1 are assigned the same reference signs used in Embodiment 1 and are not explained again here.

An image decoding device 300 in Embodiment 3 includes the components of the image decoding device 100 in Embodiment 1. In addition, the image decoding device 300 further includes: a CPB 37 for storing a coded stream; a switch 38 for switching data to be inputted into the decoding unit 5; a switch 39 for switching data to be inputted into the decoding unit 6; a switch 40 for switching data to be inputted into the neighboring information memory 7; and a switch 41 for switching data to be inputted into the neighboring information memory 8.

3-3. Operation

Next, an operation performed by the image decoding device 300 shown in FIG. 22 is described.

All of the switch 38, the switch 39, the switch 40, and the switch 41 make a selection between an input "0" and an input "1", at the same time. When selecting the input "0", the switch 38 switches the data to be inputted into the decoding unit 5 to the divided stream stored in the buffer 3. When selecting the input "1", the switch 38 switches the data to be inputted into the decoding unit 5 to the coded stream stored in the CPB 37. When selecting the input "0", the switch 39 switches the data to be inputted into the decoding unit 6 to the divided stream stored in the buffer 4. When selecting the input "1", the switch 39 switches the data to be inputted into the decoding unit 6 to the coded stream stored in the CPB 1. When selecting the input "0", the switch 40 switches the data to be inputted (or, stored) into the neighboring information memory 7 to the neighboring information transferred from the decoding unit 6 via the transfer unit 10. When selecting the input "1", the switch 40 switches the data to be inputted into the neighboring information memory 7 to the neighboring information transferred from the decoding unit 5 via the transfer unit 9. When selecting the input "0", the switch 41 switches the data to be inputted (or, stored) into the neighboring information memory 8 to the neighboring information transferred from the decoding unit 5 via the transfer unit 9. When selecting the input "1", the switch 41 switches the data to be inputted into the neighboring information memory 8 to the neighboring information transferred from the decoding unit 6 via the transfer unit 10.

When all of the switch 38, the switch 39, the switch 40, and the switch 41 select the input "0", the image decoding device 300 decodes the coded stream stored in the CPB 1, as in the case of Embodiment 1. To be more specific, the stream division unit 2 of the image decoding device 300 reads the coded stream from the CPB 1, divides the read coded stream, and writes the two divided streams generated as a result of the division into the buffer 3 and the buffer 4, respectively. Then, the decoding unit 5 and the decoding unit 6 decode these divided streams in parallel. An operation performed here by the image decoding device 300 is exactly the same as the operation performed in Embodiment 1 and, therefore, the explanation is omitted here.

When all of the switch 38, the switch 39, the switch 40, and the switch 41 select the input "1", the image decoding device 300 performs an operation different from the operation performed in Embodiment 1. To be more specific, the decoding unit 5 and the decoding unit 6 read the different coded streams respectively stored in the two different CPBs 37 and 1. That is, each of the decoding unit and the decoding unit 6 performs the decoding process independently. The decoding unit 5 reads the coded stream from the CPB 37 and then decodes the read coded stream. An operation performed here by the decoding unit 5 is the same as the operation performed in Embodiment 1, except that the decoding unit 5 writes the neighboring information into the neighboring information memory 7 via the transfer unit 9 and does not perform the decoding process in synchronization with the decoding unit 6 via the transfer unit 9 and the transfer unit 10. More specifically, the decoding unit 5 writes the neighboring information indicating the decoding result given by the decoding unit 5 itself into the neighboring information memory 7 via the transfer unit 9, reads the neighboring information written by the decoding unit 5 itself via the transfer unit 9, and decodes the target macroblock using this neighboring information. An operation performed by the decoding unit 6 is the same as the operation performed by the decoding unit 5 and, therefore, the explanation is note repeated here.

3-4. Advantageous Effect

In Embodiment 3 as described thus far, the switch 38, the switch 39, the switch 40, and the switch 41 allow the switching between: the operation where the two decoding units cooperate with each other to implement high performance; and the operation where the two different coded streams are decoded simultaneously.

3-5. Supplemental Remarks

The image decoding device 300 in Embodiment 3 includes the two decoding units. However, it should be noted that the number of decoding units may be four or more.

Moreover, it should be noted that the switches 38 to 41 in Embodiment 3 do not necessarily need to be physical switches or circuit-like switches. For example, switches for switching data by switching between memory addresses may be used.

Embodiment 4

4-1. Overview

Firstly, an overview of an image decoding device according to Embodiment 4 of the present invention is described.

The image decoding device in Embodiment 4 includes a switch used for switching a coded stream to be inputted into a stream division unit. By the switching executed by this switch, the image decoding device in Embodiment 4 switches between: a parallel decoding process where one coded stream is divided into two and two decoding units decode the two divided streams in synchronization with each other; and a time-division parallel decoding process where a parallel decoding process is temporally divided and performed for each of two coded stream.

4-2. Configuration

Next, a configuration of the image decoding device according to Embodiment 4 is described.

Figure 23:
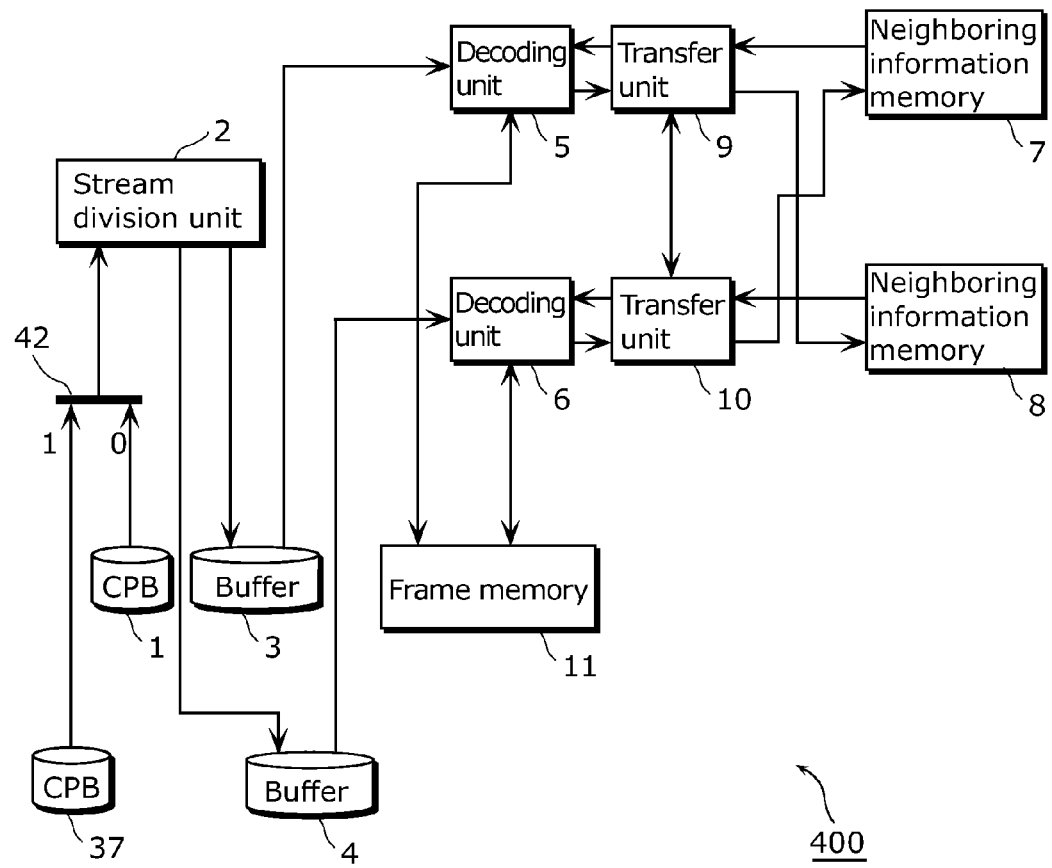
FIG. 23 is a block diagram showing a configuration of an image decoding device in Embodiment 4 according to the present invention.

FIG. 23 is a block diagram showing the configuration of the image decoding device according to Embodiment 4. Components identical to those described in Embodiment 1 are assigned the same reference signs used in Embodiment 1 and are not explained again here.

An image decoding device 400 in Embodiment 4 includes the components of the image decoding device 100 in Embodiment 1. In addition, the image decoding device 400 further includes: a CPB 37 for storing a coded stream; and a switch 42 for switching the coded stream to be inputted into the stream division unit 2. When selecting an input "0", the switch 42 switches the coded stream to be inputted into the stream division unit 2 to the coded stream stored in the CPB 1. When selecting an input "1", the switch 42 switches the coded stream to be inputted into the stream division unit 2 to the coded stream stored in the CPB 37.

4-3. Operation

Next, an operation performed by the image decoding device 400 shown in FIG. 23 is described.

When the switch 42 always selects the input "0", the image decoding device 400 performs the aforementioned parallel decoding process. When the switch 42 selects alternately between the input "0" and the input "1", the image decoding device 400 performs the aforementioned time-division parallel decoding process.

More specifically, when the switch 42 always selects the input "0", the image decoding device 400 decodes the coded stream stored in the CPB 1, as in the case of Embodiment 1. To be more specific, the stream division unit 2 of the image decoding device 400 reads the coded stream from the CPB 1, divides the read coded stream, and writes the two divided streams generated as a result of the division into the buffer 3 and the buffer 4, respectively. Then, the decoding unit 5 and the decoding unit 6 decode these divided streams in parallel. An operation performed here by the image decoding device 400 is exactly the same as the operation performed in Embodiment 1 and, therefore, the explanation is omitted here.

When the switch 42 temporally selects the input "0" and the input "1" alternately, the stream division unit 2 of the image decoding device 400 performs the division process by temporally switching between the two different coded streams respectively stored in the different CPBs. To be more specific, when the switch 42 selects the input "0", the stream division unit 2 reads the coded stream from the CPB 1 and divides the read coded stream. Then, the decoding unit 5 and the decoding unit 6 decode, in synchronization with each other, the two divided streams generated as a result of the division of the coded stream. An operation performed here by the image decoding device 400 is exactly the same as the operation performed in Embodiment 1 and, therefore, the explanation is omitted here. On the other hand, when the switch 42 selects the input "1", the stream division unit 2 reads the coded stream from the CPB 37 and divides the read coded stream. Then, the decoding unit 5 and the decoding unit 6 decode, in synchronization with each other, the two divided streams generated as a result of the division of the coded stream. An operation performed here by the image decoding device 400 is the same as the operation performed in Embodiment 1 except that the coded stream is read from the CPB 37 and, therefore, the explanation is omitted here.

Figure 24:
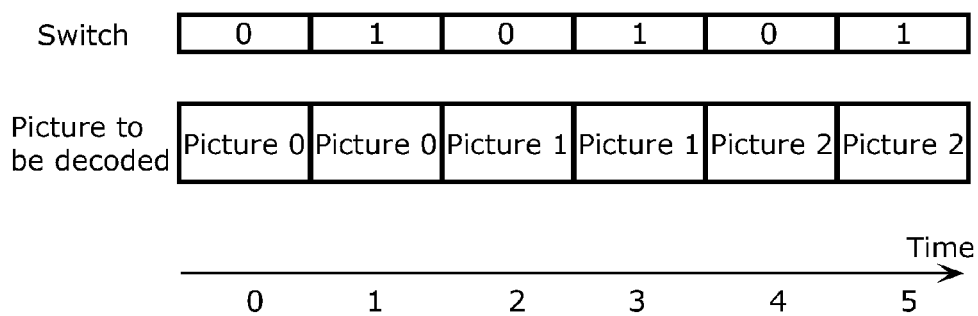
FIG. 24 is a diagram explaining a time-division parallel decoding process performed by the image decoding device in Embodiment 4 according to the present invention.

FIG. 24 is a diagram explaining the time-division parallel decoding process.

Firstly, the switch 42 selects the input "0". As a result, the image decoding device 400 performs the parallel decoding process on a picture 0 of the coded stream stored in the CPB 1. Upon completion of the parallel decoding process performed on this picture 0, the switch 42 selects the input "1". As a result, the image decoding device 400 performs the parallel decoding process on a picture 0 of the coded stream stored in the CPB 37. Upon completion of the parallel decoding process performed on this picture 0, the switch 42 selects the input "0" again. As a result, the image decoding device 400 performs the parallel decoding process on a picture 1 of the coded stream stored in the CPB 1. In this way, by temporally switching between the two coded streams to perform the parallel decoding process, the two coded streams can be decoded simultaneously in a simulated manner.

4-4. Advantageous Effect

In Embodiment 4 as described thus far, the switch 42 allows the switching between: the operation where the two decoding units cooperate with each other to implement high performance; and the operation where the two different coded streams are decoded simultaneously.

4-5. Supplemental Remarks

In Embodiment 4, the time-division parallel decoding process is performed on the two coded streams using the two CPBs. However, it should be noted that each of the numbers of CPBs and coded streams is not limited to two and may be three, four, or more.

In Embodiment 4, the target coded stream on which the parallel decoding process is to be performed is switched for each picture in the time-division parallel decoding process. However, the switching does not necessarily need to be performed for each picture, and may be performed per unit of: a plurality of pictures; one slice; a plurality of slices; or a group of pictures (GOP).

Moreover, it should be noted that the switch 42 in Embodiment 4 does not necessarily need to be a physical switch or a circuit-like switch. For example, a switch for switching data by switching between memory addresses may be used.

Embodiment 5

5-1. Overview

Firstly, an overview of an image decoding device according to Embodiment 5 of the present invention is described.

The image decoding device in Embodiment 5 includes a picture output unit which outputs decoded pictures to a display device after subsampling the decoded pictures in time. This picture output unit allows the image decoding device in Embodiment 5 to smoothly display an image sequence in fast-forward on the display device.

5-2. Configuration

Next, a configuration of the image decoding device according to Embodiment 5 is described.

Figure 25:
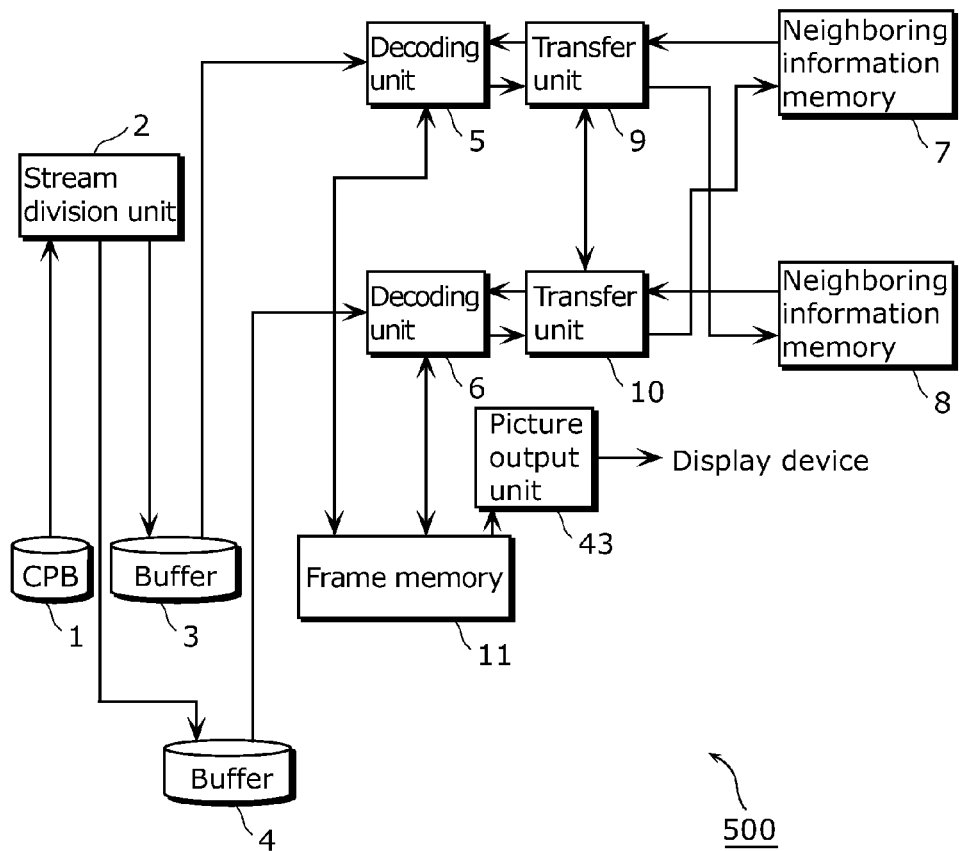
FIG. 25 is a block diagram showing a configuration of an image decoding device in Embodiment 5 according to the present invention.

FIG. 25 is a block diagram showing the configuration of the image decoding device according to Embodiment 5. Components identical to those described in Embodiment 1 are assigned the same reference signs used in Embodiment 1 and are not explained again here.

An image decoding device 500 in Embodiment 5 includes the components of the image decoding device 100 in Embodiment 1. In addition, the image decoding device 500 further includes a picture output unit 43 which outputs, to a display device, a decoded picture stored in the frame memory 11.

5-3. Operation

Next, an operation performed by the image decoding device 500 is described.

Operations performed by the components of the image decoding device 50, except the picture output unit 43, in Embodiment 5 as shown in FIG. 25 are the same as those performed in Embodiment 1 and, therefore, the explanations are omitted here.

Figure 26:
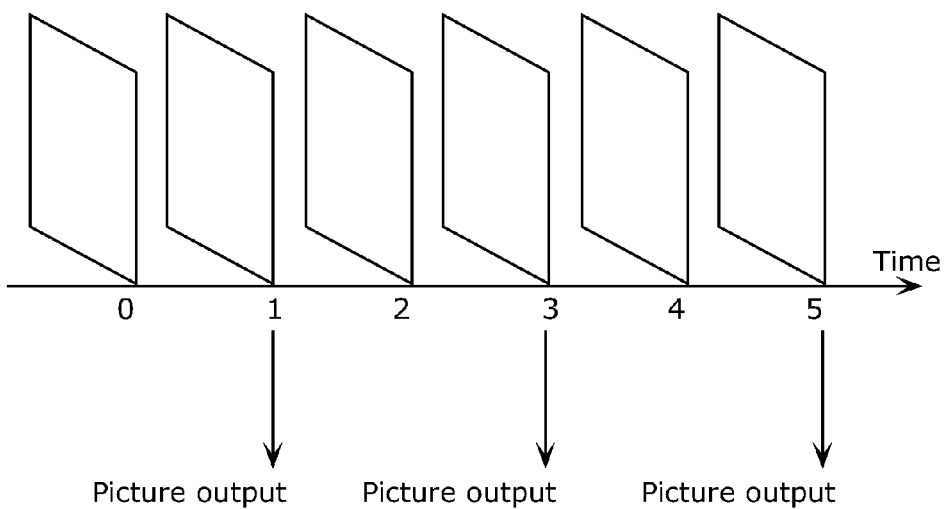
FIG. 26 is a diagram explaining an operation performed by a picture output unit of the image decoding device in Embodiment 5 according to the present invention.

FIG. 26 is a diagram explaining an operation performed by the picture output unit 43.

As shown in FIG. 26, out of a sequence of pictures decoded and written into the frame memory 11, the picture output unit 43 does not output the pictures of times 0, 2, and 4 to the display device and outputs only the pictures of times 1, 3, and 5 to the display device. More specifically, the picture output unit 43 subsamples, in time, the pictures of the video sequence including the two decoded divided streams and then outputs, to the display device, the video sequence where the pictures have been subsampled in time.

5-4. Advantageous Effect

Since the decoding unit 5 and the decoding unit 6 perform the decoding process in parallel in Embodiment 5 as in Embodiment 1, the processing performance can be doubled as compared with the case where the decoding unit 5 or the decoding unit 6 operates independently. That is, the image decoding device 500 in Embodiment 5 can decode the pictures at a frame rate that is twice as fast as a normal frame rate. In the case of using a common display device, a rate for displaying pictures is fixed or set at the normal frame rate, meaning that the pictures cannot be displayed at a frame rate twice as fast as the normal frame rate. On the other hand, the image decoding device 500 in Embodiment 5 includes the picture output unit 43 that subsamples the decoded pictures in time, and thus can smoothly display the double-speed image sequence in fast-forward on the display device.

5-5. Supplemental Remarks

The image decoding device 500 in Embodiment 5 display the double-speed image sequence in fast-forward. However, it should be noted that the triple-speed or quad-speed image sequence in fast-forward may be displayed. In this case, the picture output unit 43 subsamples, in time, the pictures according to a ratio corresponding to an n-times speed (where n is integer which is two or more). Note that n is not limited to an integer. When n is not an integer, the picture output unit 43 may subsample the pictures in time irregularly.

Embodiment 6

6-1. Overview

Firstly, an overview of an image decoding device according to Embodiment 6 of the present invention is described.

The image decoding device in Embodiment 6 includes two frame memories. Each of a decoding unit 5 and a decoding unit 6 writes a decoded image into the two frame memories at the same time, and reads a decoded image (a reference image) from one of different frame memories which are associated with each other in advance. With this, the number of times one frame memory is accessed can be reduced, and the access performance required of the frame memory can be suppressed. That is, a frame memory with low access performance can be used. Accordingly, the frame memory can be easily implemented.

6-2. Configuration

Next, a configuration of the image decoding device according to Embodiment 6 is described.

Figure 27:
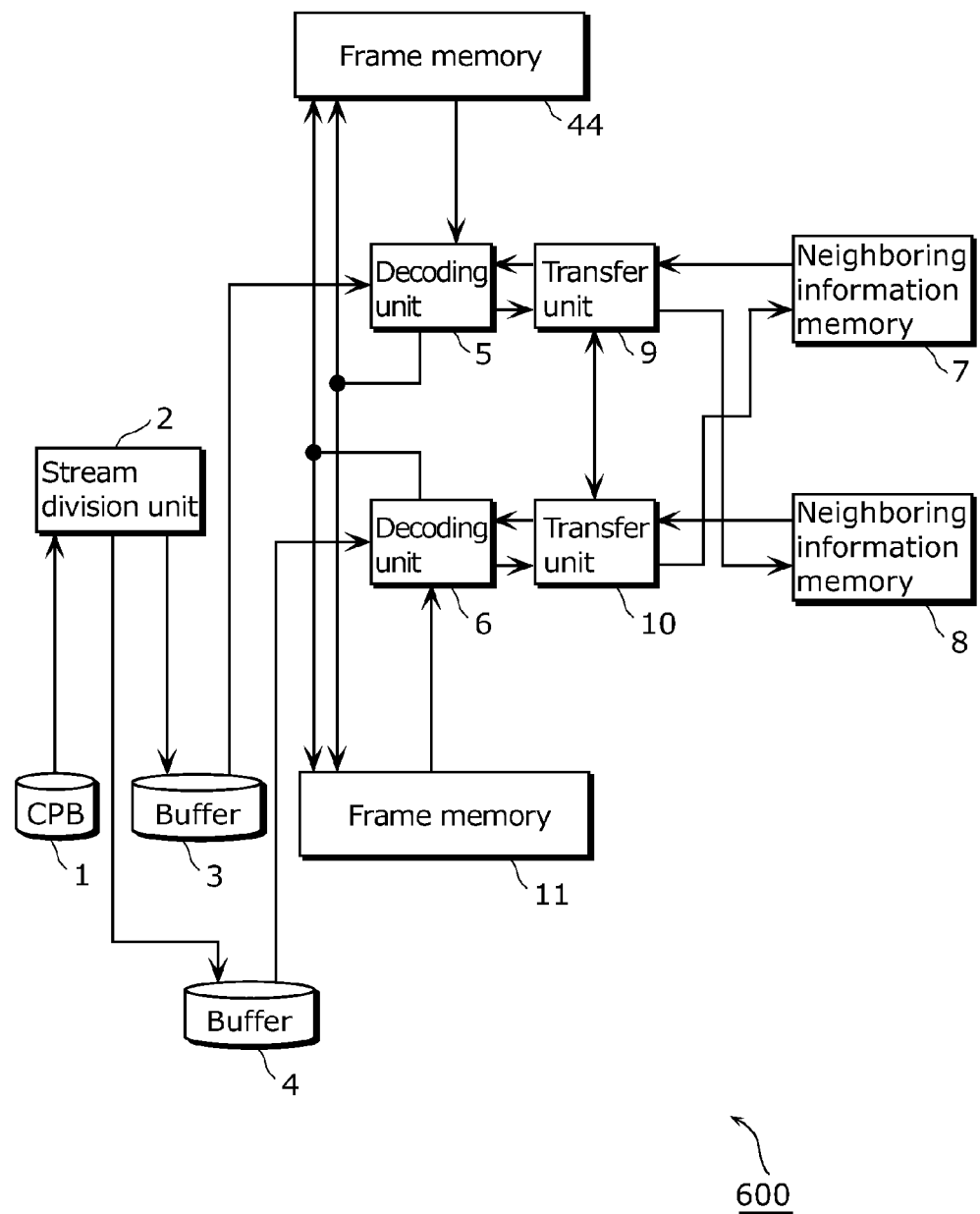
FIG. 27 is a block diagram showing a configuration of an image decoding device in Embodiment 6 according to the present invention.

FIG. 27 is a block diagram showing the configuration of the image decoding device according to Embodiment 6. Components identical to those described in Embodiment 1 are assigned the same reference signs used in Embodiment 1 and are not explained again here.

An image decoding device 600 in Embodiment 6 includes the components of the image decoding device 100 in Embodiment 1. In addition, the image decoding device 600 further includes a frame memory 44 which stores images (decoded images) decoded by the decoding unit 5 and the decoding unit 6.

6-3. Operation

Next, an operation performed by the image decoding device 600 is described.

Operations performed by the decoding unit 5 of the image decoding device 600 in Embodiment 6 shown in FIG. 27 are the same as those performed by the decoding unit 5 in Embodiment 1, except for the motion compensation process (S117) performed by the motion compensation unit 18 and the deblocking filtering process (S124) performed by the deblocking filter unit 19 as shown in the flowcharts of FIG. 7 and FIG. 8 in Embodiment 1. More specifically, in the decoding unit 5 in Embodiment 6, the motion compensation unit 18 reads a reference image (i.e., a decoded image) necessary for motion compensation from the frame memory 44 in the motion compensation process (S117). Moreover, in the decoding unit 5 in Embodiment 6, the deblocking filter unit 19 writes the image (i.e., the decoded image) on which the deblocking filtering process has been performed and thus the decoding process has been completed, into the frame memory 11 and the frame memory 44 at the same time in the deblocking filtering process (S124).

The motion compensation unit 18 of the decoding unit 6 in Embodiment 6 reads a reference image (i.e., a decoded image) necessary for motion compensation from the frame memory 11. The deblocking filter unit 19 of the decoding unit 6 in Embodiment 6 performs the same operation as the deblocking filter unit 19 of the decoding unit 5 in Embodiment 6. To be more specific, except for reading of the reference image from the frame memory 11, operations performed by the decoding unit 6 in Embodiment 6 are the same as the operations performed by the decoding unit 5 in Embodiment 6.

6-4. Advantageous Effect

According to the H.264 standard, the amount of transfer in writing a decoded image may be 256 bytes per macroblock. On the other hand, the amount of transfer in reading performed in the motion compensation is 1352 bytes in the case of bidirectional references made to 8×8 pixels. This is about five times as large as the amount of transfer in writing a decoded image. In Embodiment 6, the decoded image is written into the two frame memories, and the frame memories from which the two decoding units read the images in the motion compensation are different. Accordingly, the access performance necessary to read the image from the frame memory can be reduced by half, and thus the frame memory can be easily implemented.

6-5. Supplemental Remarks

The image decoding device 600 in Embodiment 6 includes the two frame memories. However, it should be noted that the number of frame memories is not limited to two, and may be three, four, or more.

Moreover, in Embodiment 6, each of the decoding unit 5 and the decoding unit 6 stores only the decoded image into the frame memories 11 and 44. However, the decoding unit may store control data associated with the decoded image, such as information necessary to perform decoding according to the direct mode in the H.264 standard.

Furthermore, in Embodiment 6, each of the decoding unit 5 and the decoding unit 6 writes the decoded image into the frame memories 11 and 44 at the same time. However, the decoded images do not necessarily need to be written at the same time. As long as data on all of the decoded images can be written, writing may be performed at different timings.

Embodiment 7

7-1. Overview

Firstly, an overview of an image coding device according to Embodiment 7 of the present invention is described.

In the image coding device in Embodiment 7, two coding units code two sub-images included in an input image in parallel, and the two divided streams generated as a result of this coding are stored into two buffers, respectively. Then, a stream connection unit of the image coding unit reads the two divided streams respectively stored in the two buffers to connect these streams into one coded stream. As a result, the input image is coded into the coded stream. Here, each of the two coding units codes the image in synchronization with the other coding unit, by reference to a part of data used for coding (i.e., neighboring information) via a neighboring information memory.

7-2. Configuration

Next, a configuration of the image coding device according to Embodiment 7 is described.

Figure 28:
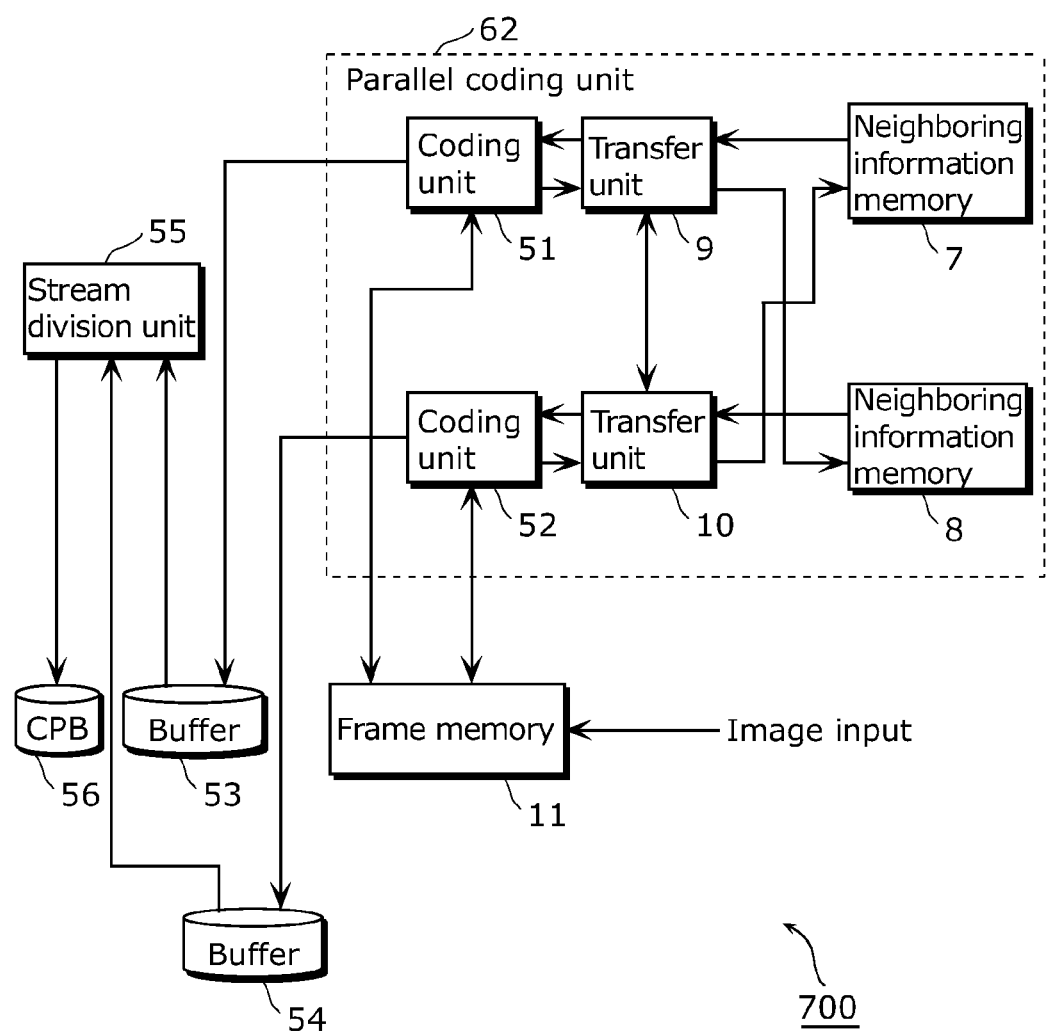
FIG. 28 is a block diagram showing a configuration of an image coding device in Embodiment 7 according to the present invention.

FIG. 28 is a block diagram showing the configuration of the image coding device according to Embodiment 7. Components identical to those described in Embodiment 1 are assigned the same reference signs used in Embodiment 1 and are not explained again here.

An image coding device 700 in Embodiment 7 includes a transfer unit 9, a transfer unit 10, a neighboring information memory 7, a neighboring information 8, and a frame memory 11, as in Embodiment 1. In addition, the image coding device 700 includes: a coding unit 51 and a coding unit 52 each of which codes an image inputted into the frame memory 11 by a camera, a decoder, or the like; a buffer 53 which stores a divided stream generated as a result of the coding performed by the coding unit 51; a buffer 54 which stores a divided stream generated as a result of the coding performed by the coding unit 52; a stream connection unit 55 which connects the divided streams respectively written into the buffer 53 and the buffer 54 so as to convert the streams into one coded stream; and a CPB 56 which stores this coded stream. The coding unit 51, the coding unit 52, the neighboring information memory 7, the neighboring information memory 8, the transfer unit 9, and the transfer 10 are collectively called a parallel coding unit 62.

7-3. Operation

Next, an operation performed by the image coding device in Embodiment 7 is described.

In the image coding device 700 in Embodiment 7 shown in FIG. 28, each of the coding unit 51 and the coding unit 52 reads and codes the image stored in the frame memory 11, for each macroblock, as in the case of the operation described with reference to FIG. 4A to FIG. 4C in Embodiment 1. More specifically, as shown in FIG. 4A, the coding unit 51 reads, for example, the macroblock line having the macroblock addresses 0 to 9 and the macroblock line having the macroblock addresses 20 to 29 included in the picture, i.e., the image, and then sequentially codes the macroblocks of the macroblock lines. Moreover, as shown in FIG. 4A, the coding unit 52 reads, for example, the macroblock line having the macroblock addresses 10 to 19 and the macroblock line having the macroblock addresses 30 to 39 included in the picture, i.e., the image, and then sequentially codes the macroblocks of the macroblock lines.

As with the decoding unit 5 in Embodiment 1, the coding unit 51 reads, from the neighboring information memory 7 via the transfer unit 9: a reconstructed sub-image as the neighboring information in advance of intra-picture prediction; a motion vector as the neighboring information in advance of the coding performed on the motion vector; and a deblocking-filtered image as the neighboring information in advance of the deblocking filtering process. Moreover, the coding unit 51 writes, into the neighboring information memory 8 via the transfer unit 9: the motion vector, as the neighboring information, on which the coding has been performed; a writing-target reconstructed sub-image, as the neighboring information, on which the reconstruction process has been performed; and a writing-target deblocking-filtered image, as the neighboring information, on which the deblocking filtering process has been performed. The coding unit 51 writes the divided stream generated as a result of the coding into the buffer 53. Since the rest of the operation performed by the coding unit 51 is the same as the operation performed by a common coding unit based on the H.264 standard, the explanation is omitted here.

The coding process performed by the coding unit 51 has been described thus far. An operation performed by the coding unit 52 is the same as the operation performed by the coding unit 51, except that the coding unit 52 uses the transfer unit 10, writes the neighboring information into the neighboring information memory 7, reads the neighboring information from the neighboring information memory 8, and writes the generated divided stream into the buffer 54. Therefore, a detailed explanation on the coding unit 52 is omitted here.

As described, the coding unit 51 and the coding unit 52 operate in parallel in synchronization with each other via the neighboring information memory 7 and the neighboring information memory 8, so that the image stored in the frame memory 11 is coded and, as a result, the two divided streams are generated. It should be noted that the coding process performed by this parallel coding unit 62 is a processing operation corresponding to the decoding process performed by the parallel decoding unit 60 in Embodiment 1.

Next, the stream connection unit 55 connects the divided stream stored in the buffer 53 and the divided stream stored in the buffer 54 to generate one coded stream. Then, the stream connection unit 55 stores this coded stream into the CPB 56.

7-4. Advantageous Effect

In Embodiment 7 as described thus far, the coding unit 51 and the coding unit 52 operate in parallel in synchronization with each other using the neighboring information memory 7 and the neighboring information memory 8 and the stream connection unit 55 connects the two divided streams. That is, the two sub-images included in the coding-target image are coded in parallel and then connected. As a result, an H.264-based coded stream that is not made up of units such as slices can be generated. Moreover, the processing performance can be doubled in Embodiment 7 as compared with the case where the image is coded by only one coding unit. In order to implement the same performance between the coding units, the operating frequency of each of the coding units can be reduced by half, thereby reducing power consumption.

In Embodiment 7, since the decoding unit 51 and the decoding unit 52 operates in parallel in synchronization with each other using the neighboring information memory 7 and the neighboring information memories 8 as buffers, the decoding unit 51 and the decoding unit 52 can start the processing at the same time as shown in FIG. 19A of Embodiment 1. Moreover, it becomes easy to control the start of coding. When the neighboring information necessary for the processing is written by the decoding unit 51 into the neighboring information memory 8, the decoding unit 52 can start processing for the target macroblock. On the other hand, in the image coding device disclosed in Patent Literature 1, each of the two coding units operate in synchronization with each other on a macroblock-by-macroblock basis, as in the case of the process shown in FIG. 19B. On this account, one of the two coding units that completes the coding process for the macroblock before the other coding unit has to wait until the start of the coding process for a next macroblock. In Embodiment 7, the coding unit does not have to wait until the start of the coding process. Thus, as compared with the image coding device disclosed in Patent Literature 1, a waiting time until the start of the process can be reduced and, therefore, the operation can be efficiently performed.

7-5. Supplemental Remarks

The image decoding device 700 in Embodiment 1 performs the coding process according to the H.264 standard. However, it should be noted the coding process may be performed according to a different image coding standard, such as VC-1.

Moreover, Embodiment 7 may be implemented as a hardware circuit or software that is executed by a processor. Alternatively, Embodiment 7 may be implemented partially as a hardware circuit and partially as software that is executed by a processor.

Furthermore, the image coding device 700 in Embodiment 7 includes the two coding units. However, the number of coding units is not limited to two, and may be three, four, or more. In such a case, the stream connection unit 55 connects the same number of divided streams as the number of coding units included in the image coding device 700.

Moreover, the image decoding device 700 in Embodiment 7 references to four neighboring macroblocks, which are the left, immediately-above, upper-right, and upper-left macroblocks. However, only the left macroblock or only the left and immediately-above macroblocks may be referenced. Alternatively, the macroblocks to be referenced may be different depending on a process.

Furthermore, the image decoding device 700 in Embodiment 7 includes the neighboring information memory as a component for storing the neighboring information. However, the component may be any other recording medium, such as a flip-flop or any other kind of memory element.

Moreover, the image decoding device 700 in Embodiment 7 stores all the pieces of neighboring information used for motion vector coding, intra-picture prediction, and deblocking filtering, into a single neighboring information memory. However, the neighboring information may be stored for each process in a different neighboring information memory (i.e., a memory element such as a memory or a flip-flop).

Furthermore, as with the image decoding device 100 in Embodiment 1, the image decoding device 700 in Embodiment 7 performs the deblocking filtering process using three pixels on each side of a boundary and writes, into the frame memory 11, the decoded image in the writing-target region located at a position shifted by this number of pixels. Note that the number of pixels may be more than three.

Moreover, the image decoding device 700 in Embodiment 7 stores the motion vector, the reconstructed sub-image, and the deblocking-filtered image as the neighboring information into the neighboring information memory. However, information to be stored is not limited to these, and any kind of information necessary between the macroblocks may be stored. For example, the intra-picture prediction mode, a total number of non-zero coefficients (TotalCoeff) among frequency coefficients of the macroblock, or a reference picture number (ref_idx) indicating a reference picture may be used as the neighboring information.

Furthermore, the image decoding device 700 in Embodiment 7 includes one transfer unit and one neighboring information memory for each of the coding units. However, the transfer unit and the neighboring information memory do not need to be provided for each of the coding units. For example, as long as transfer performance is satisfied, one transfer unit and one neighboring information memory may be provided to be shared by the plurality of coding units.

Moreover, the stream connection unit 55 in Embodiment 7 simply connects the two divided streams into one coded stream. However, the stream connection unit 55 may not only simply connects the streams, but also decode and re-code the whole or a part of the coded stream. Alternatively, the stream connection unit 55 may change the coding method of the coded stream into another coding method and store, into the CPB, the coded stream for which the coding method has been changed.

Furthermore, the coding unit in Embodiment 7 stores only the decoded image (the local decoded image) into the frame memory 11. However, the coding unit may store control data generated in the coding process and associated with the local decoded image, such as information necessary to perform decoding according to the direct mode in the H.264 standard.

Moreover, the image coding device 700 in Embodiment 7 has the configuration corresponding to the configuration of the image decoding device 100 in Embodiment 1. However, the image coding device 700 may have a configuration corresponding to the configuration described in any one of Embodiments 2 to 6.

Embodiment 8

8-1. Overview

Firstly, an overview of a transcoding device according to Embodiment 8 of the present invention is described.

In the transcoding device in Embodiment 8, a parallel decoding device 60 as described in Embodiment 1 firstly decodes an input coded stream and the decoded image is stored as a decoding result into a frame memory. Moreover, the transcoding device reads the decoded image from the frame memory, enlarges or reduces the read decoded image, and writes this enlarged or reduced decoded image as a resized image into the frame memory again. Following this, in the transcoding device, a parallel coding unit 62 as described in Embodiment 7 recodes the resized image according to a coding method, an image size, and a bit rate that are different from those in the case of the original coded stream. In this way, the decoding process and the coding process are performed at high speed, so that the transcoding process can be performed at high speed.

8-2. Configuration

Next, a configuration of the transcoding device according to Embodiment 8 is described.

Figure 29:
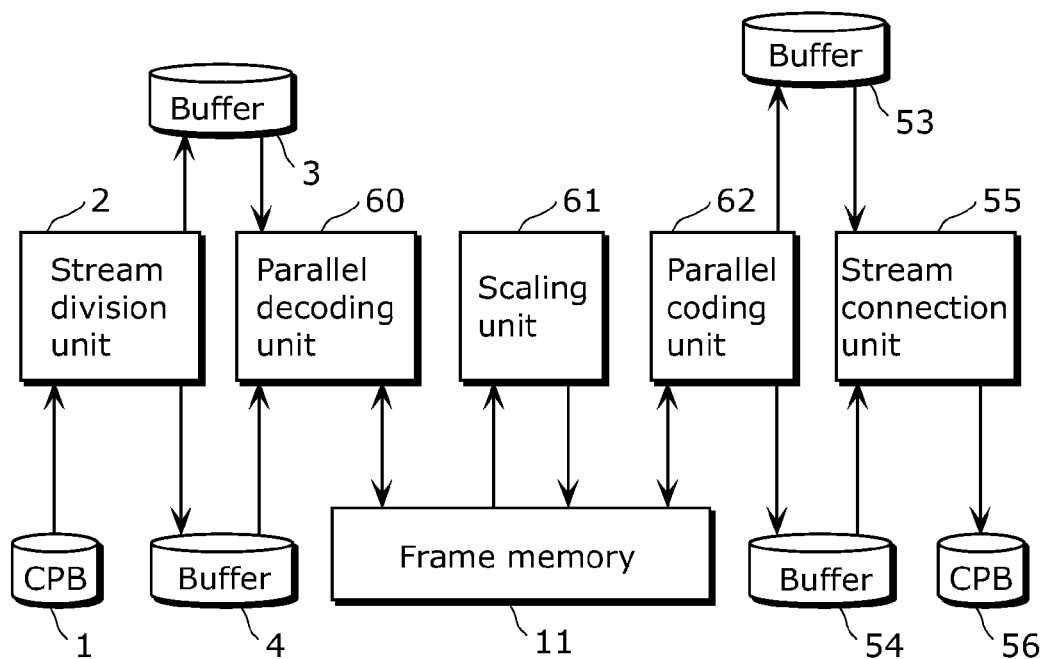
FIG. 29 is a block diagram showing a configuration of a transcoding device in Embodiment 8 according to the present invention.

FIG. 29 is a block diagram showing the configuration of the transcoding device according to Embodiment 8. Components identical to those described in Embodiments 1 and 7 are assigned the same reference signs used in Embodiments 1 and 7, and are not explained again here.

The transcoding device 800 in Embodiment 8 includes: CPBs 1 and 56; buffers 3, 4, 53, and 54; a frame memory 11; a stream division unit 2; a stream connection unit 55; the parallel decoding unit 60 in which a plurality of decoding units perform the decoding process in parallel; a scaling unit 61 which enlarges or reduces the decoded image stored in the frame memory 11; and the parallel coding unit 62 in which a plurality of coding units perform the coding process in parallel. In Embodiment 8, note that the CPB 1, the stream division unit 2, the buffer 3, the buffer 4, the frame memory 11, and the parallel decoding unit 60 make up the image decoding device 100 in Embodiment 1. Note also that the frame memory 11, the buffer 53, the buffer 54, the stream connection unit 55, the CPB 56, and the parallel coding unit 62 make up the image coding device 700 in Embodiment 7.

8-3. Operation

Next, an operation performed by the transcoding device 800 in Embodiment 8 is described.

As in Embodiment 1, the stream division unit 2 firstly divides the coded stream stored in the CPB 1 into two and writes the two divided streams into the buffer 3 and the buffer 4, respectively. Next, as in Embodiment 1, two decoding units included in the parallel decoding unit 60 read the divided streams in parallel from the buffer 3 and the buffer 4, decode the read divided streams, and then write the decoded images as decoding results into the frame memory 11.

Next, the scaling unit 61 reads, from the frame memory 11, the decoded images generated as a result of the decoding process performed by the parallel decoding unit 60. Then, the scaling unit 61 enlarges or reduces the read decoded images, and writes the enlarged or reduced decoded images as resized images into the frame memory 11.

Next, as in Embodiment 7, two coding units included in the parallel coding unit 62 perform the coding process in parallel on the resized images stored in the frame memory 11. Then, the two coding units write the two divided streams generated as a result of the coding process into the buffer 53 and the buffer 54, respectively. Here, the parallel coding unit 62 recodes the resized images according to a coding method, an image size, and a bit rate that are different from those in the case of the original coded stream.

Next, as in Embodiment 7, the stream connection unit 55 connects the divided streams respectively written into the buffer 53 and the buffer 54 into one coded stream, and writes the coded stream into the CPB 56.

8-4. Advantageous Effect

In Embodiment 8 as described thus far, since the parallel coding unit 62 performs the coding process according to a coding standard or a coding bit rate that is different from the standard of the coded stream stored in the CPB 1, the coded stream can be converted into a coded stream based on the different coding standard or bit rate. Moreover, the scaling unit 61 enlarges or reduces the image, so that the coded stream stored in the CPB 1 can be converted into a coded stream having a different image size.

Moreover, since the parallel decoding unit 60 and the parallel coding unit 62 are used in Embodiment 8, the transcoding process can be performed at a higher speed as compared with the case where the process is performed by the decoding unit or the coding unit alone. Or, the transcoding process can be performed at a lower operating frequency as compared with the case where the process is performed by the decoding unit or the coding unit alone.

8-5. Supplemental Remarks

It should be noted that although the scaling unit 61 of the transcoding device 800 in Embodiment 8 performs the scaling process, the scaling unit 61 may perform a high quality image processing or may perform both the scaling process and the high quality image processing. Moreover, the transcoding device 800 may code the decoded image as it is, without enlarging or reducing the image.

Moreover, the transcoding device 800 in Embodiment 8 includes the parallel decoding unit 60 and the parallel coding unit 62. However, the transcoding device 800 may include, instead of the parallel decoding unit 60, one decoding unit that does not perform the parallel decoding process. Alternatively, the transcoding device 800 may include, instead of the parallel coding unit 62, one coding unit that does not perform the parallel coding process. In other words, although the transcoding device 800 in Embodiment 8 includes the decoding unit and the coding unit, only one of the decoding unit and the coding unit may be configured as the corresponding one of the parallel decoding unit 60 and the parallel coding unit 62.

Furthermore, in the transcoding device 800 in Embodiment 8, the parallel decoding unit 60 includes the two decoding units and the parallel coding unit 62 includes the two coding units. Each of the numbers of the decoding units and the coding units is not necessarily limited two. In addition, the number of decoding units included in the parallel decoding unit 60 may be different from the number of coding units included in the parallel coding unit 62.

Moreover, the transcoding device 800 in Embodiment 8 uses the image decoding device 100 in Embodiment 1 and the image coding device 700 in Embodiment 7. However, instead of the image decoding device 100 in Embodiment 1, the image decoding device in any of Embodiments 2 to 6 may be used. Similarly, instead of the image coding device 700 in Embodiment 7, an image coding device corresponding to the image decoding device in any of Embodiments 2 to 6 may be used.

Embodiment 9

An image decoding device in Embodiment 9 includes a large scale integration (LSI) and a dynamic random access memory (DRAM).

Figure 30:
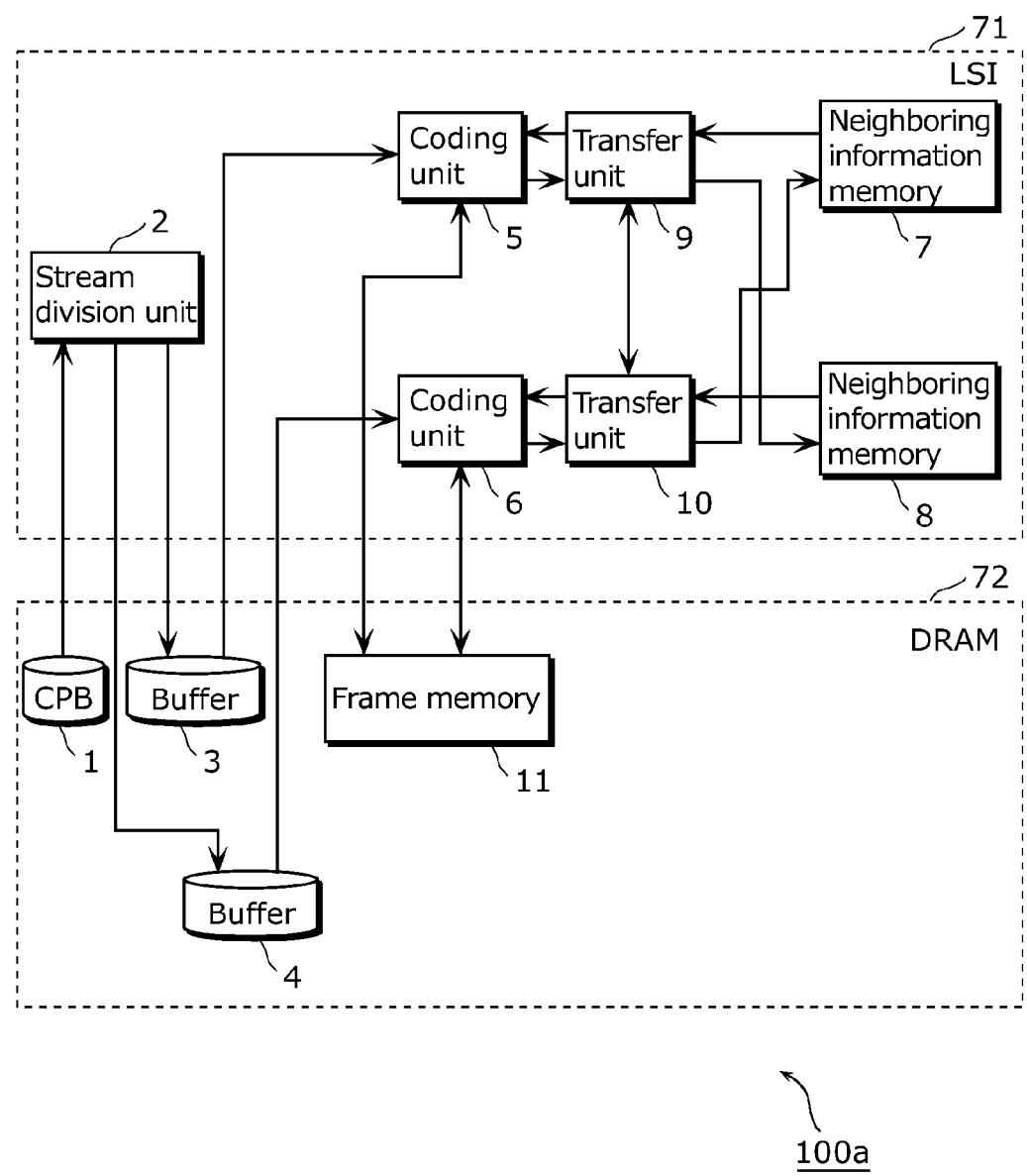
FIG. 30 is a block diagram showing a configuration of an image decoding device in Embodiment 9 according to the present invention.

FIG. 30 is a block diagram showing a configuration of the image decoding device in Embodiment 9.

An image decoding device 100a in Embodiment 9 includes: an LSI 71 including a part of the image decoding device 100 described in Embodiment 1; and a DRAM 72 including the rest of the image decoding device 100. It should be noted that the LSI 71 is a semiconductor integrated circuit. To be more specific, the LSI 71 includes the stream division unit 2, the decoding units 5 and 6, the neighboring information memories 7 and 8, and the transfer units 9 and 10 described in Embodiment 1. The DRAM 72 includes the CPB 1, the buffer 3, the buffer 4, and the frame memory 11 described in Embodiment 1.

Each of the aforementioned components may be individually integrated into one chip, or some or all of the components may be integrated into one chip. Although referred to as the LSI here, the integrated circuit may be referred to as an integrated circuit (IC), a system LSI, a super LSI, or an ultra LSI depending on the degree of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or use a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

In addition, the semiconductor chip on which the image decoding device 100a according to Embodiment 9 has been integrated can be combined with a display for drawing images, to form an image drawing device depending on various applications. The image decoding device 100a in Embodiment 9 can thereby be used as a decoding unit in an information drawing means for a mobile phone, a television set, a digital video recorder, a digital camcorder, a vehicle navigation device, and the like. The display in the combination may be, for example: a cathode-ray tube (CRT); a flat display such as a liquid crystal display, a plasma display panel (PDP), or an organic electroluminescent (EL) display; or a projection display represented by a projector.

The image decoding device 100a in Embodiment 9 is configured with the LSI and the DRAM. However, the image decoding device 100a may be configured with, instead of the DRAM, a different storage device, such as an embedded DRAM (eDRAM), a static random access memory (SRAM), or a hard disk.

Embodiment 10

An image decoding device in Embodiment 10 includes two LSIs and two DRAMs.

Figure 31:
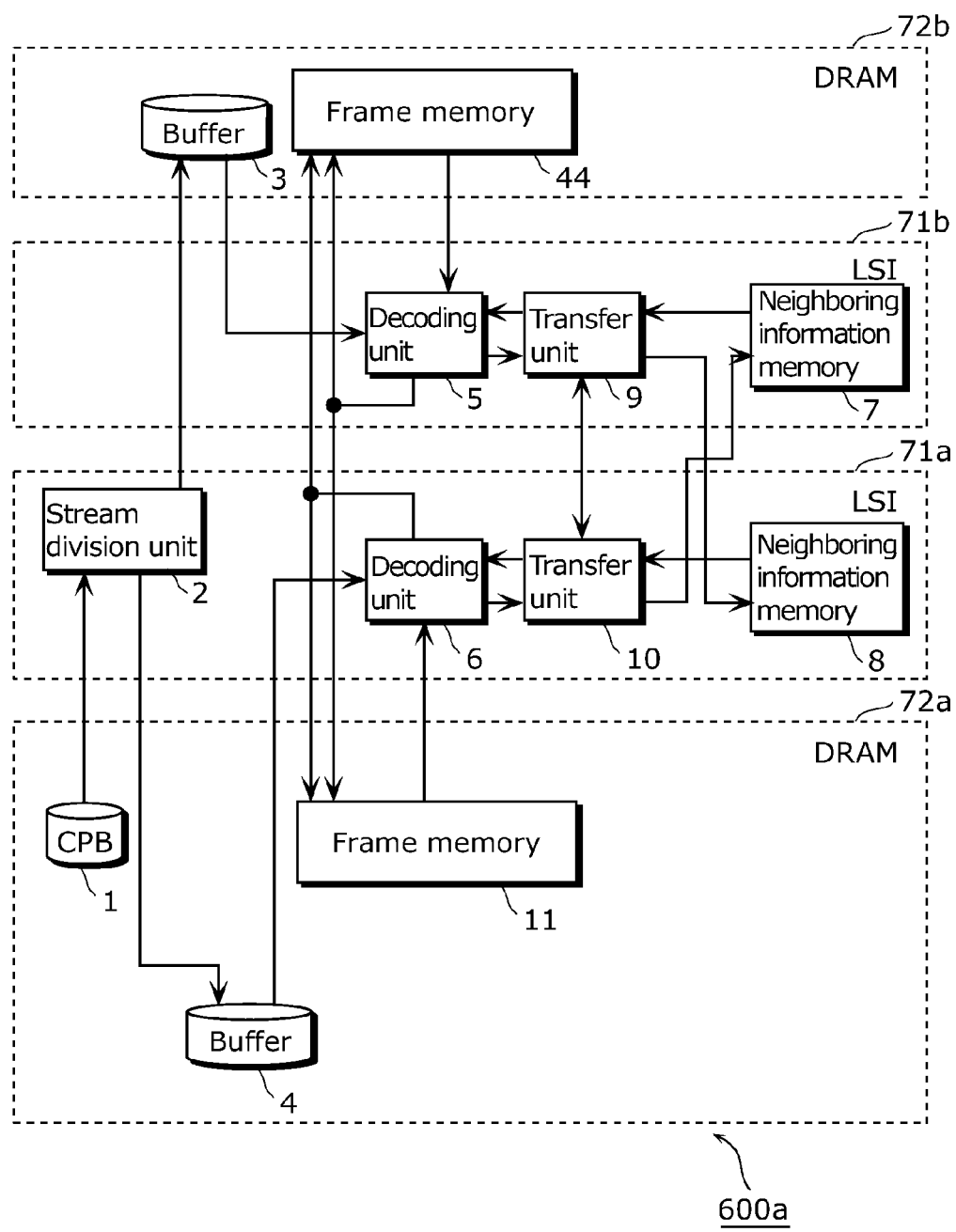
FIG. 31 is a block diagram showing a configuration of an image decoding device in Embodiment 10 according to the present invention.

FIG. 31 is a block diagram showing a configuration of the image decoding device in Embodiment 10.

An image decoding device 600a includes: LSIs 71a and 71b each of which includes a part of the image decoding device 600 described in Embodiment 6; and DRAMs 72a and 72b including the rest of the image decoding device 600. It should be noted that each of the LSIs 71a and 71b is a semiconductor integrated circuit. To be more specific, the LSI 71a includes the stream division unit 2, the decoding unit 6, the transfer unit 10, and the neighboring information memory 8 described in Embodiment 6. The LSI 71b includes the decoding unit 5, the transfer unit 9, and the neighboring information memory 7 described in Embodiment 6. The DRAM 72a includes the CPB 1, the buffer 4, and the frame memory 11 described in Embodiment 6. The DRAM 72b includes the buffer 3 and the frame memory 44 described in Embodiment 6.

Embodiment 10 is implemented using the two LSIs. These LSIs may be integrated into one chip, or some or all of the components in the LSIs may be integrated into one chip. Although referred to as the LSI here, the integrated circuit may be referred to as an IC, a system LSI, a super LSI, or an ultra LSI depending on the degree of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or use a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

In addition, the semiconductor chip on which the image decoding device 600a according to Embodiment 10 has been integrated can be combined with a display for drawing images to form an image drawing device depending on various applications. The image decoding device 600a in Embodiment 10 can thereby be used as a decoding unit in an information drawing means for a mobile phone, a television set, a digital video recorder, a digital camcorder, a vehicle navigation device, and the like. The display in the combination may be, for example: a cathode-ray tube (CRT); a flat display such as a liquid crystal display, a plasma display panel (PDP), or an organic electroluminescent (EL) display; or a projection display represented by a projector.

The image decoding device 600a in Embodiment 10 is configured with the LSI and the DRAM. However, the image decoding device 600a may be configured with, instead of the DRAM, a different storage device, such as an eDRAM, an SRAM, or a hard disk.

Embodiment 11

Figure 32:
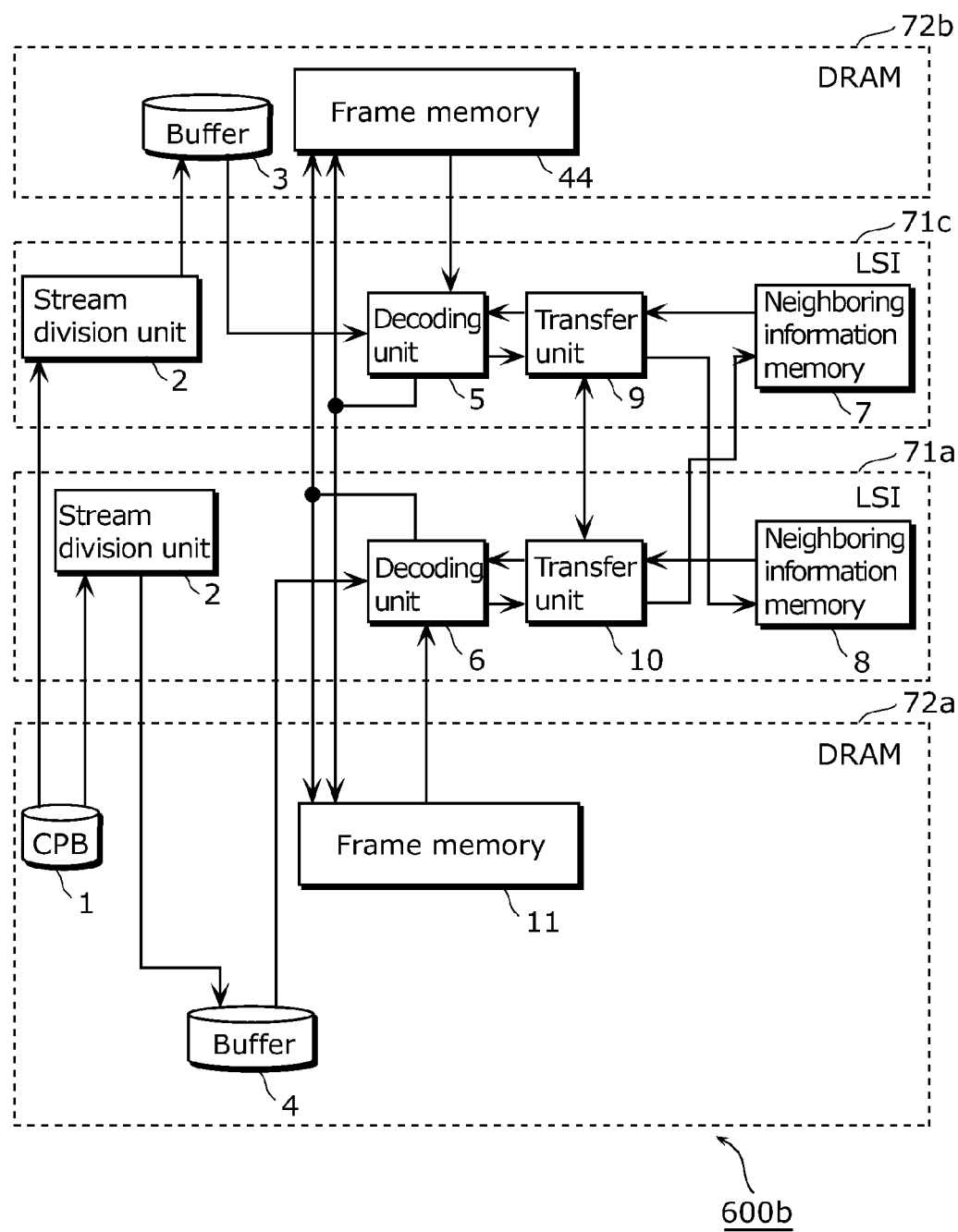
FIG. 32 is a block diagram showing a configuration of an image decoding device in Embodiment 11 according to the present invention.

An image decoding device in Embodiment 11 includes two LSIs and two DRAMs, as in Embodiment 10. However, the image decoding device in Embodiment 11 is characterized in that a stream division unit 2 is provided for each of the two LSIs FIG. 32 is a diagram showing a configuration of the image decoding device in Embodiment 11.

An image decoding device 600b in Embodiment 11 includes an LSI 71a and DRAMs 72a and 72b, as in the image decoding device 600 in Embodiment 10. Moreover, the image decoding device 600b includes an LSI 71c, instead of the LSI 71b included in the image decoding device 600. The LSI 71c includes the stream division unit 2, the decoding unit 5, the transfer unit 9, and the neighboring information 7. The stream division unit 2 of the LSI 71a reads a coded stream from the CPB 1, divides the read coded stream into two, and stores the divided streams which are generated as a result of the division and are to be processed by the LSI 71a into the buffer 4. Similarly, the stream division unit 2 of the LSI 71c reads a coded stream from the CPB 1, divides the read coded stream into two, and stores the divided streams which are generated as a result of the division and are to be processed by the LSI 71c into the buffer 3. Accordingly, each of the LSIs 71a and 71c codes the divided streams in parallel.

It should be noted that the each of the stream division units 2 may store the two divided streams generated as a result of the division into the buffer 3 or the buffer 4. In such a case, each of the decoding unit 5 and the decoding unit 6 selects the buffer 3 or the buffer 4 from which the target divided streams is to be read, and then decodes the read divided streams in parallel.

Embodiment 12

The processing described in above Embodiments can be simply implemented by recording, onto a recording medium, a program for implementing the image decoding device, the image coding device, and the transcoding device described in above Embodiments. The recording medium may be any recording medium as long as the program can be recorded thereon, such as a magnetic disk, an optical disc, a magnetic optical disc, an IC card, and a semiconductor memory.

Hereinafter, the applications to the image decoding device, image coding device, the transcoding device, and the methods thereof described in above Embodiments and a system using the same will be described.

Figure 33:
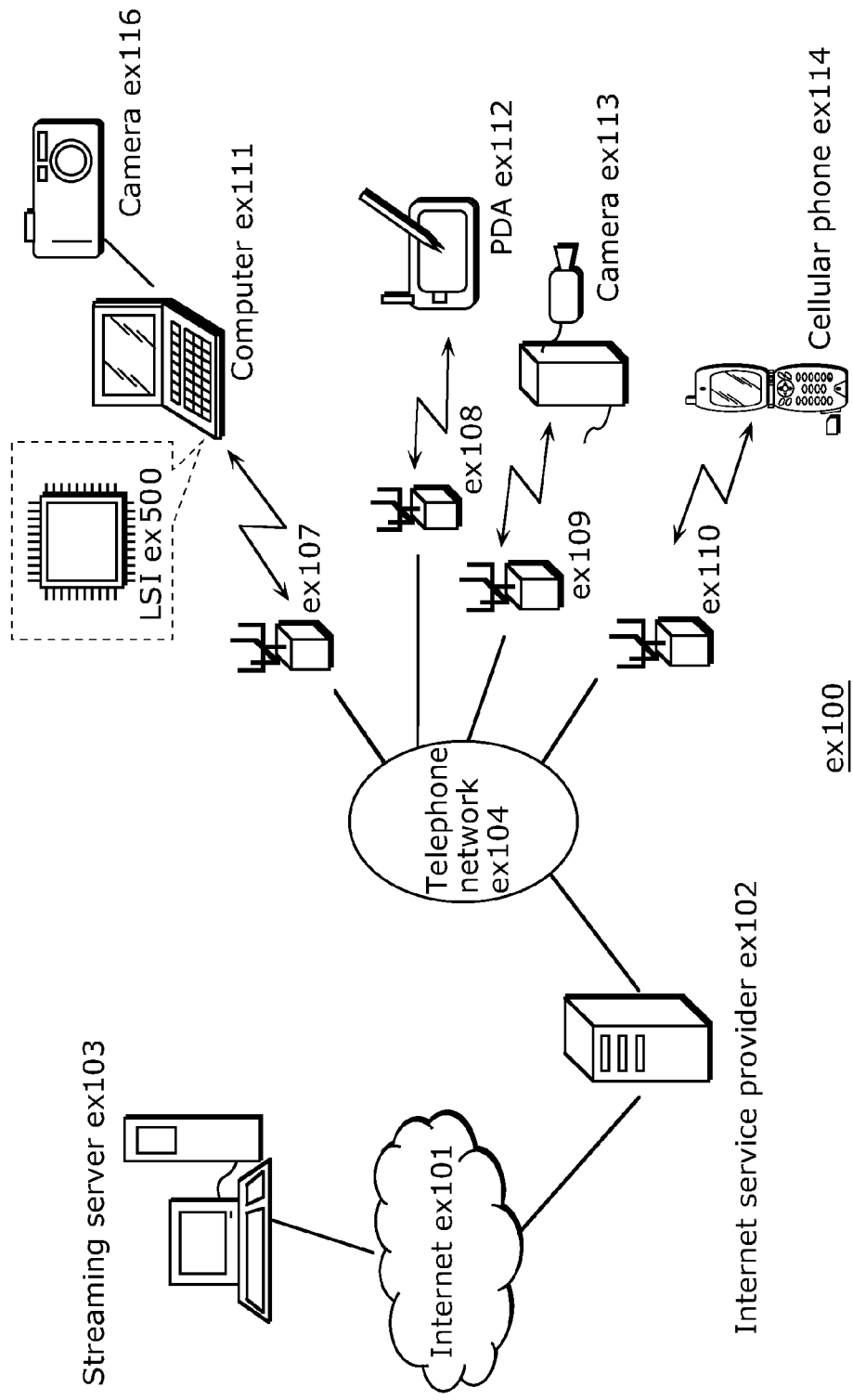
FIG. 33 is a block diagram showing an overall configuration of a content providing system for implementing content distribution services, in Embodiment 12 according to the present invention.

FIG. 33 illustrates an overall configuration of a content providing system ex100 for implementing content distribution services. The area for providing communication services is divided into cells of desired size, and base stations ex107 to ex110 which are fixed wireless stations are placed in each of the cells.

The content providing system ex100 is connected to devices, such as a computer ex111, a personal digital assistant (PDA) ex112, a camera ex113, and a cellular phone ex114, via an Internet ex101, an Internet service provider ex102, a telephone network ex104, as well as the base stations ex107 to ex110.

However, the configuration of the content providing system ex102 is not limited to the configuration shown in FIG. 33, and a combination in which any of the elements are connected is acceptable. In addition, each of the devices may be directly connected to the telephone network ex104, rather than via the base stations ex107 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, and the cellular phone ex114 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding moving images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 34:
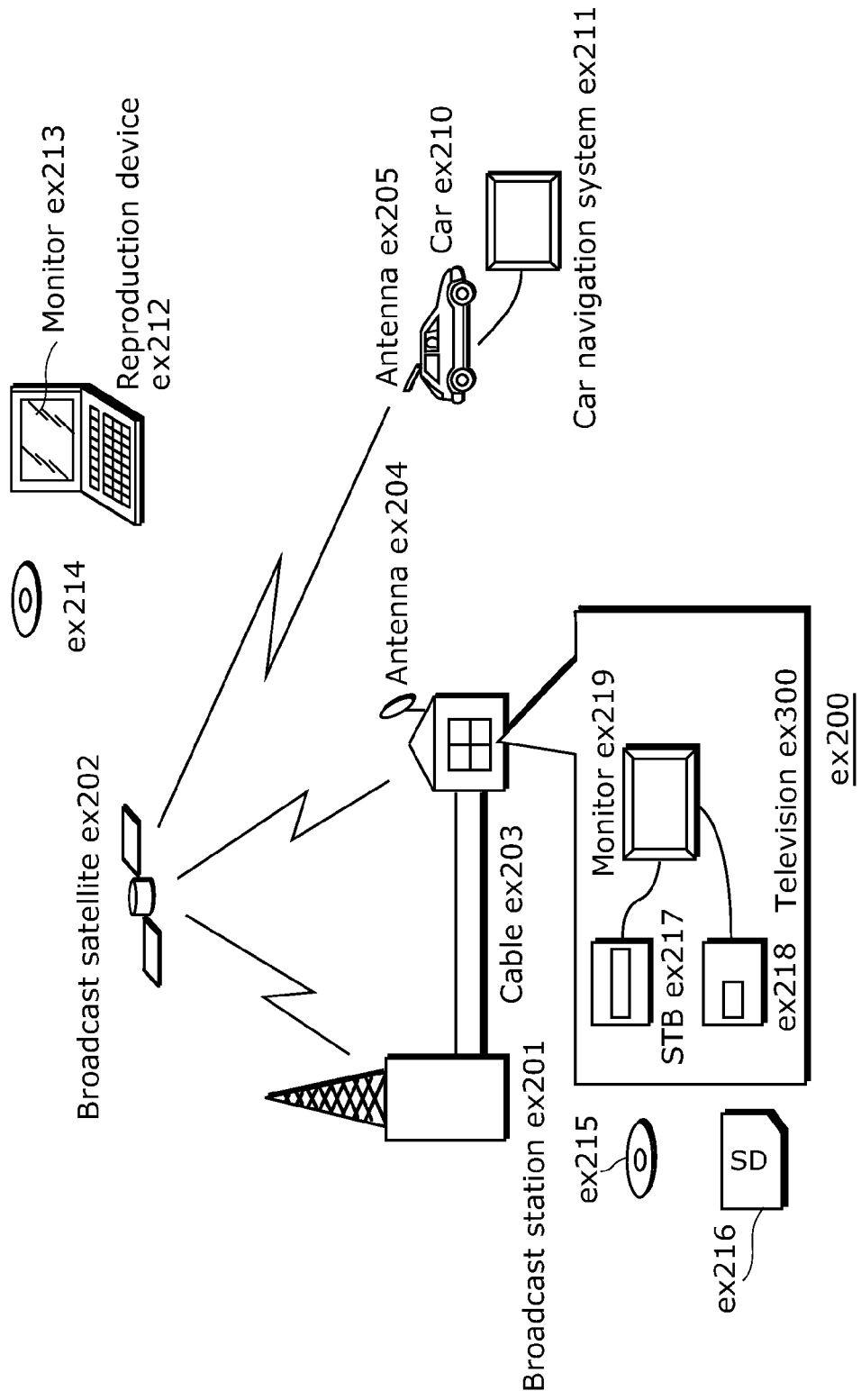
FIG. 34 is a block diagram showing an overall configuration of a digital broadcasting system in Embodiment 12 according to the present invention.

The present invention is not limited to the above-mentioned content providing system ex100, and at least either the image coding device or the image decoding device described in above Embodiments can be incorporated into a digital broadcasting system ex200 as shown in FIG. 34. More specifically, a broadcast station ex201 communicates and transmits, via radio waves to a broadcast satellite ex202, a bit stream of video information. This bit stream is the coded bit stream having been coded by the image coding device described in above Embodiment. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217, decodes the coded bit stream and reproduces the decoded bit stream.

Furthermore, a reproduction device ex212 that reads and decodes a bit stream recorded on a storage medium ex214, such as a compact disc (CD) and a digital versatile disc (DVD), may include the image decoding device described in above Embodiments. In this case, the reproduced video signals are displayed on the monitor ex213.

Furthermore, the image decoding device or the image coding device as described in above Embodiments can be implemented in a reader/recorder ex218 (i) for reading and decoding the coded bit stream recorded on a recording medium 215 such as a DVD or a blu-ray disc (BD), or (ii) for coding the video signals and recording the resulting data on the recording medium ex215. In this case, the reproduced video signals are displayed on the monitor ex219. Furthermore, the reproduced video signals can be reproduced by another device or system, using the recording medium ex215 on which the coded bit stream is recorded. Furthermore, it is also possible to implement the image decoding device in the set top box ex217 connected to the cable ex203 for a cable television or the antenna ex204 for satellite and/or terrestrial broadcasting, so as to display the video signals on the monitor ex219 of the television. The image decoding device may be included not in the set top box but in the television.

Figure 35:
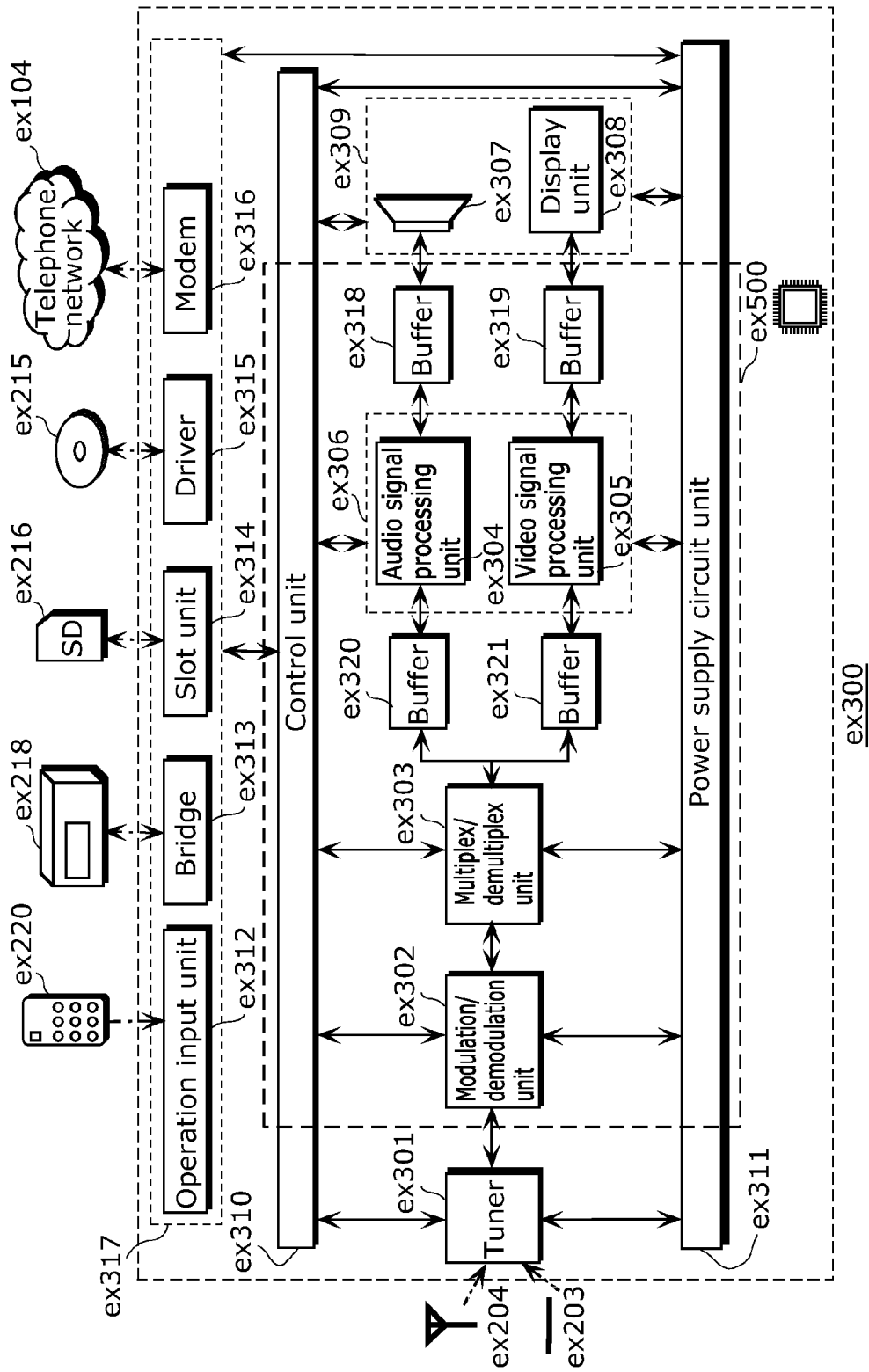
FIG. 35 is a block diagram showing an example of a configuration of a television in Embodiment 12 according to the present invention.

FIG. 35 illustrates the television (receiver) ex300 that uses the image decoding method described in above Embodiments. The television ex300 includes: a tuner ex301 that obtains or provides a bit stream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the image coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may not be capable of performing all the processes but only capable of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 36:
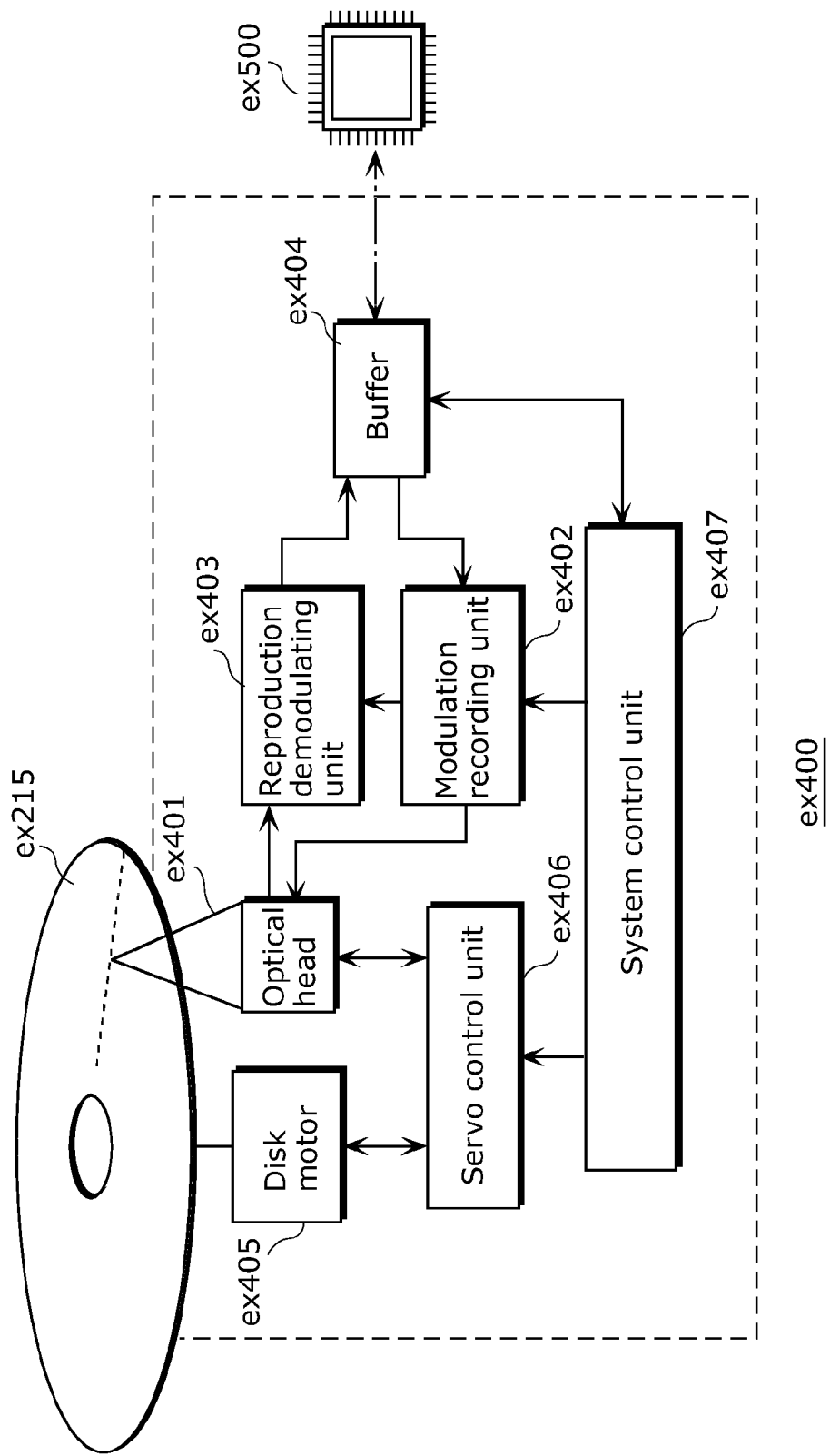
FIG. 36 is a block diagram showing an example of a configuration of an information reproducing-recording unit in Embodiment 12 according to the present invention.

As an example, FIG. 36 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 37:
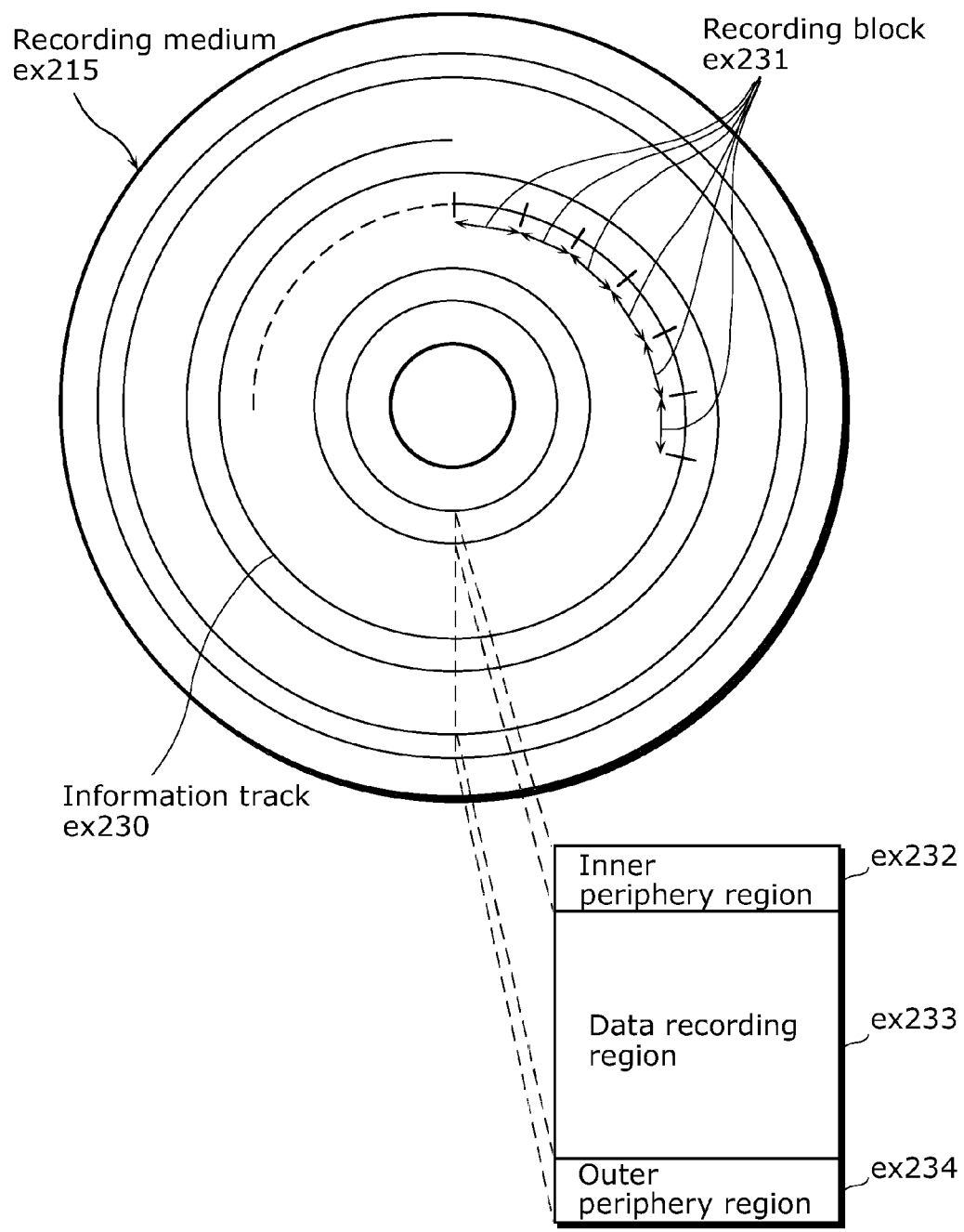
FIG. 37 is a diagram showing an example of a structure of a recording medium that is an optical disc, in Embodiment 12 according to the present invention.

FIG. 37 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 35. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding device, the moving image decoding device, or the methods thereof described in above Embodiments can be used in any of the devices and systems described. Thus, the advantages described therein can be obtained.

Furthermore, the present invention is not limited to above Embodiments, and various modifications and revisions are possible without departing from the scope of the present invention.

Embodiment 13

Figure 38:
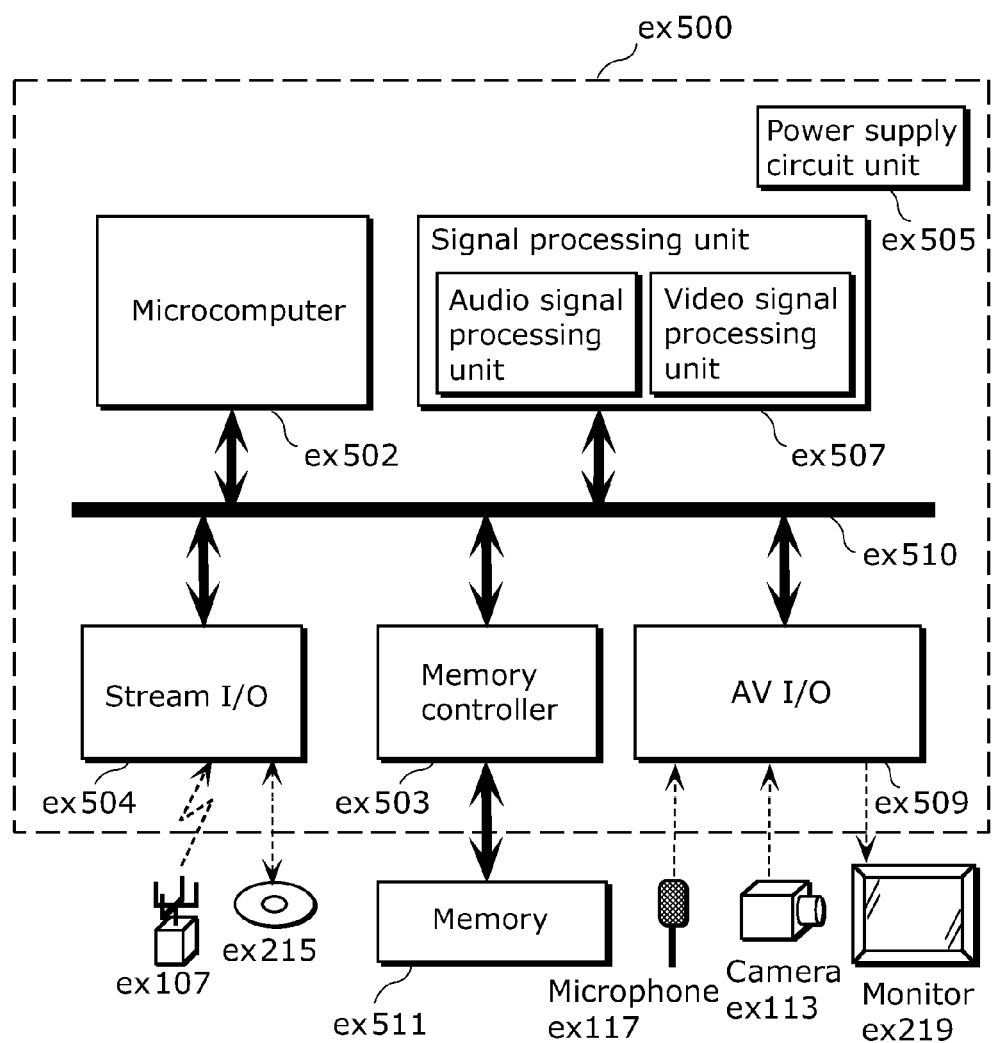
FIG. 38 is a block diagram showing an example of a configuration of an integrated circuit for implementing an image decoding device, in Embodiment 13 according to the present invention.

Each of the image decoding devices and the image decoding methods in above Embodiments is achieved by an LSI which is typically an integrated circuit. As an example, FIG. 38 illustrates a configuration of an LSI ex500 that is made into one chip. The LSI ex500 includes elements ex502 to ex509 to be described below, and the elements are connected to each other through a bus ex510. The power supply circuit unit ex505 is activated by supplying each of the elements with power when power is on.

For example, when coded data is decoded, the LSI ex500 temporarily stores, in the memory ex511, the coded data obtained from the base station ex107 through the stream I/O ex504 or read from the recording medium ex215 under control of the microcomputer ex502. Under control of the microcomputer ex502, the stored data is subdivided into data portions according to the computing amount and speed as necessary. Then, the data portions are transmitted to a signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the memory ex511 and others so that the signals can be reproduced in synchronization with each other. The decoded output signal is provided from the AV I/O ex509 to the monitor ex219 via, for example, the memory ex511 as necessary. When the memory ex511 is accessed, a memory controller ex503 is used.

Although the memory ex511 is an element outside the LSI ex500 in the description, it may be included in the LSI ex500. Furthermore, the LSI ex500 may be made into one chip or a plurality of chips.

Although referred to as the LSI here, the integrated circuit may be referred to as an IC, a system LSI, a super LSI, or an ultra LSI depending on the degree of integration.

The technique of integrated circuit is not limited to the LSI, and it may be implemented as a dedicated circuit or a general-purpose processor. It is also possible to use a FPGA (Field Programmable Gate Array) that can be programmed after manufacturing the LSI, or use a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

Although the present invention has been described based on Embodiments 1 to 13, the present invention is not limited to these Embodiments.

For example, although the image decoding device 100 in Embodiment 1 includes the neighboring information memories 7 and 8, the image decoding device 100 may not include such two memories.

Figure 39:
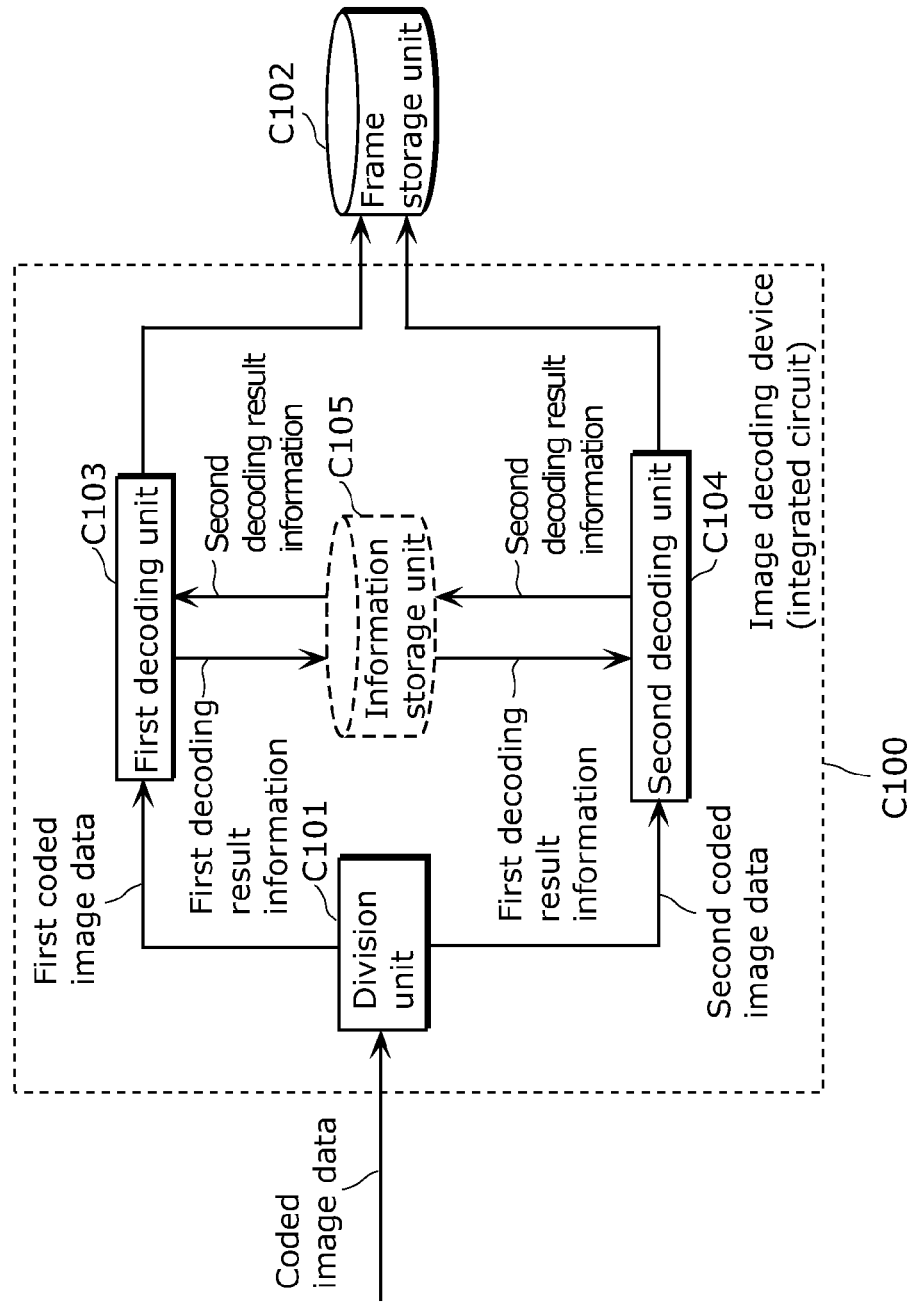
FIG. 39 is a block diagram showing a configuration of an image decoding device in an aspect according to the present invention.

FIG. 39 is a block diagram showing a configuration of an image decoding device in an aspect according to the present invention.

An image decoding device C100 in an aspect according to the present invention decodes coded image data. Here, the coded image data includes a coded picture having a plurality of macroblock lines each of which has a plurality of macroblocks aligned in a row. The image decoding device C100 includes: a division unit C101 which divides the picture into first coded image data and second coded image data by assigning, at least for each of the macroblock lines included in the picture, the macroblock line as a part of one of the first coded image data and the second coded image data; and a first decoding unit C103 and a second decoding unit C104 which decode, in parallel, the macroblock line included in the first coded image data and the macroblock line included in the second coded image data, respectively, and store the decoded macroblock lines into a frame storage unit C102, the macroblock lines decoded by the first decoding unit C103 and the second decoding unit C104 being adjacent to each other in the picture.

The first decoding unit C103 decodes the first coded image data using second decoding result information stored in an information storage unit C105 and stores, as first decoding result information, a part of information generated as a result of the decoding into the information storage unit C105. Here, when decoding a target macroblock included in the first coded image data, the first decoding unit C103 performs image processing on the second decoding result information and the target macroblock and stores at least a part of each of the image-processed target macroblock and the image-processed second decoding result information into the frame storage unit C102, the second decoding result information indicating at least a part of the other macroblock that has been decoded by the second decoding unit C104 and is included in the other macroblock line adjacent to the macroblock line including the target macroblock.

The second decoding unit C104 decodes the second coded image data using the first decoding result information stored in the information storage unit C105 and stores, as the second decoding result information, a part of information generated as a result of the decoding into the information storage unit C105. Here, when decoding a target macroblock included in the second coded image data, the second decoding unit C104 performs image processing on the first decoding result information and the target macroblock and stores at least a part of each of the image-processed target macroblock and the image-processed first decoding result information into the frame storage unit C102, the first decoding result information indicating at least a part of the other macroblock that has been decoded by the first decoding unit C103 and is included in the other macroblock line adjacent to the macroblock line including the target macroblock. Here, the image decoding device C100 including the division unit C101 and the first and second decoding units C103 and C104 may be configured as an integrated circuit.

Note that the division unit C101 corresponds to the stream division unit 2 described in Embodiments 1 to 6, and that the frame storage unit C102 corresponds to the frame memory 11 described in Embodiments 1 to 6. Note also that the first decoding unit C103 corresponds to the decoding unit 5 and the transfer unit 9 described in Embodiments 1 to 6, and that the second decoding unit C104 corresponds to the decoding unit 6 and the transfer unit 10 described in Embodiments 1 to 6. Moreover, the information storage unit C105 corresponds to a recording medium including the neighboring information memories 7 and 8 described in Embodiments 1 to 6. Furthermore, note that the coded image data corresponds to the coded stream described in Embodiments 1 to 6. Note also that the first and second coded image data correspond to the divided streams described in Embodiments 1 to 6, and that the first and second decoding result information corresponds to the neighboring information described in Embodiments 1 to 6.

Figure 40:
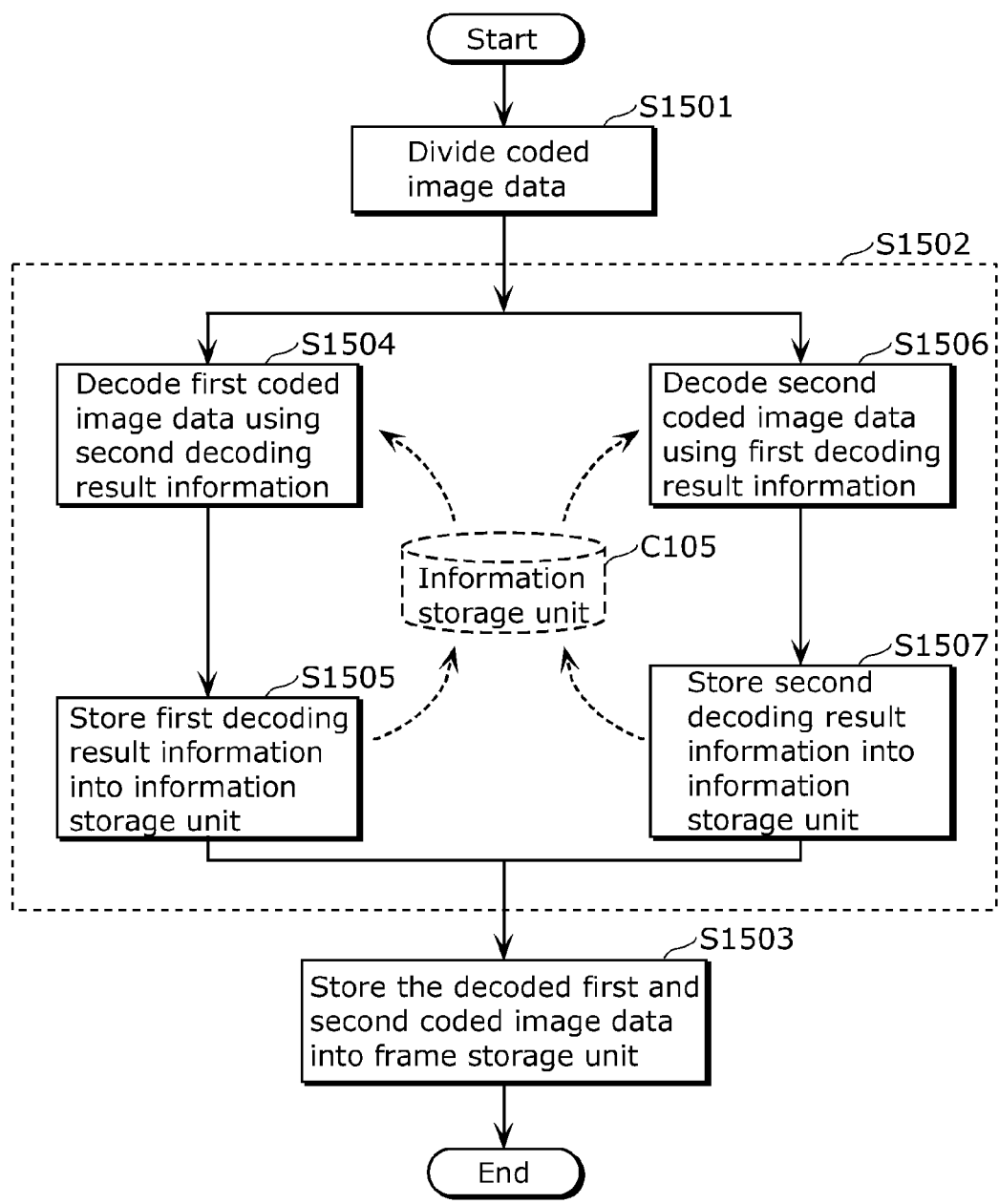
FIG. 40 is a flowchart showing an operation performed by an image decoding device in an aspect according to the present invention.

FIG. 40 is a flowchart showing an operation performed by the image decoding device C100.

The image decoding device C100 firstly divides a picture into first coded image data and second coded image data by assigning, at least for each of macroblock lines included in the picture, the macroblock line as a part of one of the first coded image data and the second coded image data (S1501). Then, the image decoding device C100 decodes, in parallel, the macroblock line included in the first coded image data and the macroblock line included in the second coded image data (S1502), and stores the decoded macroblock lines into the frame storage unit C102 (S1503), the macroblock lines to be decoded being adjacent to each other in the picture.

When decoding the first coded image data in step S1502, the first decoding unit C103 of the image decoding device C100 decodes the first coded image data using second decoding result information stored in the information storage unit C105 (S1504) and stores, as first decoding result information, a part of information generated as a result of the decoding into the information storage unit C105 (S1505). When decoding a target macroblock included in the first coded image data in step S1504, the first decoding unit C103 performs image processing on the second decoding result information and the target macroblock and stores at least a part of each of the image-processed target macroblock and the image-processed second decoding result information into the frame storage unit C102, the second decoding result information indicating at least a part of the other macroblock that has been decoded and is included in the other macroblock line adjacent to the macroblock line including the target macroblock.

When decoding the second coded image data in step S1502, the second decoding unit C104 of the image decoding device C100 decodes the second coded image data using the first decoding result information stored in the information storage unit C105 (S1506) and stores, as the second decoding result information, a part of information generated as a result of the decoding into the information storage unit (S1507). When decoding a target macroblock included in the second coded image data in step S1506, the second decoding unit C104 performs image processing on the first decoding result information and the target macroblock and stores at least a part of each of the image-processed target macroblock and the image-processed first decoding result information into the frame storage unit C102, the first decoding result information indicating at least a part of the other macroblock that has been decoded and is included in the other macroblock line adjacent to the macroblock line including the target macroblock.

With this, the image processing, such as the deblocking filtering process performed across the macroblock lines, is performed on the first and second coded image data (the divided streams) in parallel. Thus, a speedup of the overall decoding processing can be sufficiently achieved, resulting in an increase in decoding performance or decoding efficiency. After the macroblock is decoded and stored in the frame storage unit (namely, the frame memory) by the first or second decoding unit (C103 or C104), this means that the deblocking filtering process has been performed on this macroblock. Therefore, unlike the case where the deblocking filtering process needs to be performed after the macroblock is stored in the frame storage unit C102, it is not necessary to take the trouble to read the macroblock from the frame storage unit C102. This can reduce the number of times the frame storage unit C102 is accessed.

In the image decoding device C100, the coded image data is divided into the first and second coded image data, and the first and second coded image data are decoded in parallel by the first and second decoding units C103 and C104, respectively. Since the first and second coded image data are decoded in synchronization with each other according to the data dependency via the information storage unit C105, the image decoding device C100 can omit the macroblock pipeline control unit disclosed in Patent Literature 1 that collectively controls timings of decoding performed by the decoding units. Moreover, even in the case where the image decoding device C100 divides the coded image data into three or more sets of data and includes many decoding units to decode these sets of data in parallel, it is not necessary to place a signal line between the macroblock pipeline control unit and each of the decoding units as in Patent Literature 1. Thus, the image decoding device can be easily implemented. Furthermore, in the image decoding device C100, the first and second decoding result information required according to the dependency relationship between the data on the basis of the H.264 standard is sent and received between the first and second decoding units C103 and C104 via the information storage unit C105. Therefore, when the first or second decoding result information necessary for decoding is stored in the information storage unit C105, the corresponding first decoding unit C103 or second decoding unit C104 can continue decoding the first or second coded image data using the stored first or second decoding result information without having to wait for the other decoding unit to finish decoding. Accordingly, unlike the image decoding device disclosed in Patent Literature 1, no loss of time is caused since the decoding processing is not interrupted, thereby increasing the decoding efficiency.

Thus, the image decoding device according to the present invention can achieve the aforementioned advantageous effect without including the two memories (i.e., the neighboring information memories 7 and 8) for storing the partial decoding results. Moreover, the image decoding device according to the present invention can achieve the aforementioned advantageous effect without including the frame storage unit C102 (i.e., the frame memory 11) and the CPB 1 and the buffers 3 and 4 shown in FIG. 1.

Moreover, as shown in FIG. 39, an integrated circuit in an aspect according to the present invention includes the division unit C101 and the first and second decoding units C103 and C104. However, the integrated circuit may include only one of the first and second decoding units C103 and C104.

Figure 41:
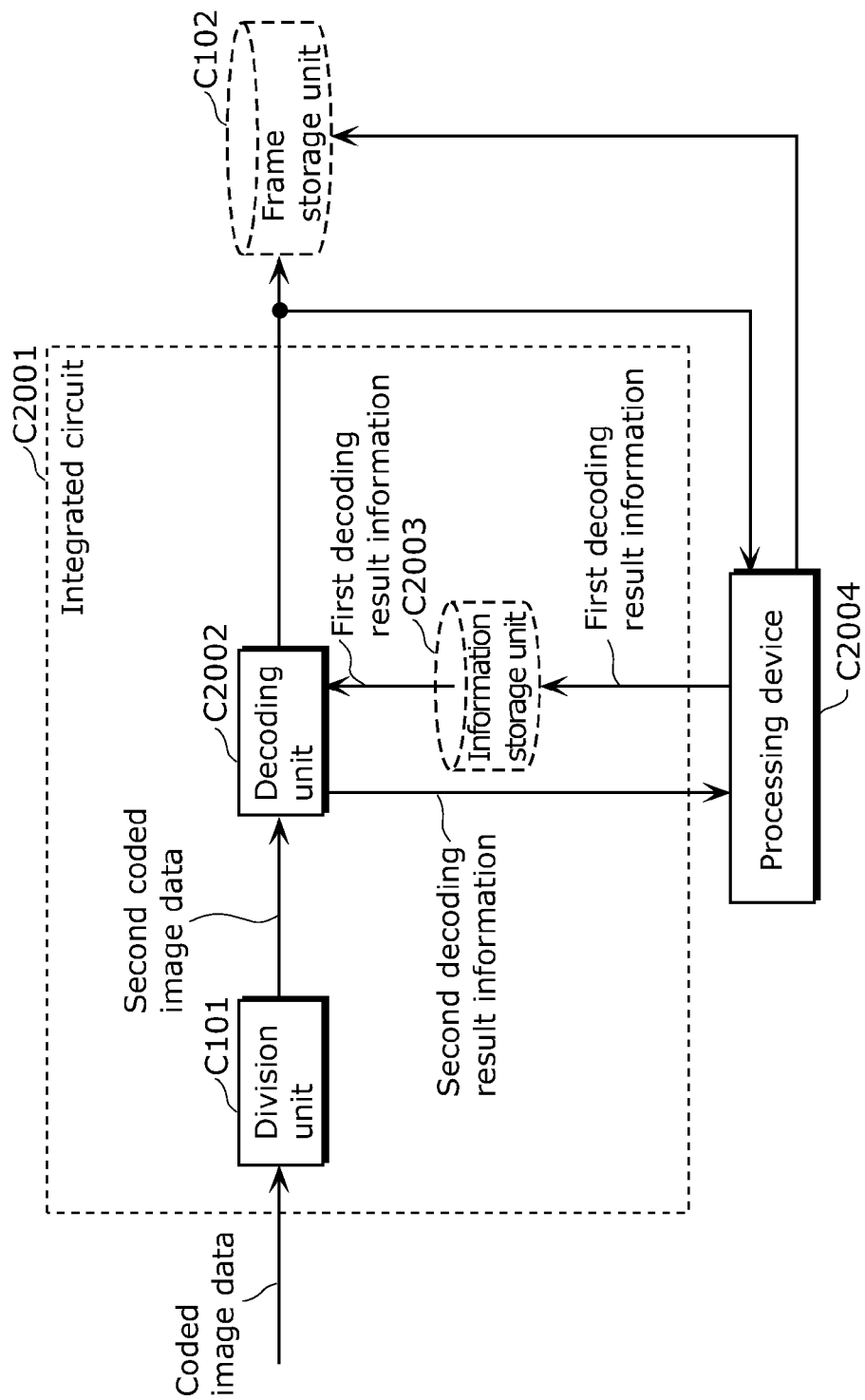
FIG. 41 is a block diagram showing a configuration of an integrated circuit in another aspect according to the present invention.

FIG. 41 is a block diagram showing a configuration of the integrated circuit in another aspect according to the present invention.

An integrated circuit C2001 in another aspect according to the present invention decodes a part of coded image data. Here, the coded image data includes a coded picture having a plurality of macroblock lines each of which has a plurality of macroblocks aligned in a row. The integrated circuit C2001 includes a division unit C101 and a decoding unit C2002. The division unit C101 divides the picture into first coded image data and second coded image data by assigning, at least for each of the macroblock lines included in the picture, the macroblock line as a part of one of the first coded image data and the second coded image data. The decoding unit C2002 decodes the macroblock line included in the second coded image data in parallel with a process performed by a processing device C2004 connected to the integrated circuit C2001 to decode the macroblock line included in the first coded image data. These two macroblock lines to be decoded are adjacent to each other in the picture. Then, the decoding unit C2002 stores the decoded macroblock line into the frame storage unit C102.

The decoding unit C2002 decodes the second coded image data using first decoding result information stored in an information storage unit C2003 and stores, as second decoding result information, a part of information generated as a result of the decoding into the information storage unit C2003.

When decoding a target macroblock included in the second coded image data, the decoding unit C2002 performs image processing on the first decoding result information and the target macroblock and stores at least a part of each of the image-processed target macroblock and the image-processed first decoding result information into the frame storage unit C102, the first decoding result information indicating at least a part of the other macroblock that has been decoded by the processing device C2004 and is included in the other macroblock line adjacent to the macroblock line including the target macroblock.

The processing device C2004 decodes the first coded image data using the second decoding result information stored in the processing device C2004 and stores, as the first decoding result information, a part of information generated as a result of the decoding into the information storage unit C2003.

When decoding a target macroblock included in the first coded image data, the processing device C2004 performs image processing on the second decoding result information and the target macroblock and stores at least a part of each of the image-processed target macroblock and the image-processed second decoding result information into the frame storage unit C102, the second decoding result information indicating at least a part of the other macroblock that has been decoded by the decoding unit C2002 and is included in the other macroblock line adjacent to the macroblock line including the target macroblock.

Note that the integrated circuit C2001 corresponds to the LSI 71a shown in FIG. 31 or FIG. 32. Here, the decoding unit C2002 corresponds to the decoding unit 6 and the transfer unit 10 included in the LSI 71a, and the information storage unit C2003 corresponds to the neighboring information memory 8 included in the LSI 71a.

The integrated circuit C2001 as described above achieves the same advantageous effect as the image decoding device C100, by performing an operation collaboratively with the LSI 71b (i.e., the processing device C2004) shown in FIG. 31 or the LSI 71c (i.e., the processing device C2004) shown in FIG. 32.

Figure 42:
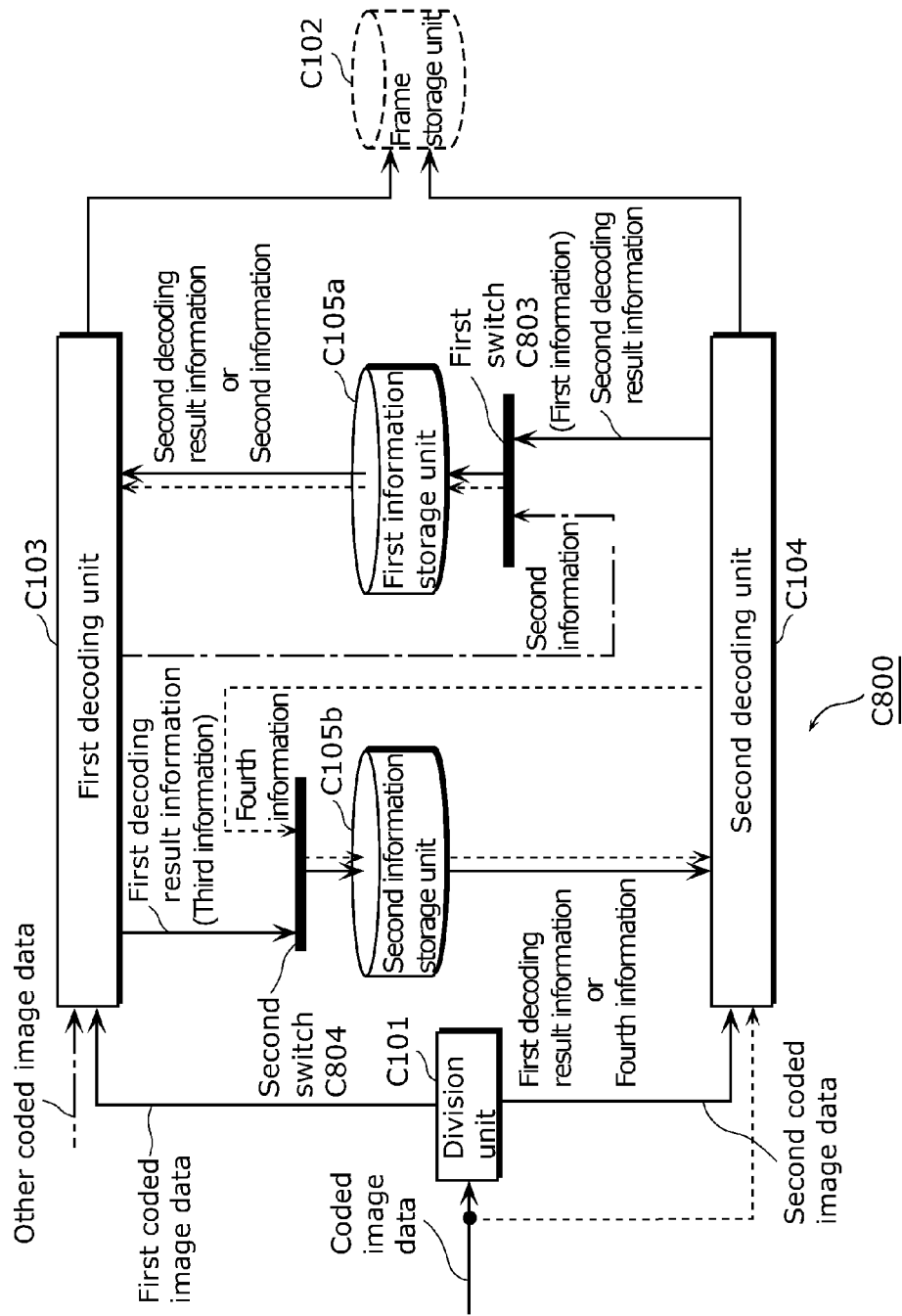
FIG. 42 is a block diagram showing a configuration of an image decoding device in another aspect according to the present invention.

FIG. 42 is a block diagram showing a configuration of an image decoding device in another aspect according to the present invention.

An image decoding device C800 in another aspect according to the present invention further includes an information storage unit having first and second information storage units C105a and C105b. A first decoding unit C103 reads second decoding result information from the first information storage unit C105a and uses the read second decoding result information in decoding first coded image data. Then, the first decoding unit C103 stores first decoding result information into the second information storage unit C105b. A second decoding unit C104 reads the first decoding result information from the second information storage unit C105b and uses the read first decoding result information in decoding second coded image data. Then, the second decoding unit C104 stores the second decoding result information into the first information storage unit C105a.

Here, the image decoding device C800 further includes: a first switch C803 that switches information to be stored into the first information storage unit C105a, between first information and second information; and a second switch C804 that switches information to be stored into the second information storage unit C105b, between third information and fourth information.

When the information to be stored into the first information storage unit C105a is switched to the first information by the first switch C803 and the information to be stored into the second information storage unit C105b is switched to the third information by the second switch C804, the first decoding unit C103 stores the first decoding result information as the third information into the second information storage unit C105b, as described above. Moreover, the second decoding unit C104 stores the second decoding result information as the first information into the first information storage unit C105a.

When the information to be stored into the first information storage unit C105a is switched to the second information by the first switch C803 and the information to be stored into the second information storage unit C105b is switched to the fourth information by the second switch C804, each of the first decoding unit C103 and the second decoding unit C104 performs an operation different from the operation described above. More specifically, the first decoding unit C103 further reads the second information from the first information storage unit C105a, uses the read second information in decoding another piece of coded image data, and stores, as new second information, a part of information generated as a result of the decoding into the first information storage unit C105a. Moreover, the second decoding unit C104 further reads the fourth information from the second information storage unit C105b, uses the read fourth information in decoding the coded image data, and stores, as new fourth information, a part of information generated as a result of the decoding into the second information storage unit C105b.

With this, in the image decoding device C800, when the information to be stored in the first and second information storage units C105a and C105b are respectively switched to the first and third information by the first and second switches C803 and C804, the first and second coded image data are decoded in parallel. When the information to be stored in the first and second information storage units C105a and C105b are respectively switched to the second and fourth information by the first and second switches C803 and C804, the coded image data and the other coded image data are coded at the same time. Accordingly, the first and second switches C803 and C804 allow the processing to be switched between: the processing of dividing one set of coded image data and decoding the divided sets of coded image data in parallel; and the processing of decoding the independent two sets of coded image data at the same time. This can enhance the convenience of the image decoding device.

Moreover, in the image decoding device according to the present invention, the first decoding unit C103 switches the decoding-target data between the first coded image data and the other coded image data, and the second decoding unit C104 switches the decoding-target data between the second coded image data and the coded image data. On this account, the image decoding device according to the present invention can achieve the aforementioned advantageous effect without including the switch 38 and the switch 39 of the image decoding device 300 described in Embodiment 3.

Figure 43:
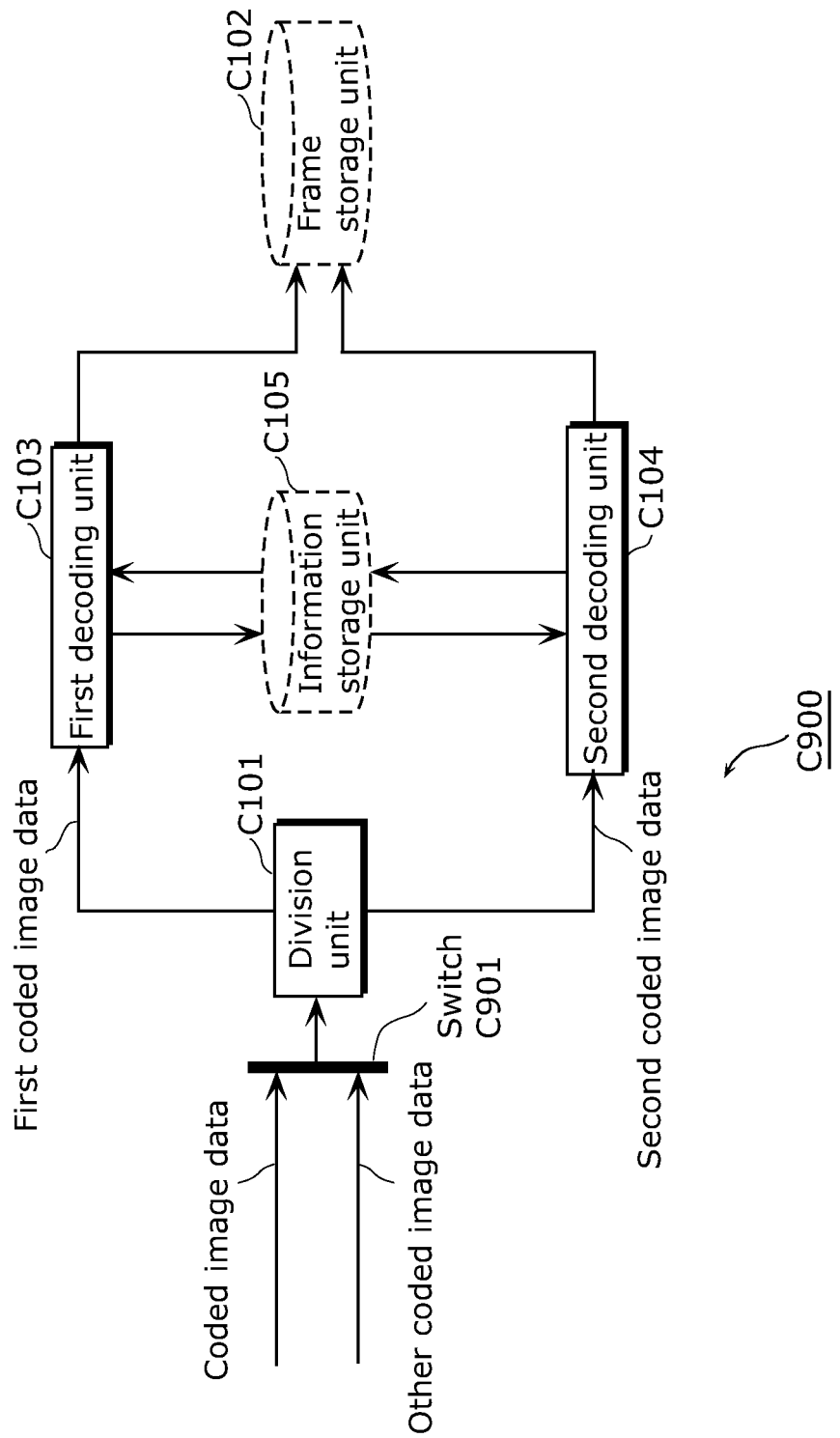
FIG. 43 is a block diagram showing a configuration of an image decoding device in another aspect according to the present invention.

FIG. 43 is a block diagram showing a configuration of an image decoding device in another aspect according to the present invention.

In addition to the components included in the image decoding device C100, an image decoding device C900 in another aspect according to the present invention further includes: a switch C901 that switches data to be divided by the division unit C101, between the coded image data and another piece of coded image data. When the data to be divided is switched to the coded image data by the switch C901, the division unit C101 divides the picture included in the coded image data. On the other hand, when the data to be divided is switched to the other coded image data by the switch C901, the division unit C101 divides a picture included in the other coded image data.

With this, the image decoding device C900 can perform decoding by temporally switching between the two sets of coded image data. For example, after the picture included in the coded image data is decoded, the data to be divided is switched to the other coded image data. As a result, a picture included in the other coded image data is divided and then decoded. After this, the data to be divided is switched to the coded image data again. In this way, switching is performed on a picture-by-picture basis, so that the two sets of coded image data can be decoded at the same time.

Figure 44:
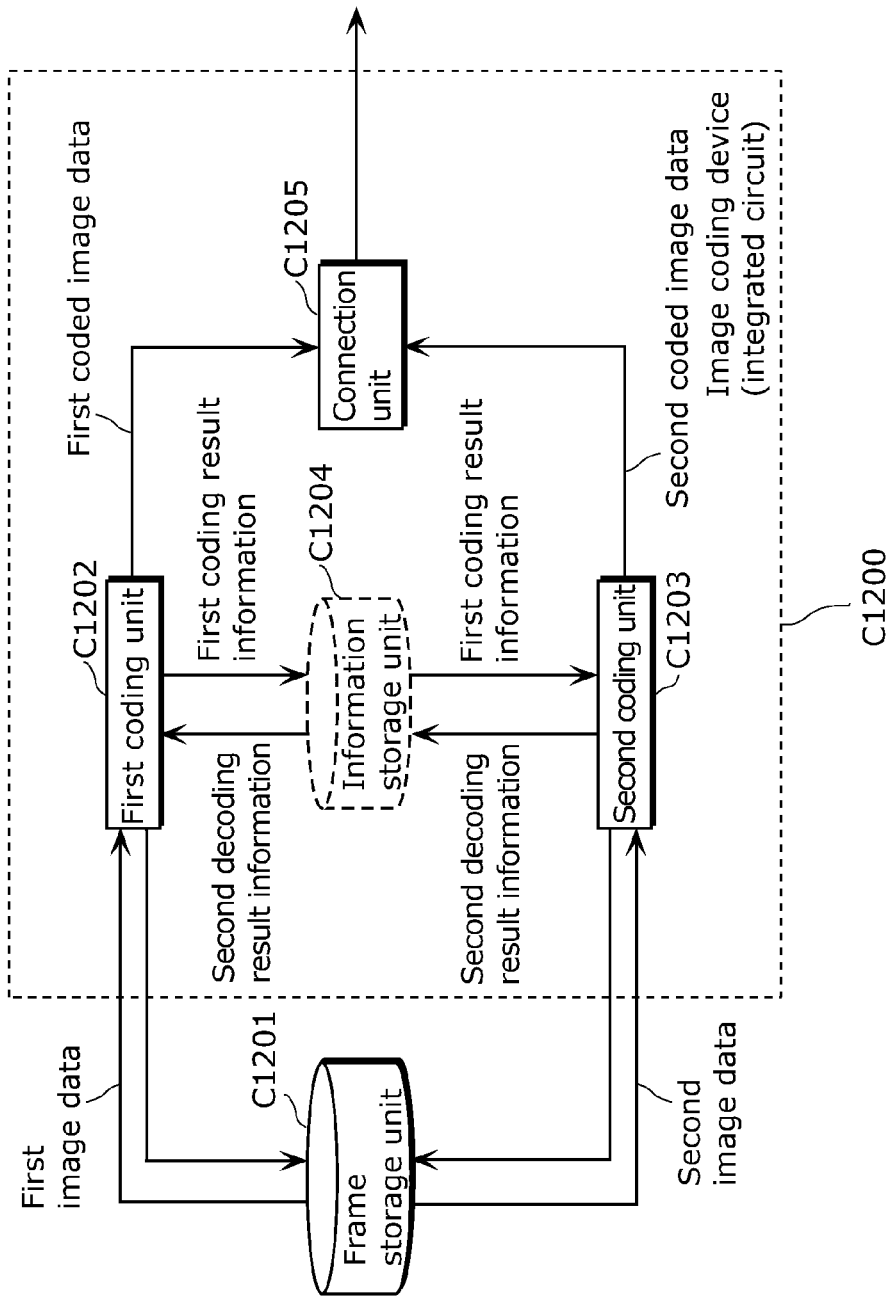
FIG. 44 is a block diagram showing a configuration of an image coding device in an aspect according to the present invention.

FIG. 44 is a block diagram showing a configuration of an image coding device in an aspect according to the present invention.

An image coding device C1200 codes image data. Here, the image data includes a picture having a plurality of macroblock lines each of which has a plurality of macroblocks aligned in a row. The image coding device C1200 includes: a first coding unit C1202 and a second coding unit C1203 which read first image data and second image data, respectively, from the image data stored in a frame storage unit C1201, and code, in parallel, the read first image data and the read second image data to generate first coded image data and second coded image data; and a connection unit C1205 which connects the first coded image data and the second coded image data so that macroblock lines respectively included in the first coded image data and the second coded image data generated by the first coding unit C1202 and the second coding unit C1203 are adjacent to each other in the picture The first coding unit C1202 codes the first image data using second coding result information stored in an information storage unit C1204 and stores, as first coding result information, a part of information generated as a result of the coding into the information storage unit C1204. When coding a target macroblock included in the first image data, the first coding unit C1202 performs image processing on the second coding result information and the target macroblock and stores at least a part of each of the image-processed target macroblock and the image-processed second coding result information into the frame storage unit C1201, the second coding result information indicating at least a part of the other macroblock that is included in the other macroblock line adjacent to the macroblock line including the target macroblock.

The second coding unit C1203 codes the second image data using the first coding result information stored in the information storage unit C1204 and stores, as the second coding result information, a part of information generated as a result of the coding into the information storage unit C1204. When coding a target macroblock included in the second image data, the second coding unit C1203 performs image processing on the first coding result information and the target macroblock and stores at least a part of each of the image-processed target macroblock and the image-processed first coding result information into the frame storage unit C1201, the first coding result information indicating at least a part of the other macroblock that is included in the other macroblock line adjacent to the macroblock line including the target macroblock.

Note that the connection unit C1205 corresponds to the stream connection unit 55 described in Embodiment 7, and that the frame storage unit C1201 corresponds to the frame memory 11 described in Embodiment 7. Note also that the first coding unit C1202 corresponds to the coding unit 51 and the transfer unit 9 described in Embodiment 7, and that the second coding unit C1203 corresponds to the coding unit 52 and the transfer unit 10 described in Embodiment 7. Moreover, the information storage unit C1204 corresponds to a recording medium including the neighboring information memories 7 and 8 described in Embodiment 7. Furthermore, note that the first and second coded image data corresponds to the divided streams described in Embodiment 7. Note also that the data generated as a result of the connection performed by the connection unit C1205 corresponds to the coded stream described in Embodiment 7, and that the first and second coding result information corresponds to the neighboring information described in Embodiment 7.

Figure 45:
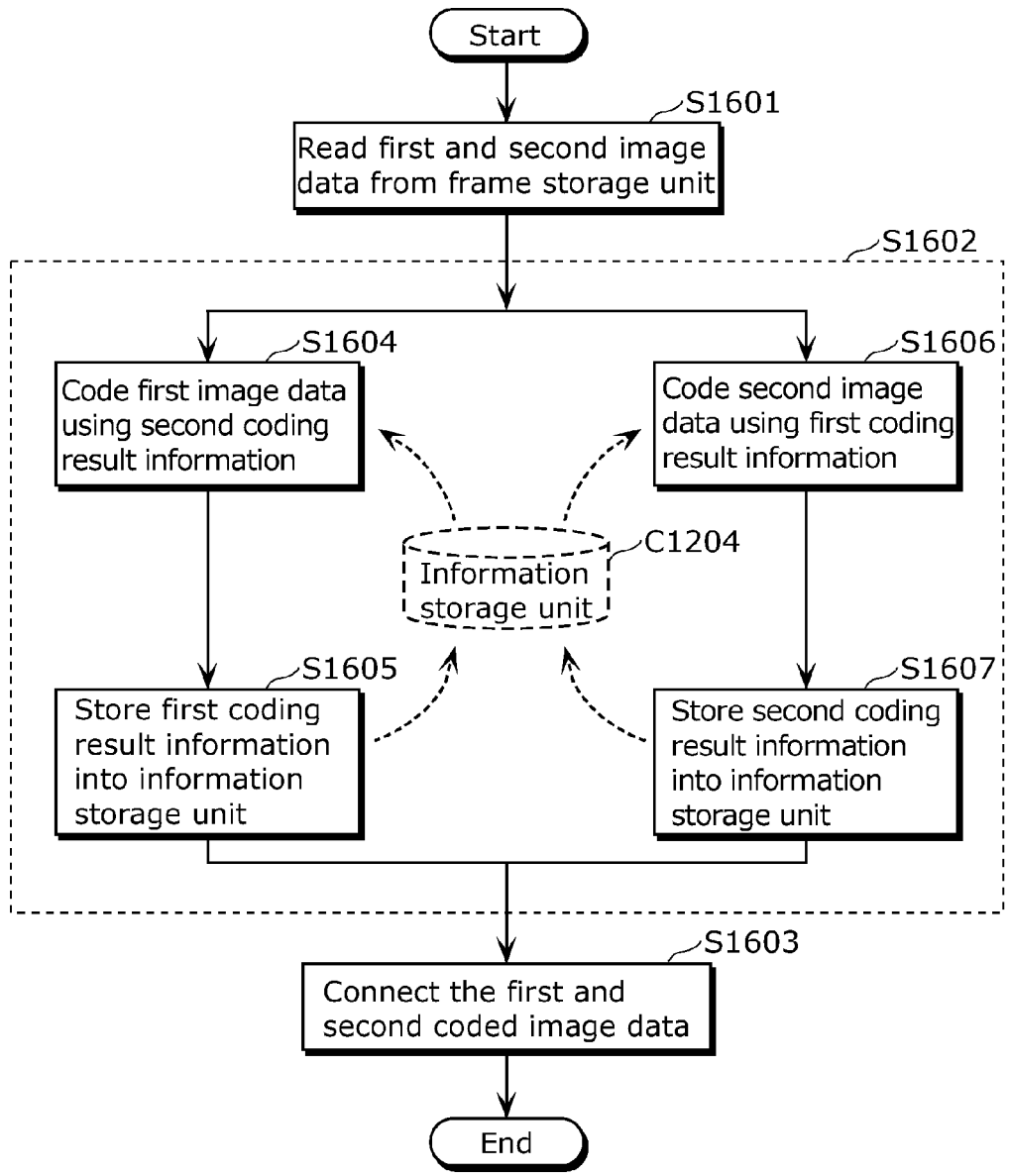
FIG. 45 is a flowchart showing an operation performed by an image coding device in an aspect according to the present invention.

FIG. 45 is a flowchart showing an operation performed by an image coding device C1200.

The image coding device C1200 firstly reads first image data and second image data from image data stored in the frame storage unit C1201 (S1601), and codes, in parallel, the read first image data and the read second image data to generate first coded image data and second coded image data (S1602). Next, the image coding device C1200 connects the generated first coded image data and the generated second coded image data so that macroblock lines respectively included in the first coded image data and the second coded image data are adjacent to each other in the picture (S1603).

When coding the first image data in step S1602, the first coding unit C1202 of the image coding device C1200 codes the first image data using second coding result information stored in the information storage unit C1204 (S1604) and stores, as first coding result information, a part of information generated as a result of the coding into the information storage unit C1204 (S1605). When coding a target macroblock included in the first image data, the first coding unit C1202 performs image processing on the second coding result information and the target macroblock and stores at least a part of each of the image-processed target macroblock and the image-processed second coding result information into the frame storage unit C1201, the second coding result information indicating at least a part of the other macroblock that is included in the other macroblock line adjacent to the macroblock line including the target macroblock.

When coding the second image data in step S1602, the second coding unit C1203 of the image coding device C1200 codes the second image data using the first coding result information stored in the information storage unit C1204 (S1606) and stores, as the second coding result information, a part of information generated as a result of the coding into the information storage unit C1204 (S1607). When coding a target macroblock included in the second image data, the second coding unit C1203 performs image processing on the first coding result information and the target macroblock and stores at least a part of each of the image-processed target macroblock and the image-processed first coding result information into the frame storage unit C1201, the first coding result information indicating at least a part of the other macroblock that is included in the other macroblock line adjacent to the macroblock line including the target macroblock.

With this, the image processing, such as the deblocking filtering process performed across the macroblock lines, is performed on the first and second image data in parallel. Thus, a speedup of the overall coding processing can be sufficiently achieved, resulting in an increase in coding performance or coding efficiency.

After the macroblock is stored into the frame storage unit C1201 by the first coding unit C1202 or the second coding unit C1203, this means that the image processing such as the deblocking filtering process has been performed on this macroblock. Therefore, unlike the case where the image processing needs to be performed after the macroblock is stored in the frame storage unit C1201, it is not necessary to take the trouble to read the macroblock from the frame storage unit C1201. This can reduce the number of times the frame storage unit C1201 is accessed.

In the image coding device C1200, the first and second image data included in the image data are coded in parallel and then connected. Thus, the image coding device can omit a control unit that collectively controls timings of coding performed by the coding units. Moreover, even in the case where the image coding device C1200 includes many coding units each of which codes a part of the image data, it is not necessary to place a signal line between the aforementioned control unit and each of the coding units. Thus, the image coding device can be easily implemented. Furthermore, in the image coding device C1200, the first and second coding result information required according to the dependency relationship between the data on the basis of the H.264 standard is sent and received between the first and second coding units C1202 and C1203 via the information storage unit C1204. Therefore, when the first or second coding result information necessary for decoding is stored in the information storage unit C1204, the corresponding first coding unit C1202 or second coding unit C1203 can continue coding the first or second image data using the stored first or second coding result information without having to wait for the other coding unit to finish coding. Accordingly, no loss of time is caused since the coding processing is not interrupted, thereby increasing the coding efficiency.

Thus, the image coding device according to the present invention can achieve the aforementioned advantageous effect without including the two memories (i.e., the neighboring information memories 7 and 8) for storing the partial coding results. Moreover, the image coding device according to the present invention can achieve the aforementioned advantageous effect without including the frame storage unit C1201 (i.e., the frame memory 11) and the CPB 56 and the buffers 53 and 54 shown in FIG. 28.

Figure 46:
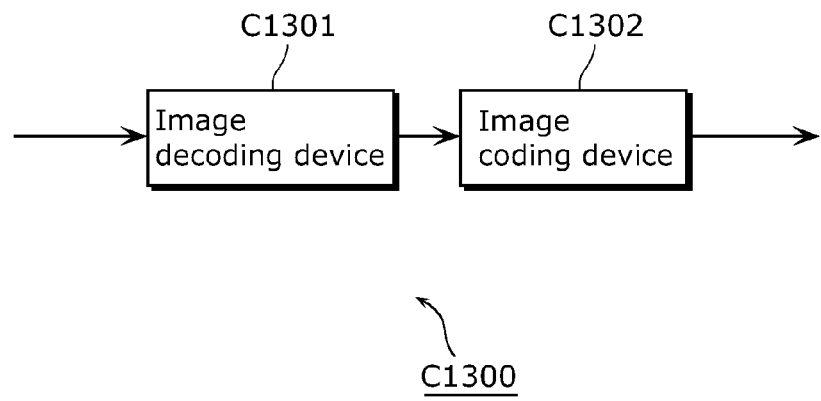
FIG. 46 is a block diagram showing a configuration of a transcoding device in an aspect according to the present invention.

FIG. 46 is a block diagram showing a configuration of a transcoding device in an aspect according to the present invention.

A transcoding device C1300 in an aspect according to the present invention includes an image decoding device C1301 and an image coding device C1302. Here, when the image decoding device C1301 is one of the image decoding devices described in above Embodiments 1 to 6, the image coding device C1302 may be any kind of image coding device. When the image coding device C1302 is the image coding device 700 described in Embodiment 7 or is an image coding device corresponding to one of the image decoding devices described in Embodiments 1 to 6, the image decoding device C1301 may be any kind of image decoding device. Moreover, the image decoding device C1301 may be one of the image decoding devices described in Embodiments 1 to 6, and the image coding device C1302 may be the image coding device 700 described in Embodiment 7 or an image coding device corresponding to one of the image decoding devices described in Embodiments 1 to 6.

With this, the transcoding device according to the present invention can achieve the same advantageous effect as at least one of the aforementioned image decoding device and image coding device according to the present invention.

The image decoding device, the image coding device, and the transcoding device according to the present invention can achieve the functional effect of increasing the decoding or coding efficiency, and can be easily implemented and used for various purposes. For example, the image decoding device, the image coding device, and the transcoding device are applicable to an information display device and an image pickup device, such as a television, a digital video recorder, a car navigation system, a cellular mobile phone, a digital camera, and a digital video camera, and thus are highly useful.

REFERENCE SIGNS LIST 1, 37, 56 CPB (Coded Picture Buffer)
2, 20 Stream division unit
3, 4, 21 to 24, 53, 54 Buffer
5, 6, 25 to 28, C2002 Decoding unit
7, 8, 29 to 32 Neighboring information memory
9, 10, 33 to 36 Transfer unit
11, 44 Frame memory
12 Variable-length decoding unit
13 Inverse quantization unit
14 Inverse frequency transform unit
15 Reconstruction unit
16 Intra-picture prediction unit
17 Motion vector calculation unit
18 Motion compensation unit
19 Deblocking filter unit
38 to 42, C901 Switch
43 Picture output unit
51, 52 Coding unit
55 Stream connection unit
60 Parallel decoding unit
61 Scaling unit
62 Parallel coding unit
100, 100a, 200, 300, 400, 500, 600, 600a, 600b, C100, C800, C900, C1301 Image decoding device 700, C1200, C1302 Image coding device
800, C1300 Transcoding device
C101 Division unit
C102, C1201 Frame storage unit
C103 First decoding unit
C104 Second decoding unit
C105, C1204, C2003 Information storage unit
C105a First information storage unit
C105b Second information storage unit
C803 First switch
C804 Second switch
C1202 First coding unit
C1203 Second coding unit
C1205 Connection unit
C2001 Integrated circuit
ex100 Content providing system
ex101 Internet
ex102 Internet service provider
ex103 Streaming server
ex104 Telephone network
ex107 to ex110 Base station
ex111 Computer
ex112 PDA (Personal Digital Assistant)
ex113 Camera
ex114 Cellular phone
ex116 Camera
ex200 Digital broadcasting system
ex201 Broadcast station
ex202 Broadcast satellite
ex203 Cable
ex204, ex205 Antenna
ex210 Car
ex211 Car navigation system
ex212 Reproduction device
ex213, ex219 Monitor
ex215, ex216 Recording medium
ex217 Set top box (STB)
ex218 Reader/recorder
ex220 Remote controller
ex230 Information track
ex231 Recording block
ex232 Inner circumference area
ex233 Data recording area
ex234 Outer circumference area
ex300 Television (receiver)
ex301 Tuner
ex302 Modulation/demodulation unit
ex303 Multiplexing/demultiplexing unit
ex304 Audio signal processing unit
ex305 Video signal processing unit
ex306 Signal processing unit
ex307 Speaker
ex308 Display unit
ex309 Output unit
ex310 Control unit
ex311 Power supply circuit unit
ex312 Operation input unit
ex313 Bridge
ex314 Slot unit
ex315 Driver
ex316 Modem
ex317 Interface unit
ex318, ex319, ex404 Buffer
ex400 Information reproducing/recording unit
ex401 Optical head
ex402 Modulation recording unit
ex403 Reproduction demodulating unit
ex405 Disk motor
ex406 Servo control unit
ex407 System control unit
ex500 LSI
ex502 Microcomputer
ex503 Memory controller
ex504 Stream I/O
ex505 Power supply circuit unit
ex507 Signal processing unit
ex509 AV I/O
ex510 Bus
ex511 Memory

The invention claimed is:

1. An image decoding device that decodes coded image data including a coded picture having a plurality of first elements each of which has a plurality of second elements aligned in a row, the image decoding device comprising:
a division unit configured to divide the picture into first coded image data and second coded image data by assigning, at least for each of the first elements included in the picture, the first element as a part of one of the first coded image data and the second coded image data; and
a first decoding unit and a second decoding unit configured to decode, in parallel, the first element included in the first coded image data and the first element included in the second coded image data, respectively, and store the decoded first elements into a frame storage unit, the first elements decoded by the first decoding unit and the second decoding unit being adjacent to each other in a same picture,
wherein the first decoding unit is configured to:
decode the first coded image data using second decoding result information stored in an information storage unit and store, as first decoding result information, a part of information generated as a result of the decoding into the information storage unit; and
when decoding a target second element included in the first coded image data, perform image processing on the second decoding result information and the target second element and store at least a part of each of the image-processed target second element and the image-processed second decoding result information into the frame storage unit, the second decoding result information indicating at least a part of another second element that has been decoded by the second decoding unit and is included in another first element adjacent to the first element including the target second element, and
the second decoding unit is configure to:
decode the second coded image data using the first decoding result information stored in the information storage unit and store, as the second decoding result information, a part of information generated as a result of the decoding into the information storage unit; and
when decoding a target second element included in the second coded image data, perform image processing on the first decoding result information and the target second element and store at least a part of each of the image-processed target second element and the image-processed first decoding result information into the frame storage unit, the first decoding result information indicating at least a part of another second element that has been decoded by the first decoding unit and is included in another first element adjacent to the first element including the target second element.

2. The image decoding device according to claim 1, wherein the first decoding unit is configured to perform the image processing to change at least one pixel value of the other decoded second element, the pixel value being indicated by the second decoding result information, and the second decoding unit is configured to perform the image processing to change at least one pixel value of the other decoded second element, the pixel value being indicated by the first decoding result information.

3. The image decoding device according to claim 2, wherein the first decoding unit is configured to perform, as the image processing, a deblocking filtering process on the second decoding result information and the target second element, and the second decoding unit is configured to perform, as the image processing, a deblocking filtering process on the first decoding result information and the target second element.

4. The image decoding device according to claim 1, further comprising the information storage unit including a first information storage unit and a second information storage unit, wherein the first decoding unit is configured to read the second decoding result information from the first information storage unit, use the read second decoding result information in decoding the first coded image data, and store the first decoding result information into the second information storage unit, and the second decoding unit is configured to read the first decoding result information from the second information storage unit, use the read first decoding result information in decoding the second coded image data, and store the second decoding result information into the first information storage unit.

5. The image decoding device according to claim 4, wherein the first decoding unit and the second decoding unit are configured to perform decoding in synchronization with each other via the first information storage unit and the second information storage unit.

6. The image decoding device according to claim 5, wherein, when the second decoding result information necessary to decode the target second element included in the first coded image data is not stored in the first information storage unit, the first decoding unit is configured to wait until the second decoding result information is stored and start decoding the target second element after the second decoding result information is stored, and when the first decoding result information necessary to decode the target second element included in the second coded image data is not stored in the second information storage unit, the second decoding unit is configured to wait until the first decoding result information is stored and start decoding the target second element after the first decoding result information is stored.

7. The image decoding device according to claim 4, further comprising:

a first switch that switches information to be stored into the first information storage unit, between first information and second information; and a second switch that switches information to be stored into the second information storage unit, between third information and fourth information, wherein, when the information to be stored into the first information storage unit is switched to the first information by the first switch and the information to be stored into the second information storage unit is switched to the third information by the second switch, the first decoding unit is configured to store the first decoding result information as the third information into the second information storage unit and the second decoding unit is configured to store the second decoding result information as the first information into the first information storage unit, and when the information to be stored into the first information storage unit is switched to the second information by the first switch and the information to be stored into the second information storage unit is switched to the fourth information by the second switch, the first decoding unit is further configured to read the second information from the first information storage unit, use the read second information in decoding another piece of coded image data, and store, as new second information, a part of information generated as a result of the decoding into the first information storage unit and the second decoding unit is further configured to read the fourth information from the second information storage unit, use the read fourth information in decoding the coded image data, and store, as new fourth information, a part of information generated as a result of the decoding into the second information storage unit.

8. The image decoding device according to claim 1, wherein, when the coded picture has a second element adaptive frame field (MBAFF) structure, the division unit is configured to divide the picture by assigning, for each pair of adjacent first elements in the picture, the adjacent first elements as a part of one of the first coded image data and the second coded image data.

9. The image decoding device according to claim 1, further comprising a switch that switches data to be divided by the division unit, between the coded image data and another piece of coded image data, wherein, when the data to be divided is switched to the coded image data by the switch, the division unit is configured to divide the picture included in the coded image data, and when the data to be divided is switched to the other coded image data by the switch, the division unit is configured to divide a picture included in the other coded image data.

10. The image decoding device according to claim 1, further comprising a picture output unit configured to (i) read, from the frame storage unit, video obtained as a result of decoding the first and second coded image data, (ii) subsample, in time, a picture included in the video so that the video is displayed at a frame rate set by a display device, and (iii) output, to the display device, the video from which the picture has been subsampled in time.

11. The image decoding device according to claim 1, wherein the frame storage unit includes a first frame storage unit and a second frame storage unit, the first decoding unit is configured to read, from the first frame storage unit, a reference image referenced for decoding the first coded image data and write a result of decoding the first coded image data into the first frame storage unit and the second frame storage unit, and the second decoding unit is configured to read, from the second frame storage unit, a reference image referenced for decoding the second coded image data and write a result of decoding the second coded image data into the first frame storage unit and the second frame storage unit.

12. A transcoding device that decodes coded image data and codes the decoded image data, the transcoding device comprising:
the image decoding device according to claim 1; and
an image coding device that codes image data stored in the frame storage unit, the image data including the first coded image data and the second coded image data having been decoded by the image decoding device.

13. A non-transitory computer-readable recording medium for use in a computer, the recording medium having a computer program recorded thereon for causing the computer to function as the image decoding device according to claim 1.

14. An image coding device that codes image data including a picture having a plurality of first elements each of which has a plurality of second elements aligned in a row, the image coding device comprising:
a first coding unit and a second coding unit configured to read first image data and second image data, respectively, from the image data stored in a frame storage unit, and code, in parallel, the read first image data and the read second image data to generate first coded image data and second coded image data; and
a connection unit configured to connect the first coded image data and the second coded image data so that first elements respectively included in the first coded image data and the second coded image data generated by the first coding unit and the second coding unit are adjacent to each other in a same picture,
wherein the first coding unit is configured to:
code the first image data using second coding result information stored in an information storage unit and store, as first coding result information, a part of information generated as a result of the coding into the information storage unit; and
when coding a target second element included in the first image data, perform image processing on the second coding result information and the target second element and store at least a part of each of the image-processed target second element and the image-processed second coding result information into the frame storage unit, the second coding result information indicating at least a part of another second element that is included in another first element adjacent to the first element including the target second element, and
the second coding unit is configure to:
code the second image data using the first coding result information stored in the information storage unit and store, as the second coding result information, a part of information generated as a result of the coding into the information storage unit; and
when coding a target second element included in the second image data, perform image processing on the first coding result information and the target second element and store at least a part of each of the image-processed target second element and the image-processed first coding result information into the frame storage unit, the first coding result information indicating at least a part of another second element that is included in another first element adjacent to the first element including the target second element.

15. A transcoding device that decodes coded image data and codes the decoded image data, the transcoding device comprising:
an image decoding device that decodes the coded image data; and
the image coding device, according to claim 14, that codes image data including the coded image data having been decoded by the image decoding device.

16. A non-transitory computer-readable recording medium for use in a computer, the recording medium having a computer program recorded thereon for causing the computer to function as the image coding device according to claim 14.

17. An image decoding method of decoding coded image data including a coded picture having a plurality of first elements each of which has a plurality of second elements aligned in a row, the image decoding method comprising:
dividing the picture into first coded image data and second coded image data by assigning, at least for each of the first elements included in the picture, the first element as a part of one of the first coded image data and the second coded image data;
decoding, in parallel, the first element included in the first coded image data and the first element included in the second coded image data, and storing the decoded first elements into a frame storage unit, the first elements to be decoded being adjacent to each other in a same picture;
when the first coded image data is to be decoded, decoding the first coded image data using second decoding result information stored in an information storage unit and storing, as first decoding result information, a part of information generated as a result of the decoding into the information storage unit;
when a target second element included in the first coded image data is to be decoded, performing image processing on the second decoding result information and the target second element and storing at least a part of each of the image-processed target second element and the image-processed second decoding result information into the frame storage unit, the second decoding result information indicating at least a part of another second element that has been decoded and is included in another first element adjacent to the first element including the target second element;
when the second coded image data is to be decoded, decoding the second coded image data using the first decoding result information stored in the information storage unit and storing, as the second decoding result information, a part of information generated as a result of the decoding into the information storage unit; and
when a target second element included in the second coded image data is to be decoded,
performing image processing on the first decoding result information and the target second element and storing at least a part of each of the image-processed target second element and the image-processed first decoding result information into the frame storage unit, the first decoding result information indicating at least a part of another second element that has been decoded and is included in another first element adjacent to the first element including the target second element.

18. An image coding method of coding image data including a picture having a plurality of first elements each of which has a plurality of second elements aligned in a row, the image coding method comprising:
reading first image data and second image data from the image data stored in a frame storage unit, and coding, in parallel, the read first image data and the read second image data to generate first coded image data and second coded image data;
connecting the generated first coded image data and the generated second coded image data so that first elements respectively included in the first coded image data and the second coded image data are adjacent to each other in a same picture;

when the first image data is to be coded, coding the first image data using second coding result information stored in an information storage unit and storing, as first coding result information, a part of information generated as a result of the coding into the information storage unit;

when a target second element included in the first image data is to be coded, performing image processing on the second coding result information and the target second element and storing at least a part of each of the image-processed target second element and the image-processed second coding result information into the frame storage unit, the second coding result information indicating at least a part of another second element that is included in another first element adjacent to the first element including the target second element;

when the second image data is to be coded, coding the second image data using the first coding result information stored in the information storage unit and storing, as the second coding result information, a part of information generated as a result of the coding into the information storage unit; and when a target second element included in the second image data is to be coded, performing image processing on the first coding result information and the target second element and storing at least a part of each of the image-processed target second element and the image-processed first coding result information into the frame storage unit, the first coding result information indicating at least a part of another second element that is included in another first element adjacent to the first element including the target second element.

19. An integrated circuit that decodes coded image data including a coded picture having a plurality of first elements each of which has a plurality of second elements aligned in a row, the integrated circuit comprising:

a division unit configured to divide the picture into first coded image data and second coded image data by assigning, at least for each of the first elements included in the picture, the first element as a part of one of the first coded image data and the second coded image data; and a first decoding unit and a second decoding unit configured to decode, in parallel, the first element included in the first coded image data and the first element included in the second coded image data, respectively, and store the decoded first elements into a frame storage unit, the first elements decoded by the first decoding unit and the second decoding unit being adjacent to each other in a same picture, wherein the first decoding unit is configured to:

decode the first coded image data using second decoding result information stored in an information storage unit and store, as first decoding result information, a part of information generated as a result of the decoding into the information storage unit; and when decoding a target second element included in the first coded image data, perform image processing on the second decoding result information and the target second element and store at least a part of each of the image-processed target second element and the image-processed second decoding result information into the frame storage unit, the second decoding result information indicating at least a part of another second element that has been decoded by the second decoding unit and is included in another first element adjacent to the first element including the target second element, and the second decoding unit is configured to:

decode the second coded image data using the first decoding result information stored in the information storage unit and store, as the second decoding result information, a part of information generated as a result of the decoding into the information storage unit; and when decoding a target second element included in the second coded image data, perform image processing on the first decoding result information and the target second element and store at least a part of each of the image-processed target second element and the image-processed first decoding result information into the frame storage unit, the first decoding result information indicating at least a part of another second element that has been decoded by the first decoding unit and is included in another first element adjacent to the first element including the target second element.

20. An integrated circuit that codes image data including a picture having a plurality of first elements each of which has a plurality of second elements aligned in a row, the integrated circuit comprising:

a first coding unit and a second coding unit configured to read first image data and second image data, respectively, from the image data stored in a frame storage unit, and code, in parallel, the read first image data and the read second image data to generate first coded image data and second coded image data; and a connection unit configured to connect the first coded image data and the second coded image data so that first elements respectively included in the first coded image data and the second coded image data generated by the first coding unit and the second coding unit are adjacent to each other in a same picture, wherein the first coding unit is configured to:

code the first image data using second coding result information stored in an information storage unit and store, as first coding result information, a part of information generated as a result of the coding into the information storage unit; and when coding a target second element included in the first image data, perform image processing on the second coding result information and the target second element and store at least a part of each of the image-processed target second element and the image-processed second coding result information into the frame storage unit, the second coding result information indicating at least a part of another second element that is included in another first element adjacent to the first element including the target second element, and the second coding unit is configured to:

code the second image data using the first coding result information stored in the information storage unit and store, as the second coding result information, a part of information generated as a result of the coding into the information storage unit; and when coding a target second element included in the second image data, perform image processing on the first coding result information and the target second element and store at least a part of each of the image-processed target second element and the image-processed first coding result information into the frame storage unit, the first coding result information indicating at least a part of another second element that is included in another first element adjacent to the first element including the target second element.

\* \* \* \* \*